United States Patent
Komatsu et al.

(10) Patent No.: US 9,977,238 B2
(45) Date of Patent: May 22, 2018

(54) VIRTUAL IMAGE DISPLAY APPARATUS

(71) Applicant: SEIKO EPSON CORPORATION, Tokyo (JP)

(72) Inventors: Akira Komatsu, Kamiina-Gun (JP); Takahiro Totani, Suwa (JP); Takashi Takeda, Suwa (JP); Toshiaki Miyao, Matsumoto (JP); Masayuki Takagi, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 1011 days.

(21) Appl. No.: 13/772,838

(22) Filed: Feb. 21, 2013

(65) Prior Publication Data
US 2013/0222919 A1    Aug. 29, 2013

(30) Foreign Application Priority Data

Feb. 24, 2012   (JP) .................................. 2012-038383
Feb. 24, 2012   (JP) .................................. 2012-038384
(Continued)

(51) Int. Cl.
G02B 27/01    (2006.01)

(52) U.S. Cl.
CPC ......... *G02B 27/01* (2013.01); *G02B 27/0172* (2013.01); *G02B 2027/011* (2013.01); *G02B 2027/0178* (2013.01)

(58) Field of Classification Search
CPC ...... G02B 2027/011; G02B 2027/0178; G02B 27/01; G02B 27/0172
(Continued)

(56) References Cited

U.S. PATENT DOCUMENTS 4,592,636 A * 6/1986 Kato et al. .................... 396/384
5,453,877 A    9/1995 Gerbe et al.
(Continued)

FOREIGN PATENT DOCUMENTS

CN    1231787 C    12/2005
EP    0790513 A2    8/1997
(Continued)

OTHER PUBLICATIONS

May 27, 2013 European Search Report issued in European Patent Application No. EP 13156632.5.
(Continued)

*Primary Examiner* — Thomas K Pham
*Assistant Examiner* — Vipin Patel
(74) *Attorney, Agent, or Firm* — Oliff PLC

(57) ABSTRACT

An intermediate image is formed inside a first prism, and an image light, which is reflected on the order of a third surface, a first surface and a second surface, is transmitted through the first surface and reaches the eyes of the observer, therefore it is possible to make the entire optical system small and light in weight by making the first prism thin, and realize a high performance display device with a wide angle of view. Further, when an external light is passed through, for example, the first surface and the third surface and observed, a diopter scale is set to approximately zero, and thereby reducing the defocus or distortion of the external light when observed in a see-through manner. And, it is possible such that the shape of the first prism conforms to the face of the observer, the center is also close to the face.

6 Claims, 37 Drawing Sheets

(30) Foreign Application Priority Data

Dec. 11, 2012 (JP) ................................ 2012-270072
Dec. 11, 2012 (JP) ................................ 2012-270073

(58) Field of Classification Search
USPC .......................................................... 359/630
See application file for complete search history.

(56) References Cited

U.S. PATENT DOCUMENTS

| | | | |
|---|---|---|---|
| 5,546,227 | A | 8/1996 | Yasugaki et al. |
| 6,201,646 | B1 | 3/2001 | Togino et al. |
| 6,310,736 | B1 | 10/2001 | Togino |
| 7,483,225 | B2 * | 1/2009 | Shimo .......................... 359/833 |
| 7,522,342 | B2 | 4/2009 | Inoguchi et al. |
| 7,699,473 | B2 | 4/2010 | Mukawa et al. |
| 8,116,006 | B2 * | 2/2012 | Shimizu et al. ............. 359/630 |
| 2002/0034016 | A1 * | 3/2002 | Inoguchi et al. ............ 359/630 |
| 2003/0197943 | A1 | 10/2003 | Yamazaki et al. |
| 2004/0233555 | A1 | 11/2004 | Matsunaga |
| 2005/0078378 | A1 | 4/2005 | Geist |
| 2005/0254107 | A1 | 11/2005 | Amanai |
| 2008/0055193 | A1 | 3/2008 | Tsuyuki et al. |
| 2013/0222896 | A1 | 8/2013 | Komatsu et al. |
| 2013/0222919 | A1 | 8/2013 | Komatsu et al. |

FOREIGN PATENT DOCUMENTS

| | | |
|---|---|---|
| JP | 2746697 B2 | 5/1998 |
| JP | A-2000-66106 | 3/2000 |
| JP | A-2000-105338 | 4/2000 |
| JP | A-2000-131614 | 5/2000 |
| JP | A-2000-199853 | 7/2000 |
| JP | A-2004-341411 | 12/2004 |
| JP | 3787399 B2 | 6/2006 |
| JP | A-2008-158203 | 7/2008 |
| JP | 4218553 B2 | 2/2009 |
| JP | 2010-048841 A | 3/2010 |
| JP | 2011-002514 A | 1/2011 |
| JP | 4819532 B2 | 11/2011 |
| JP | 2013-200553 A | 10/2013 |
| WO | 2012088478 A1 | 6/2012 |

OTHER PUBLICATIONS

Jan. 15, 2015 Office Action issued in U.S. Appl. No. 13/773,058.
Feb. 21, 2013 U.S. Appl. No. 13/773,058.
Nov. 27, 2015 Office Action issued in U.S. Appl. No. 13/773,058.
Jun. 30, 2015 Office Action issued in U.S. Appl. No. 13/773,058.

* cited by examiner

VIRTUAL IMAGE DISPLAY APPARATUS

BACKGROUND

1. Technical Field

The present invention relates to a virtual image display apparatus which presents an image formed by an image display element and the like to an observer, and in particular to a virtual image display apparatus suitable for a head mount display to be mounted on the head of the observer.

2. Related Art

As an optical system which is incorporated in a virtual image display apparatus such as a head mount display (hereinafter, referred to as an HMD) to be mounted in the head of an observer, various optical systems have been proposed (refer to JP-A-2000-66106, JP-A-2000-131614, JP-A-2000-199853 and JP-A-2004-341411).

With regard to the virtual image display apparatus such as the HMD, it is desirable to have a wide angle of view of an image light and to reduce the weight of the apparatus. In particular, thinning the thickness in a visual axis direction of the observer and making a central point close to the observer are very important in order to improve a wearing sensation.

In addition, in a state in which the observer's view is totally covered and only the image light is viewed, the observer cannot judge the status of the external world, therefore the observer feels uneasy. Then, new various uses of a virtual reality are made by superimposing and displaying the external world with the image. Accordingly, a display in which the image light is superimposed and displayed without obstructing the view of the external world is desirable.

Further, in order to improve the wearing sensation of the observer and enhance the form of an appearance, generally, it is desirable to make an image display device close to glasses and dispose the image display device alongside a face, without placing the image display device in an upper part of the eyes.

In order to make the optical system compact, and separate the image display device from the position of the observer's eyes without obstructing the observer's view, a relay optical system which makes a display image light into an intermediate image in the middle of the optical system, and enlarges and displays the intermediate image may be used.

In JP-A-2000-66106, JP-A-2000-131614, JP-A-2000-199853 and JP-A-2004-341411, by using two prisms having an asymmetric curved surface (a free curved surface) as a relay optical system which corrects the eccentric aberration to form the intermediate image, it is possible to obtain a display optical system of a small and compact configuration.

However, this type of optical system in the related art is not designed such that the external light is intended to be viewed by the observers, and thus the prism in front of eyes is small, so a sufficient external light is not received. Further, since the shape of the curved surface which transmits the external light is not suitable, the diopter scale with respect to the external world does not become zero and thus blurring and distortion occur.

On the other hand, in the optical system in JP-A-2008-158203, surfaces which transmit the external light are parallel flat surfaces, so that a clear view with almost no distortion is achieved. However, the optical system in JP-A-2008-158203 uses a hologram in a half mirror surface, so that an aberration or wavelength selectivity due to this gives an effect to an image light, and thereby lowering the image quality.

SUMMARY

An advantage of some aspects of the invention is to provide a compact and light-weight virtual image display apparatus which has a wide angle of view and high performance, and a see-through function that superimposes and displays an external light and an image light.

An aspect of the invention is directed to a virtual image display apparatus which causes an image light and an external light to be visually recognized simultaneously, and includes an image element which generates the image light, and a prism type image forming optical system including non-axisymmetric curved surfaces of three surfaces or more. The prism type image forming optical system includes a relay optical system which forms an intermediate image on an optical path. When the external world is viewed by passing through a first surface and a third surface among a plurality of surfaces constituting the prism type image forming optical system, a diopter scale is approximately zero. The first surface and the third surface form a concave surface shape with respect to an observation side. After the image light from the image element is totally reflected on the third surface, then totally reflected on the first surface and then is reflected on the second surface, the image light is transmitted through the first surface to reach the observation side.

In the virtual image display apparatus, an intermediate image is formed on the optical path of the prism type image forming optical system, and in the prism type image forming optical system, the image light, which is totally reflected on two or more surfaces in the order of the third surface, the first surface and the second surface, is transmitted through the first surface and reaches the eyes of the observer, therefore it is possible to make the entire optical system small and light-weight by making a part and the like in front of the prism type image forming optical system thin, and realize bright and high performance display with wide angle of view. Further, with regard to the external light, it is possible to observe the external light by passing through the first surface and the third surface, and the diopter scale is set to approximately zero at that time, thereby reducing the defocus or distortion of the external light when observed in a see-through manner, and securing the wide view. In addition, the shape of the prism type image forming optical system in front of the eyes of the observer has a shape conforming to the face of the observer, the center is also close to the face and design is also excellent.

In a specific aspect of the invention, in the virtual image display apparatus, the prism type image forming optical system may include a first prism having non-axisymmetric curved surfaces of two surfaces or more and a second prism including non-axisymmetric curved surfaces of two surfaces or more, and an intermediate image may be formed on an optical path from the first prism to the second prism by taking an optical system including at least the second prism as the relay optical system. In this case, in the first prism in front of eye, the image light that is totally reflected on two or more surfaces in the order of the third surface, the first surface and the second surface, is transmitted through the first surface and reaches the observer, therefore it is possible to make the entire optical system small and light-weight by making the first prism in front of the eye thin, and thereby realizing a display with a wide angle of view that is bright and has high performance.

In another specific aspect of the invention, the first prism and the second prism having a plurality of surfaces are formed separately.

In another specific aspect of the invention, the second prism has the plurality of surfaces, and the intermediate image is formed by the image element, the plurality of surfaces of the second prism, and a fourth surface that is a light incident surface of the first prism.

In another specific aspect of the invention, the prism type image forming optical system is single prism including non-axisymmetric curved surfaces of three surfaces or more, and forms the intermediate image inside the prism, as the relay optical system. In this case, by the single prism that is the prism type image forming optical system, the intermediate image is formed inside the corresponding prism and in the prism, the image light reflected in the order of the third surface, the first surface and the second surface, is transmitted through the first surface and reaches the observer, therefore it is possible to make the entire optical system small and light-weight by making the prism in front of the eye of the observer thin, and thereby realizing a display with a wide angle of view that is bright and has high performance.

In another specific aspect of the invention, the prism type image forming optical system has a first prism portion having the first surface, the second surface and the third surface on a light emitting side and a second prism portion on a light incident side, and the first prism portion and the second prism portion are integrally formed.

In another specific aspect of the invention, the second prism portion has the fourth surface, a fifth surface and a sixth surface, and the intermediate image is formed by the image element and the fourth surface, the fifth surface and the sixth surface of the second prism portion.

In another specific aspect of the invention, by taking an origin of each of the surfaces constituting the prism type image forming optical system as a standard, when polynomial development of an expressing formula of a surface shape is performed with regard to rectangular coordinates x and y extending from the origin to a tangential direction, by setting $Ak_{m,n}$ as a coefficient of a term $x^m \cdot y^n$ of a polynomial expression which expresses the k-th surface, conditions of the (1) to (3) below are satisfied.

$-5 \times 10^{-2} < A1_{2,0} + A1_{0,2} < -1 \times 10^{-3}$ and $-5 \times 10^{-2} < A3_{2,0} + A3_{0,2} < -1 \times 10^{-3}$ (1)

$|A3_{2,0} - A3_{0,2}| < 1 \times 10^{-2}$ (2)

$|A1_{2,0} - A3_{2,0}| < 5 \times 10^{-3}$ and $|A1_{0,2} - A3_{0,2}| < 5 \times 10^{-3}$ (3)

In addition, in the local coordinates (x, y, z) including rectangular coordinates x and y of each surface, any one point on the curved surface is set as origin, z axis is a direction perpendicular to the surface and x axis and y axis are the direction tangential to the surface. The origin of the curved surface is set as, for example, a position through which a light flux center passes.

In the aspect of the invention, the first surface and the third surface, that relate with the observation of not only the image light but also the external light, are free curved surfaces and have a concaved surface shape, and thus enables to obtain an optical system of a high definition by efficiently using the free degree of the curved surface shapes. In the operations of the first surface and the third surface, the curvature of the curved surface is involved and the curvature in the vicinity of the origin is mainly determined by the values of the coefficients $Ak_{2,0}$ and $Ak_{0,2}$ (k=1, 3), therefore it is essential to set appropriate values of the coefficients $Ak_{2,0}$ and $Ak_{0,2}$.

The condition (1) defines the sizes of the curvature of the first surface in the vicinity of the origin and the curvature of the third surface. When those values $A1_{2,0}$, $A1_{0,2}$, $A3_{2,0}$ and $A3_{0,2}$ are negative, it expresses that the first surface or the third surface has a concaved shape with respect to the observer. If the value exceeds the upper limit of the condition (1), the shape is approximate to the flat surface, so that the aberration correction of the image light may not be efficiently performed even in the case where there is no problem in observing the external light. If the value exceeds the lower limit of the condition (1), the curvature is strong, so that it is difficult to perform the aberration correction, and the position of the prism of the relay optical system is close to the face, so a sense of wearing becomes bad.

The condition (2) defines the difference between the curvature of the third surface in the x axis direction and the curvature in the y axis direction. If the difference exceeds the upper limit of the condition (2), the astigmatism which is generated in the third surface becomes too large, so that the aberration correction becomes difficult.

The condition (3) defines the difference between the curvature of the first surface and the curvature of the third surface, with regard to the x axis direction and the y axis direction, and gives an effect to the diopter scale with respect to the external light. If the thickness of the prism is T and the refractive index is N, the diopter scale $D_x$ of the x axis direction and the diopter scale $D_y$ of the y axis direction on the optical axis of the prism are given as follows.

$D_x = 2000(N-1)(A1_{2,0} - A3_{2,0} + (2T(N-1)/N) \times A1_{2,0} \times A3_{2,0})$ $D_y = 2000(N-1)(A1_{0,2} - A3_{0,2} + (2T(N-1)/N) \times A1_{0,2} \times A3_{0,2})$ Generally if an error of a remote diopter scale exceeds ±1D, the observer feels unpleasant, therefore it is preferable to suppress the diopter scale of the prism to ±1D. However, by a balance of the diopter scale of an outer circumferential portion and the aberration, the diopter scale on the optical axis may be set in the range of ±2D in design. Since the diopter scale on the optical axis is related to the thickness or the refractive index of the prism through the above expression, the diopter scale may not be determined only by the value of the aspheric coefficient, however, if the coefficient is in the range satisfying the condition (3), the diopter scale on the optical axis may be suppressed in the range of ±2D.

The first surface and the third surface are made to have the shapes in which the above conditions (1) to (3) are satisfied, so that the aberration corrections of both of the external light and the image light are performed favorably, thereby resulting in an excellent image quality.

In another specific aspect of the invention, the image light is presented to an observer by forming a half mirror in the second surface, and an external light and the image light are superimposed and presented to the observer by integrally disposing a light transmitting member outside the second surface and making the diopter scale approximately zero with respect to the external light. In this case, a defocus or a distortion of the external light that is viewed through the second surface may be reduced.

In another specific aspect of the invention, the light transmitting member has a first transmitting surface and a second transmitting surface on the observer side and a third transmitting surface on the external side, the second surface of the prism type image forming optical system and the second transmitting surface of the light transmitting member have approximately the same curved surface shape, and the second surface and the second transmitting surface are integrated with each other. In this case, the surfaces may be bonded to be integrated with each other and each continuous surface may be formed on the first surface and the third surface side.

In another specific aspect of the invention, the first surface, the second surface and the third surface have symmetrical shapes with a reference surface, interposed therebetween, including an optical path passing therethrough.

In another specific aspect of the invention, an interval between the first surface and the third surface is 5 mm or more and 15 mm or less. In this case, the interval is 5 mm or more, thereby making the size of the prism type image forming optical system sufficiently large, which covers the front of the eyes, and the interval is 15 mm or less, thereby suppressing the increase of the weight.

In another specific aspect of the invention, an inclination angle of the second surface with respect to the first surface may be 20° or more and 40° or less. In this case, the inclination angle is in the above range, thereby making it easy that the image light is guided to the eyes in an appropriate reflection number and a reflection angle.

In another specific aspect of the invention, the image element is integrally fixed with the prism type image forming optical system in order to oppose with the image light incident surface of the prism type image forming optical system. In this case, the image element is incorporated in a reduced space, thereby making the virtual image display apparatus small.

In another specific aspect of the invention, the prism type image forming optical system partially covers the front of the eyes of the observer when worn; therefore there is a part in which the front of the eyes is not covered.

In another specific aspect of the invention, the image element includes a signal light forming unit which emits a signal light that is modulated corresponding to the image, and a scanning optical system which scans a signal light that is incident from the signal light forming portion, and emits the signal light as a scanning light.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, referring to drawings, a first virtual image display apparatus of a first embodiment related to the invention will be described in detail.

A. Appearance of First Virtual Image Display Apparatus

Figure 1:
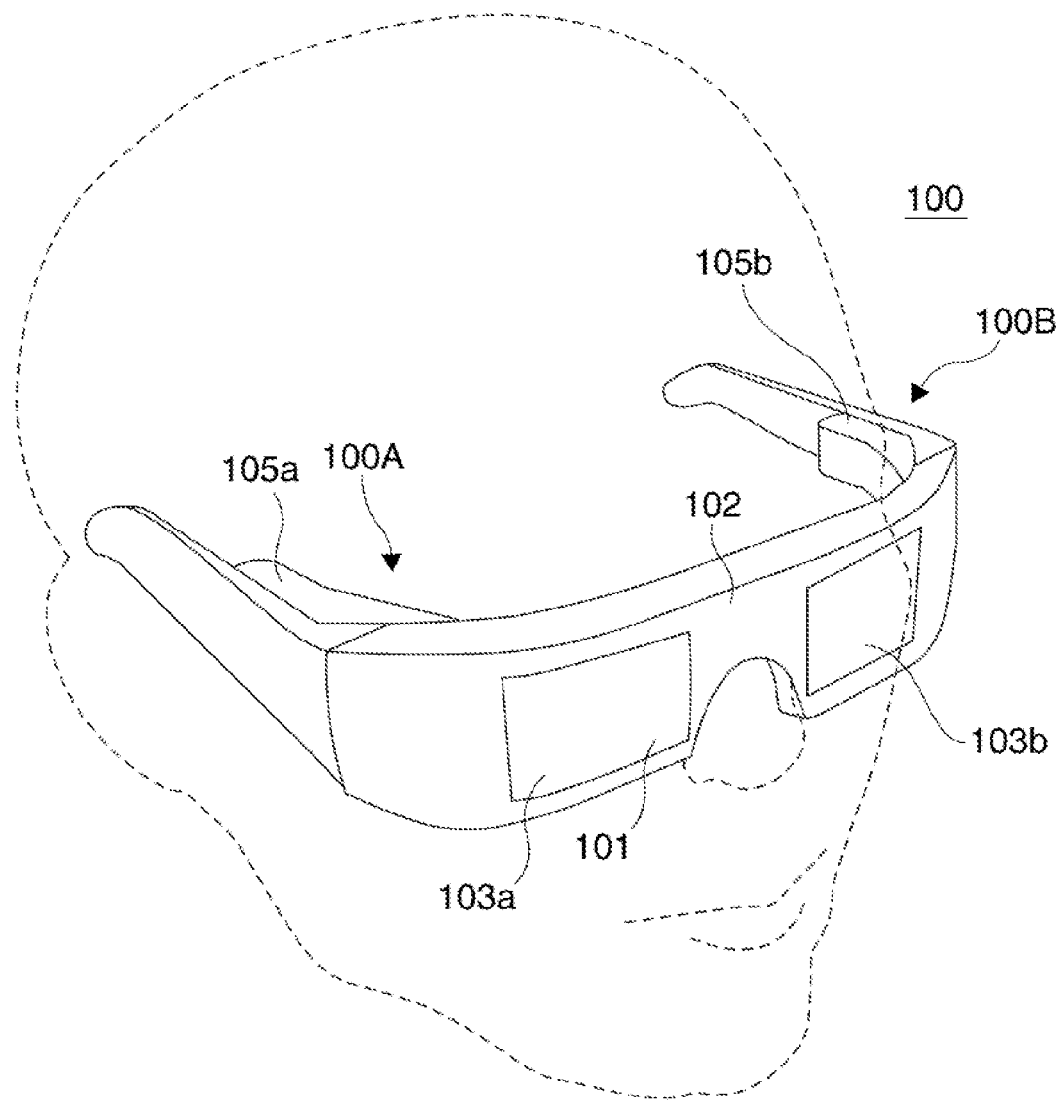
FIG. 1 is a perspective view illustrating a first virtual image display apparatus of a first embodiment.

The first virtual image display apparatus 100 shown in FIG. 1 is a head mount display having an appearance of the glasses, and enables an observer who wears the virtual image display apparatus 100 to visually recognize an image light corresponding to a virtual image and the observer to see or observe an external image in a see-through manner. The virtual image display apparatus 100 includes a see-through member 101 which covers the eye in front of the observer, a frame 102 for supporting the see-through member 101, and first and second built-in apparatus portions 105a and 105b added to a portion from a cover portion in both of a left and a right edge of the frame 102 to rear bow portion (temple). Here, the see-through member 101 is an optical member (a transmitting eye cover) curved having a thickness which covers the eye in front of the observer and is divided into a first optical portion 103a and a second optical portion 103b. A first display apparatus 100A on the left side in the figure, in which the first optical portion 103a and the first built-in apparatus portions 105a are bonded, is a portion which forms a virtual image for the right eye, and functions as the virtual image display apparatus alone. A second display apparatus 100B on the right side in the figure, in which the second optical portion 103b and the second built-in apparatus portions 105b are bonded, is a portion which forms a virtual image for the left eye, and functions as the virtual image display apparatus alone.

B. Configuration of Display Apparatus

Figure 2:
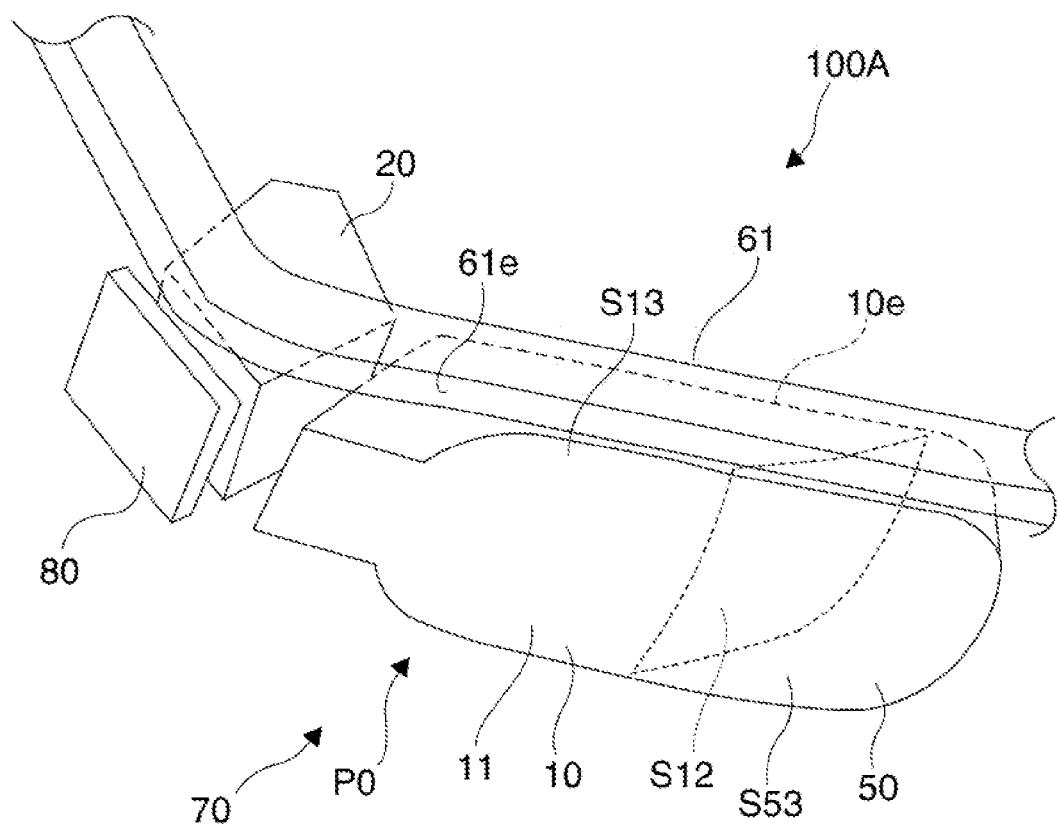
FIG. 2 is a perspective view illustrating the configuration of the main body of the first virtual image display apparatus.
Figure 3A:
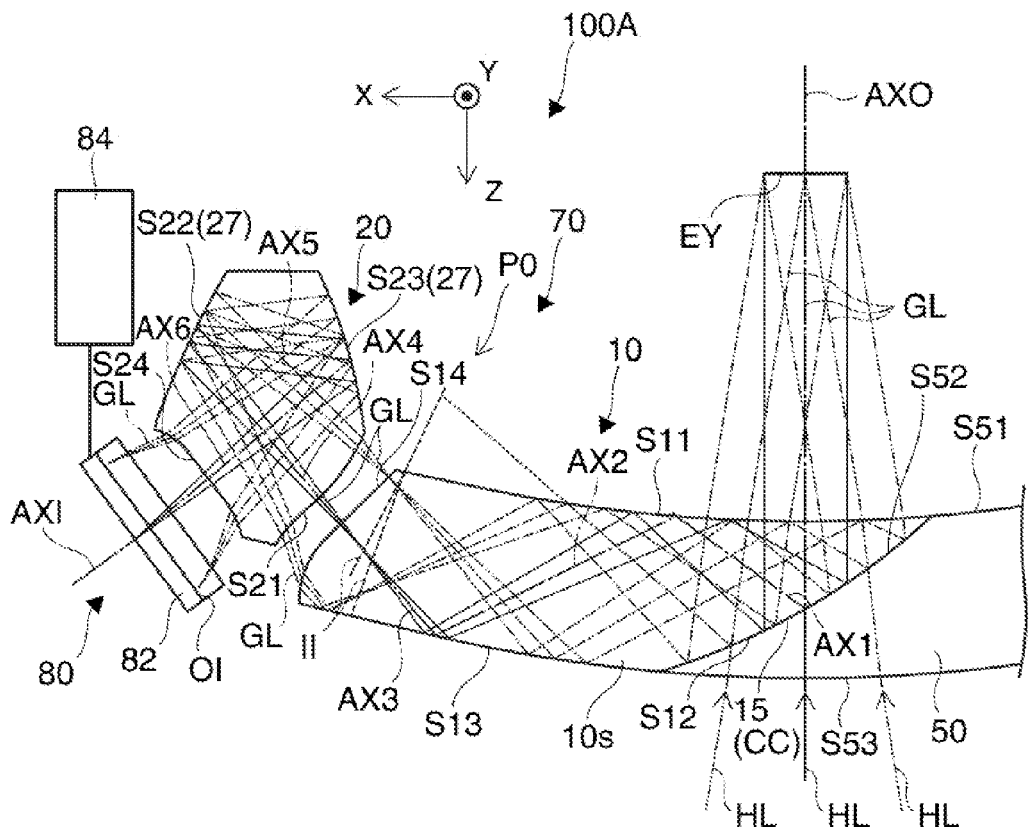
FIG. 3A is a cross-sectional view of the main body portion of a first display apparatus constituting the virtual image display apparatus as seen from a plan view.
Figure 3B:
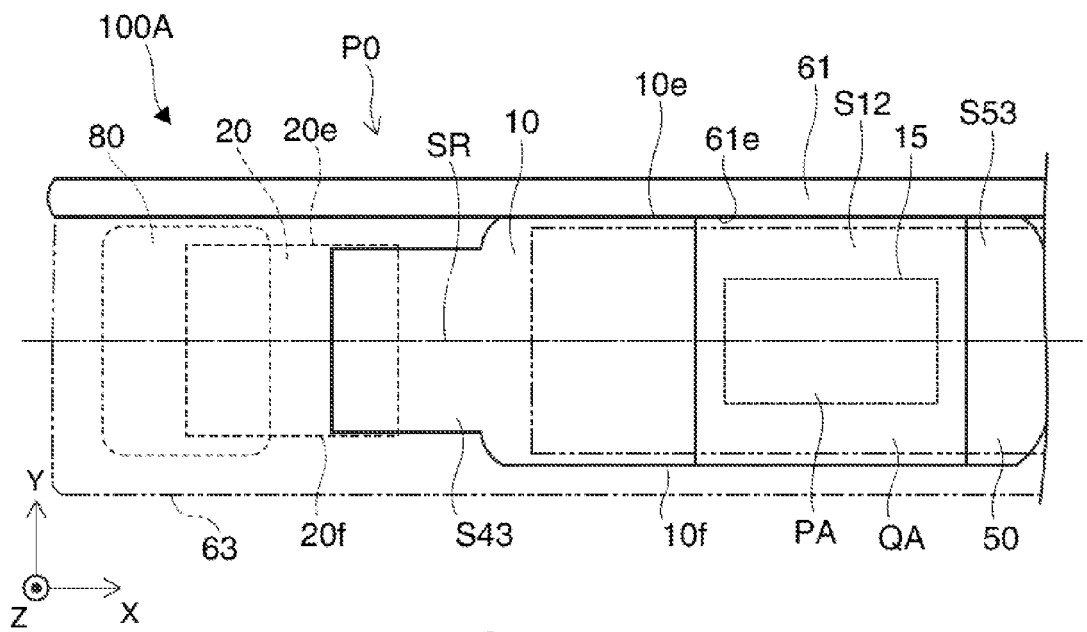
FIG. 3B is a front view of the main body portion.

As shown in FIGS. 2, 3A, 3B and the like, the first display apparatus 100A includes a perspective projection device 70 and an image display device 80. Among these, the perspective projection device 70 includes a prism type image forming optical system PO and a light transmitting member 50. The prism type image forming optical system PO includes a first prism 10 that is a light guiding member and a second prism 20. The first prism 10 and the light transmitting member 50 are bonded and integrated to be firmly fixed to the lower side of a frame 61, for example, such that the upper surface 10e of the first prism 10 and the lower surface of a frame 61 are abutted. The second prism 20 is fixed to the first prism 10 through a supporting member not shown in the state where the second prism 20 is separated from the first prism 10. The first prism 10 and the light transmitting member 50 of the perspective projection device 70 correspond to the first optical portion 103a in FIG. 1 and the second prism 20 of the perspective projection device 70 and the image display device 80 correspond to the first built-in apparatus portions 105a in FIG. 1. In addition, the second display apparatus 100B shown in FIG. 1 has the same configuration as that of the first display apparatus 100A but the left and the right thereof are inverted, and thus the detailed description of the second display apparatus 100B will be omitted.

In a prism type image forming optical system PO constituting the perspective projection device 70, the first prism 10 is an arc-shaped member that is curved to conform to a face surface as seen from a plan view. The first prism 10 includes a first surface S11, a second surface S12, a third surface S13 and a fourth surface S14 as a side surface having an optical function. Among these, the second surface S12 is disposed on the front side of eyes EY and between the first surface S11 and the third surface S13, and the fourth surface S14 is disposed on the second prism side and between the first surface S11 and the third surface S13. In addition, the first prism 10 has a first side surface 10e and a second side surface 10f which abut to the first surface S11 to fourth surface S14 and oppose with each other.

In the first prism 10, the first surface S11 is a free curved surface which takes an emission side optical axis AXO that is parallel to Z axis as a central axis or a reference axis, the second surface S12 is a free curved surface which is included in a reference surface SR that is parallel to XZ surface and takes an optical axis AX1 inclined with respect to Z axis as a central axis or a reference axis, and the third surface S13 is a free curved surface which takes an emission side optical axis AXO as a central axis or a reference axis. The fourth surface S14 is a free curved surface which is included in a reference surface SR that is parallel to XZ surface and takes an optical axis AX3 inclined with respect to Z axis as a central axis or a reference axis. In addition, the above first surface S11 to fourth surface S14 have a shape that is parallel to the XZ surface extending horizontally (or laterally) and are symmetric with the vertical (or longitudinal) Y axis direction with the reference surface SR through which optical axes AX1 to AX3 and the like pass interposed therebetween.

The first prism 10 is formed by a resin material having a high optical transparency in a visible range. The first prism 10 has a block-shaped member which is integrally formed, for example, by injection molding as a main body portion 10s, and enables waveguide and emission of the image light GL and a pass-through of an external light HL. The main body portion 10s is formed by injecting and hardening, for example, the thermoplastic resin material in a mold.

In the first prism 10, the first surface S11 functions as a refractive surface to emit the image light GL to the outside of the first prism 10 and as a total reflecting surface that totally reflects the image light GL on the side of the inner surface of the first prism 10. The first surface S11 is disposed in front of the eye EY and forms a concave surface shape with respect to the observer. In addition, the first surface S11 may cover the main body portion 10s with a hard coating layer in order to prevent the surface from being damaged and the image resolution from being reduced. A coating agent made from a resin and the like is deposited on the base surface of the main body portion 10s through a dip process or a spray coating process, and thus the hard coating layer is formed.

The second surface S12 has a half mirror layer 15. The half mirror layer 15 is a reflecting film having an optical transparency (that is, a semi-transmitting reflective film). The half mirror layer 15 (the semi-transmitting reflective film) is not formed on the entire of the second surface S12 but on the partial region PA of the second surface S12. That is, the half mirror layer 15 is formed on the partial region PA in which the entire region QA, in which the second surface S12 is widened, is narrowed mainly with regard to the normal direction. More specifically, the partial region PA is disposed on the center side with regard to the normal Y axis direction and disposed approximately entirely with regard to the direction along a horizontal reference surface SR. The half mirror layer 15 is formed by making a metal reflecting film or a dielectric multilayer film on the partial region PA in the base surface of the main body portion 10s. The reflectivity with respect to the image light GL of the half mirror layer 15 is set to 10% or more and 50% or less in the incident angle range of the assumed image light GL, from a view point of making an observation of the external light HL easy by a see-through manner. The reflectivity with respect to the image light GL of the half mirror layer 15 of the specific embodiment is set to, for example, 20%, and the transmissivity with respect to the image light GL is set to, for example, 80%.

The third surface S13 functions as a total reflecting surface on which the image light GL is totally reflected on the side of the inner surface. In addition, the third surface S13 may cover the main body portion 10s with a hard coating layer in order to prevent the surface from being damaged and the image resolution from being reduced. The third surface S13 is disposed in front of the eyes EY and forms a concave surface shape with respect to the observer in the same manner as the first surface S11. When the external light HL is passed through the first surface S11 and the third surface S13 to be observed, diopter scale becomes approximately zero.

The fourth surface S14 functions as a refractive surface (a light incident surface) which causes the image light GL to be entered inside the first prism 10. Further, the fourth surface S14 may cover the main body portion 10s with a hard coating layer in order to prevent the surface from being damaged and the image resolution from being reduced. In addition, it is possible to cover the main body portion 10s with the multilayer film in order to restrict a ghost image by reflection prevention.

In the prism type image forming optical system PO constituting the perspective projection device 70, the second prism 20 is a member which bends the optical path. The second prism 20 has a fifth surface S21, a sixth surface S22, a seventh surface S23, and an eighth surface S24 as a side surface having an optical function. Among these, the fifth surface S21 and the sixth surface S22 approximately oppose with each other, and the seventh surface S23 and the eighth surface S24 approximately oppose with each other. In addition, the second prism 20 has a first side surface 20e and a second side surface 20f which are adjacent to the fifth surface S21 to eighth surface S24 and oppose with each other. Among these, the fifth surface S21 opposes the fourth surface S14 of the adjacent first prism 10.

In the second prism 20, the fifth surface S21 is a free curved surface which takes an optical axis AX4 inclined with respect to the Z axis included in the reference surface SR that is parallel to the XZ surface as a center axis or a reference axis. The sixth surface S22 is a free curved surface which takes a bisector of two optical axes AX4 and AX5 inclined with respect to the Z axis included in the reference surface SR that is parallel to the XZ surface as a center axis or a reference axis. The seventh surface S23 is a free curved surface which takes a bisector of two optical axes AX5 and AX6 inclined with respect to the Z axis included in the reference surface SR that is parallel to the XZ surface as a center axis or a reference axis. The eighth surface S24 is a free curved surface which takes an optical axis AX6 inclined with respect to the Z axis included in the reference surface SR that is parallel to the XZ surface as a center axis or a reference axis. Here, the optical axis AX4 is coincident with the optical axis AX3 of the first prism 10 and the optical axis AX6 is coincident with the incident side optical axis AX1 from the image display device 80. Further, the above fifth surface S21 to eighth surface S24 have a shape that is parallel to the XZ surface extending in the lateral (or horizontal) direction and symmetrical to the perpendicular (or vertical) Y axis direction with the reference surface SR interposed therebetween, through which the optical axes AX4 to AX6 and the like pass.

The second prism 20 is formed by a resin material showing a high optical transparency in a visible range in the same manner as the first prism 10. The second prism 20 has as a main body portion 20s, the block-shaped member which is integrally formed by, for example, an injection molding and enables the incidence and the waveguide of the image light GL and the transfer to the first prism 10. In addition, the main body portion 20s is formed by injecting and hardening, for example, the thermoplastic resin material inside the mold.

In the second prism 20, the fifth surface S21 functions as a refractive surface which causes the image light GL to emit to the outside of the second prism 20. In addition, the fifth surface S21 may cover the main body portion 20s with a hard coating layer in order to prevent the surface from being damaged and the resolution of the image to be reduced. In addition, it is possible to cover the main body portion 20s with the multilayer film in order to restrict a ghost image by reflection prevention.

The sixth surface S22 and the seventh surface S23 are covered with a mirror layer 27 which is a non-transmissive reflection coating and functions as a reflecting surface (a total reflecting surface of a broad sense) which approximately totally reflects the image light GL on the side of the inner surface. Further, by adjusting the refractive index of the main body portion 20s or the reflection angle in the sixth surface S22 or the seventh surface S23, it is possible to cause the surfaces S22 and S23 to function as the total reflecting surface (a total reflecting surface of a narrow sense) which totally reflects the image light GL on the side of the inside.

The eighth surface S24 functions as a refractive surface to cause the image light GL to enter inside the second prism 20. Further, the eighth surface S24 may be formed by covering the main body portion 20s with the multilayer film in order to restrict the ghost image by reflection prevention.

Since the second prism 20 reforms the image of the image light GL emitted along the incident side optical axis AX1 from the image display device 80, the image light GL from the image display device 80 is appropriately converged inside the second prism 20 and entered inside the first prism 10 through the fourth surface S14 of the first prism 10. That is, the second prism 20 is a relay optical system to reform the image of the image light or the picture light emitted from each point on the image surface (display position) OI of the image display element 82 inside the first prism 10. In this case, the fourth surface S14 of the first prism 10 cooperates with the second prism 20 to function as a part of the relay optical system.

The light transmitting member 50 shows a high optical transparency in a visible range, is formed by a resin material having approximately the same refractive index with the first prism 10, and integrally fixed to the first prism 10, as an auxiliary prism. The light transmitting member (the auxiliary prism) 50 is a member which assists a see-through function of the first prism 10 and has, as a side surface having an optical function, a first transmitting surface S51, a second transmitting surface S52 and a third transmitting surface S53. Here, the second transmitting surface S52 is disposed between the first transmitting surface S51 and the third transmitting surface S53. The first transmitting surface S51 is present on the extended curved surface of the first surface S11 of the first prism 10, the second transmitting surface S52 is a curved surface which is bonded by an adhesive agent CC and integrated with respect to the second surface S12 of the first prism 10, and the third transmitting surface S53 is present on the extended curved surface of the third surface S13 of the first prism 10.

The first prism 10 is connected to the second prism 20 described later, and supports the second prism 20. The second prism 20 is connected to the image display device 80 described later, and supports the image display device 80. The light incident side of the first prism 10 together with the second prism 20 and the like is covered with the light shielding member 63. The upper edge portion and the lower edge portion of the first prism 10 are covered with the light shielding member 63. In the vicinity of the first prism 10 and the second prism 20, an additional light shielding portion to prevent the external light from entering may be provided. The light shielding portion may be configured by, for example, a light shielding coating or light scattering layer.

The image display device 80 has an image display element 82 which is a self-emission type display device and an operation control unit 84 which controls the operation of the image display element 82.

The image display element 82 is an image element formed by, for example, an organic electro luminescence or an organic light-emitting diode to form an image light to be a display subject of a moving image and the like. The operation control unit 84 forms an image light of the color which becomes a source of a moving image or a static image as a transmissivity pattern by outputting an image signal or an operation signal with respect to the image display element 82. In addition, the image display element 82 (image element) of the image display device 80 is integrally fixed to the second prism 20 to oppose to the eighth surface S24 which is an image light incident surface of the second prism 20.

C. Optical Path of Image Light and the Like

Hereinafter, the optical path of the image light GL and the like in the virtual image display apparatus 100 will be described.

The image light GL emitted from the image display element 82 (image element) is converged by the second prism 20 and the direction of the image light GL is changed to be entered into the fourth surface S14 provided in the first prism 10 having a relatively strong negative refractive power.

The image light GL which passes through the fourth surface S14 of the first prism 10 progresses while being converged and enters the third surface S13 having a relatively weak positive refractive power to be totally reflected, and enters the first surface S11 having a relatively weak negative refractive power to be totally reflected. In addition, the image light GL forms an intermediate image in the first prism 10 by the relay optical system 20 including the second prism 20 and the fourth surface S14 of the first prism 10 before and after passing through the third surface S13, by the fourth surface S14. Although the image surface II of the intermediate image corresponds to the image surface (a display position) OI of the image display element 82, the image surface II is folded in the third surface S13.

Although the image light GL which is totally reflected in the first surface S11 enters the second surface S12, especially, the image light GL which enters the half mirror layer 15 partially is transmitted through the half mirror layer 15 and is partially reflected to enter again and partially passes through the first surface S11. The half mirror layer 15 acts as having a relatively strong positive refractive power with respect to the image light GL that is reflected here. In addition, the first surface S11 acts as having a negative refractive power with respect to the image light GL passing therethrough.

The image light GL which passes through the first surface S11 enters the pupils of eyes EY of the observer, as an approximately parallel light flux. That is, the observer observes the image formed on the image display element 82 by an image light GL as a virtual image.

On the other hand, among the external lights HL, the light which enters further +X side than the second surface S12 of the first prism 10 passes through the third surface S13 and the first surface S11, but at this time, a positive and a negative refractive powers are offset and the aberration is corrected. That is, the observer observes an external image of which distortion is small over the first prism 10. In the same manner, among the external lights HL, when the light which enters further −X side than the second surface S12 of the first prism 10, that is, the light, which enters the light transmitting member 50, passes through the third transmitting surface S53 and first transmitting surface S51 provided therein, the positive and negative refractive powers are offset and the aberration is corrected. That is, the observer observes the external image having a small distortion through the light transmitting member 50. Among the external lights HL, when the light, which enters the light transmitting member 50 corresponding to the second surface S12 of the first prism 10, passes through the third transmission surface S53 and the first surface S11, the positive and negative refractive powers are offset and the aberration is corrected. That is, the observer observes an external image of which distortion is small over the light transmitting member 50. In addition, the second surface S12 of the first prism 10 and the second transmitting surface S52 of the light transmitting member 50 have approximately the same curved surface shape and approximately the same refractive index and the aperture therebetween is charged with an adhesive layer (an adhesive agent) CC having approximately the same refractive index. That is, the second surface S12 of the first prism 10 or the second transmitting surface S52 of the light transmitting member 50 do not act as a refractive surface with respect to the external light HL.

However, the external light HL which enters the half mirror layer 15 partially is transmitted through the half mirror layer 15 and is partially reflected, so that transmissivity is lowered. Since the image light GL enters from the image display element 82 side, the observer observes the image formed on the image display element 82 in the direction of the half mirror layer 15, and an external image.

The light which is not reflected in the half mirror layer 15 among the image lights GL, which is transmitted in the first prism 10 and enters the second surface S12, enters the light transmitting member 50, but a reflection protection unit not shown which is provided in the light transmitting member 50 prevents the light from returning to the first prism 10. That is, it is prevented that the image light GL, which passes through the second surface S12, returns on to the optical path to become a stray light. Further, the external light HL, which enters from the light transmitting member 50 side and reflected in the half mirror layer 15, returns to the light transmitting member 50, but a reflection protection unit not shown which is provided in the light transmitting member 50 prevents the light from emitting to the first prism 10. That is, it is prevented that the external light HL which is reflected in the half mirror layer 15 returns on the optical path to become a stray light.

D. Method of Defining Optical Surface or Optical Path

Figure 4:
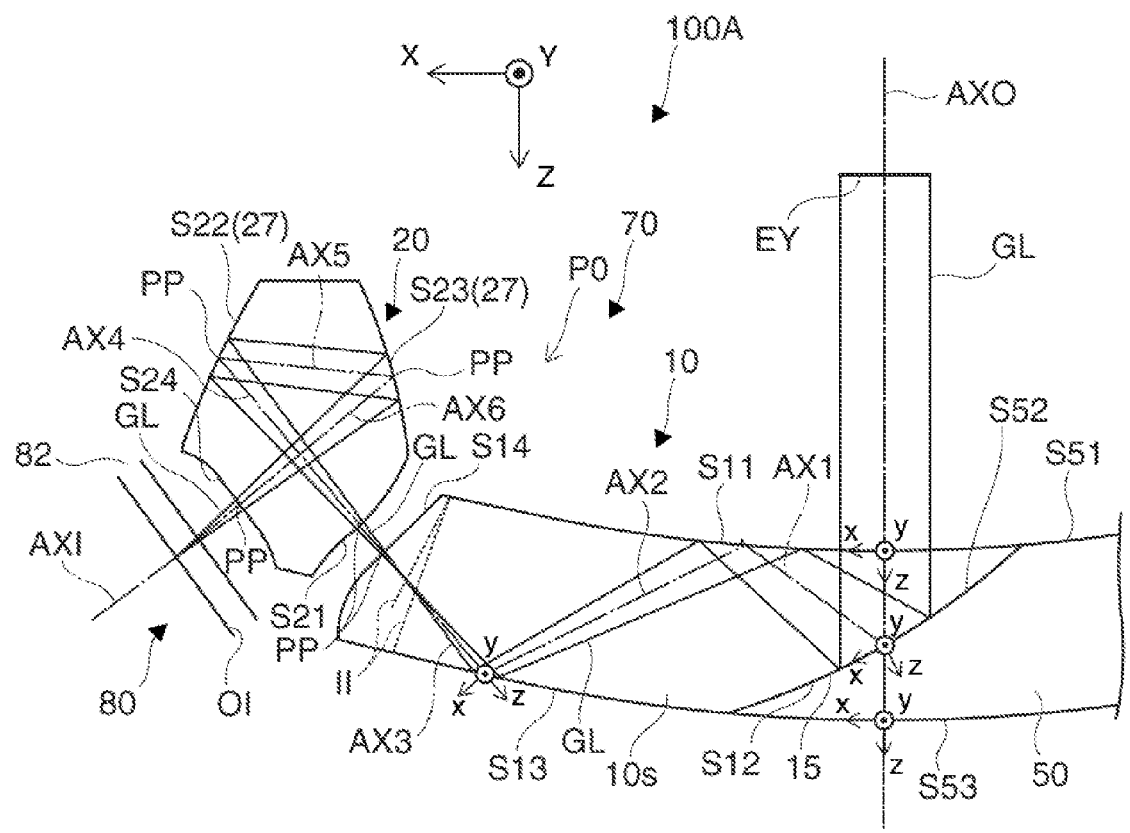
FIG. 4 is a cross-sectional view illustrating an optical surface or an optical path in the prism in the first display apparatus.

FIG. 4 is a diagram illustrating optical axes AX1 to AX3 or local coordinates in the first prism 10. In the description below, with consideration of convenience of the evaluation or the expression of the optical system, the optical surface or the optical path is defined with regard to an inverse direction from the eyes EY of the observer to the image display device 80. Although in the actual optical system, the light emitted from the image display element 82 sequentially passes through the first prism 10 and the second prism 20 to reach the eyes EY it is difficult to evaluate the optical system in that status. Consequently, the light, from the light source at infinity through a diaphragm that is present in the position of the eyes EY, enters the first prism 10, passes through the second prism 20 to be made into an image in the image display element 82, therefore the evaluation and the design of the optical system are performed, and data of the optical system described later is also expressed in that order. In addition, the light transmitting member 50 which is bonded to and integrally used with the first prism 10 has the extended shape of the first prism 10, and thus the description thereof is omitted.

In the first prism 10 in the drawing, the optical axis of the first surface S11 is coincident with the emission side optical axis AXO, the local coordinates (x, y, z) of the first surface S11 is in the translation relationship with the entire coordinates (X, Y, Z) and has an origin on the first surface S11. That is, the z direction of the local coordinates is the progress direction (an inverse direction of the light beam) on the emission side optical axis AXO, and the y direction of the local coordinates is parallel to the Y direction of the entire coordinates. Also in each surface afterwards, the y direction of the local coordinates is parallel to the Y direction of the entire coordinates.

The optical axis of the second surface S12 is appropriately inclined with respect to the emission side optical axis AXO, and the local coordinates of the second surface S12 is made to properly rotate and translate around the Y axis with respect to the entire coordinates and has an origin on the second surface S12. The z direction of the local coordinates of the second surface S12 is an intermediate direction between the emission side optical axis AXO and the optical axis AX1 of the light flux center from the second surface S12 toward the first surface S11.

The optical axis of the third surface S13 is coincident with the emission side optical axis AXO, the local coordinates of the third surface S13 is in the translation relationship with the entire coordinates, and has an origin on the extended surface of the third surface S13, namely, the third transmitting surface S53.

Due to this, an intermediate direction between the optical axis AX1 of the light flux center from the second surface S12 toward the first surface S11, and the optical axis AX2 of the light flux center from first surface S11 toward third surface S13 is coincident with the normal direction of the first surface S11 in the light flux center (an intersection of the optical axes AX1 and AX2) on the first surface S11. In addition, an intermediate direction between the optical axis AX2 of the light flux center from the first surface S11 toward the third surface S13, and the optical axis AX3 of the light flux center from the third surface S13 toward the fourth surface S14 is coincident with the normal direction of the third surface S13 in the light flux center (an intersection of the optical axes AX2 and AX3) on the third surface S13.

In the optical path from the third surface S13 toward the next fourth surface S14, the local coordinates correspond to the progress direction (the inverse direction of the light beam). That is, the z direction of the local coordinates from the third surface S13 toward the fourth surface S14 is coincident with the optical axis AX3 of the light flux center, and the y direction of the local coordinates is parallel to the Y direction of the entire coordinates.

Although the origin of the local coordinates of the fourth surface S14 is not shown in the drawing, the origin is on the fourth surface S14. In addition, the z direction of the local coordinates of the fourth surface S14, that is, the optical axis of the fourth surface S14 is coincident with the optical axis AX3.

In the second prism 20, although the detailed description thereof is omitted, the origin of the local coordinates of the fifth surface S21 is on the fifth surface S21, and the z direction of the local coordinates is parallel to the optical axis AX4 of the fifth surface S21. Further, the origin of the local coordinates of the sixth surface S22 is an intersection between the optical axis AX4 and the optical axis AX5, and the z direction is a bisector of AX4 and AX5. In the same manner, the origin of the local coordinates of the seventh surface S23 is an intersection between the optical axes AX5 and AX6, and the z direction is a bisector of AX5 and AX6.

E. Preferable Characteristic of Optical Surface

The shape of the first surface S11 of the prism 10 is expressed as following equation using the local coordinates (x, y, z) of the first surface S11.

$$Z=\Sigma\{A1_{m,n}\cdot(x^m\cdot y^n)\} \quad (4)$$

where, $A1_{m,n}$ are coefficients of m-th and n-th terms which are developed in the polynomial expression, m and n are integers of 0 or more.

The shape of the second surface S12 of the prism 10 is expressed as following equation using a local coordinates (x, y, z) of the second surface S12.

$$Z=\Sigma\{A2_{m,n}\cdot(x^m\cdot y^n)\} \quad (5)$$

where, $A2_{m,n}$ are coefficients of m-th and n-th terms which are developed in the polynomial expression.

The shape of the third surface S13 of the prism 10 is expressed as following equation using a local coordinates (x, y, z) of the third surface S13.

$$Z=\Sigma\{A3_{m,n}\cdot(x^m\cdot y^n)\} \quad (6)$$

where, $A3_{m,n}$ are coefficients of m-th and n-th terms which are developed in the polynomial expression.

In the present embodiment, the first surface S11 to third surface S13 of the prism 10 satisfy the following three conditions.

$$-5\times10^{-2} < A1_{2,0} + A1_{0,2} < -1\times10^{-3} \text{ and}$$

$$-5\times10^{-2} < A3_{2,0} + A3_{0,2} < -1\times10^{-3} \quad (1)$$

$$|A3_{2,0} - A3_{0,2}| < 1\times10^{-2} \quad (2)$$

$$|A1_{2,0} - A3_{2,0}| < 5\times10^{-3} \text{ and}$$

$$|A1_{0,2} - A3_{0,2}| < 5\times10^{-3} \quad (3)$$

By setting the shapes of the first surface S11 to third surface S13 so as to satisfy these three conditions, aberration corrections of both of the external light HL and the image light GL are preferably performed, so that a good quality image may be obtained.

The interval between the first surface S11 and the third surface S13 of the prism 10 is set to 5 mm or more and 15 mm or less. Further, the inclination angle of the second surface S12 with respect to the first surface S11 is set to 20° or more and 40° or less.

In addition, the fifth surface S21 to eighth surface S28 of the second prism 20 are provided for the adjustment of the optical path or more correct aberration correction.

In the first virtual image display apparatus 100 of the first embodiment, the intermediate image is formed on the optical path from the first prism 10 to the second prism 20, and in the first prism 10, the image light GL, which is totally reflected on two or more surfaces in the order of the third surface S13, the first surface S11 and the second surface S12, is transmitted through the first surface S11 to reach the eyes EY of the observer, and thus it is possible to make the entire optical system small and lightweight by making the first prism 10 thin and realize a bright and high performance display with a wide angle of view. Further, the external light HL may be observed by passing the external light HL through, for example, the first surface S11 and the third surface S13, and the diopter scale is made approximately zero at that time, and thereby reducing the defocus or distortion of the external light HL when the external light HL is observed by a see-through manner, and securing a wide view. In addition, the shape of the first prism 10 in front of eyes becomes the shape along the face of the observer, and thus the center is also close to the face and design is also excellent.

Examples of First Embodiment

Hereinafter, Examples of the perspective projection device which is incorporated in a first virtual image display apparatus according to the invention will be described. The symbols used in each Example are arranged below.
SPH: a pupil
FFSk: a free curved surface (k in the prism=the number of the surface)
SPH: a sphere shape or a flat surface (the surface of a protective glasses)
R: a radius of curvature
T: a distance between surfaces on the axis
Nd: a refractive index with respect to d line of an optical material
Vd: Abbe number with respect to d line of an optical material
TLY: an inclination angle (°) of an optical axis in a lateral cross section (XZ cross section) of a certain surface (TLY may change before and after the certain surface)
DCX: a deviation amount of an optical axis of X axis direction in a lateral cross section (XZ cross section) of a certain surface Example 1

Data of optical surfaces constituting the first and second prisms in a perspective projection device of Example 1 is shown in Table 1. Further, for example, FFS1 means the first surface S11, FFS2 means the second surface S12, and FFS3 means the third surface S13.

TABLE 1

| No | Type | R | T | Nd | Vd |
|---|---|---|---|---|---|
| 1 | SPH | ∞ | 20.00 | | |
| 2 | FFS1 | −93.539 | 5.50 | 1.525 | 55.95 |
| 3 | FFS2 | −52.343 | −5.50 | 1.525 | 55.95 |
| 4 | FFS1 | −93.539 | 9.00 | 1.525 | 55.95 |
| 5 | FFS3 | −93.539 | −12.00 | 1.525 | 55.95 |
| 6 | FFS4 | −7.126 | −2.00 | | |
| 7 | FFS5 | −25.191 | −12.00 | 1.525 | 55.95 |
| 8 | FFS6 | 48.793 | 10.00 | 1.525 | 55.95 |
| 9 | FFS7 | −19.626 | −11.00 | 1.525 | 55.95 |
| 10 | FFS8 | 955.532 | −3.00 | | |
| 11 | SPH | ∞ | −1.60 | 1.458 | 67.82 |
| 12 | Image Surface | | | | |

With respect to optical surfaces in a prism constituting Example 1, an optical axis inclination angle (tilt) TLY and an optical axis deviation amount (decenter) DCX in the lateral cross section are shown in Table 2 below.

TABLE 2

| No | Type | TLY(Before Surface) | DCX(After Surface) | TLY(After Surface) |
|---|---|---|---|---|
| 2 | FFS1 | 0 | 0 | 0 |
| 3 | FFS2 | −28 | 0 | 28 |
| 4 | FFS1 | 0 | 0 | 0 |
| 5 | FFS3 | 0 | 20.367 | −42.19 |
| 6 | FFS4 | 0 | 0 | 0 |
| 7 | FFS5 | 0 | 0 | 0 |
| 8 | FFS6 | −21 | 0 | −21 |
| 9 | FFS7 | −22 | 0 | −22 |
| 10 | FFS8 | 0 | 0 | 0 |

With regard to each of optical surfaces in the prism constituting Example 1, a coefficient $Ak_{m,n}$ which is developed in the polynomial expression of the free curved surface is shown in Table 3 below. Further, in Table 3, symbols m and n mean a variable or a degree in the coefficient $Ak_{m,n}$. Furthermore, a symbol FFSk (k=1 to 8) means a k-th surface among the first to eighth surfaces S11 to S14 and S21 to S24 which are the free curved surfaces. In addition, the coefficient $Ak_{m,n}$ means the coefficient of each term $x^m \cdot y^n$ constituting the polynomial expression which expresses the k-th surface to be an object.

TABLE 3

| m | n | FFS1 | FFS2 | FFS3 | FFS4 |
|---|---|---|---|---|---|
| 2 | 0 | −6.783E−03 | −9.098E−03 | −6.783E−03 | 1.269E−02 |
| 0 | 2 | −5.345E−03 | −9.552E−03 | −5.345E−03 | −7.017E−02 |
| 3 | 0 | 4.276E−05 | −2.399E−05 | 4.276E−05 | 7.330E−03 |
| 1 | 2 | −9.264E−05 | −8.110E−05 | −9.264E−05 | 3.860E−03 |
| 4 | 0 | −1.783E−06 | 1.365E−06 | −1.783E−06 | 1.279E−03 |
| 2 | 2 | −2.447E−06 | −3.951E−05 | −2.447E−06 | 3.043E−03 |
| 0 | 4 | −1.120E−06 | −1.496E−06 | −1.120E−06 | 1.010E−03 |

| m | n | FFS5 | FFS6 | FFS7 | FFS8 |
|---|---|---|---|---|---|
| 2 | 0 | −2.737E−02 | 1.107E−02 | −1.520E−02 | −1.011E−03 |
| 0 | 2 | −1.985E−02 | 1.025E−02 | −2.548E−02 | 5.233E−04 |
| 3 | 0 | 7.723E−03 | 7.736E−05 | −2.485E−04 | 5.481E−04 |
| 1 | 2 | 1.182E−03 | 3.478E−05 | −4.576E−04 | −7.339E−04 |
| 4 | 0 | 8.934E−04 | −3.599E−05 | −1.461E−05 | −2.227E−03 |
| 2 | 2 | 3.557E−03 | 1.386E−05 | 7.156E−06 | −6.654E−04 |
| 0 | 4 | −7.538E−03 | −1.098E−04 | −8.726E−06 | −2.124E−03 |

In the above Table 3 and tables below, the number after E means an exponential part of decimal number, for example, "−6.511E−03" means "−6.511×10⁻⁰³".

Figure 5:
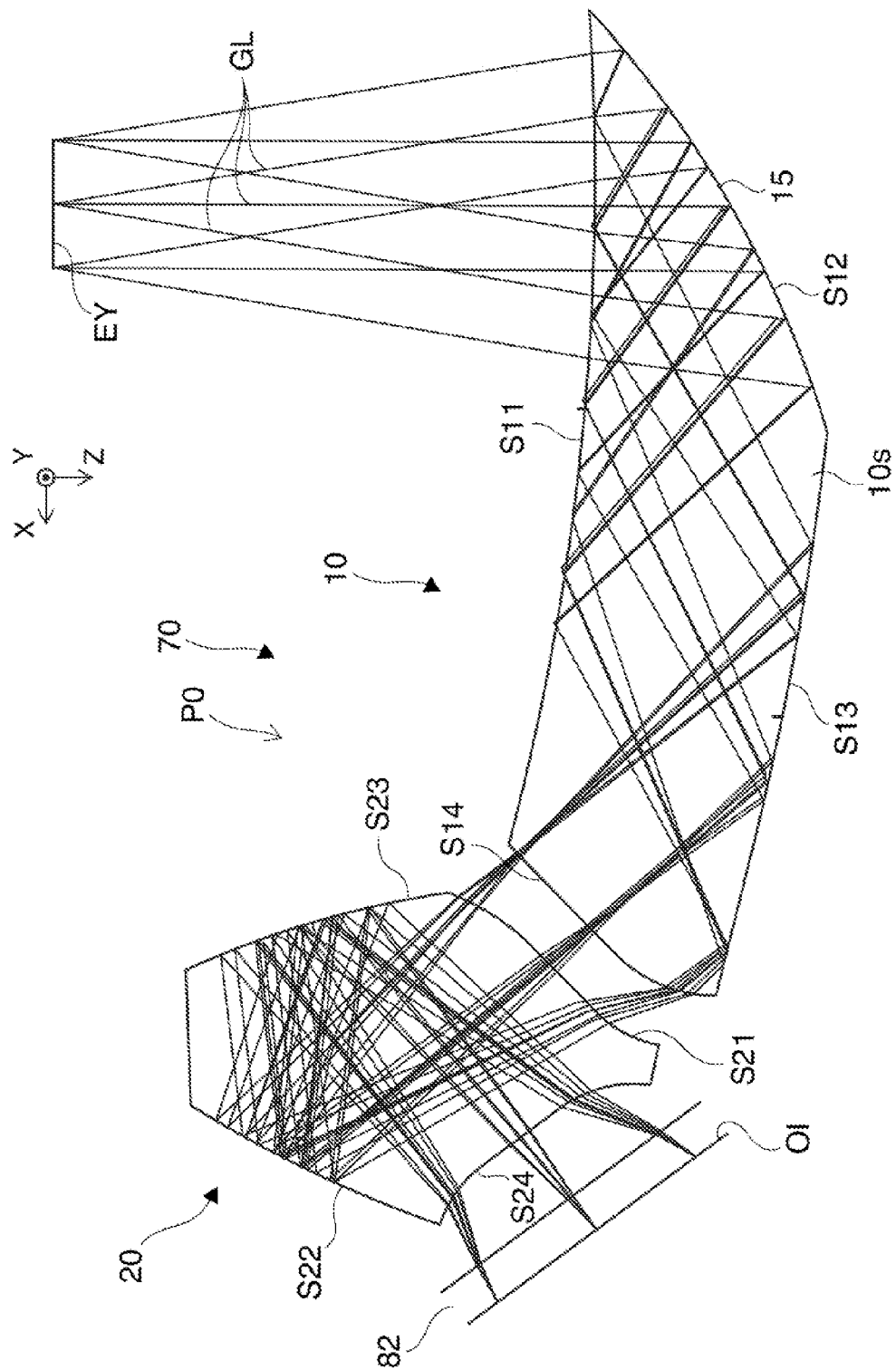
FIG. 5 is a diagram illustrating an optical system of Example 1.
Figure 6A:
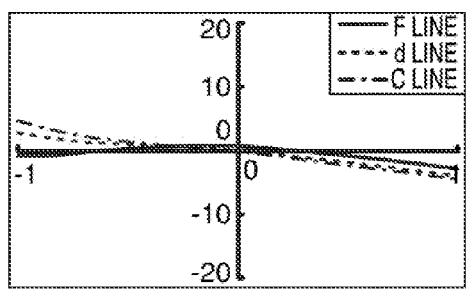
FIG. 6A to 6F are diagrams illustrating the aberration of the optical system of Example 1.
Figure 6D:
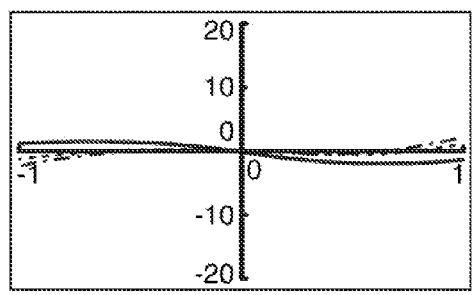
Figure 6B:
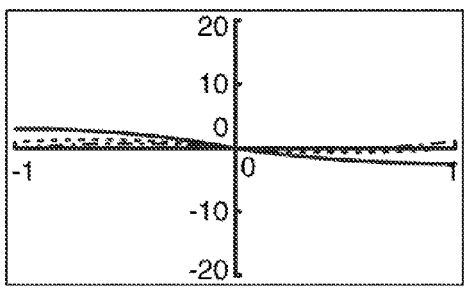
Figure 6E:
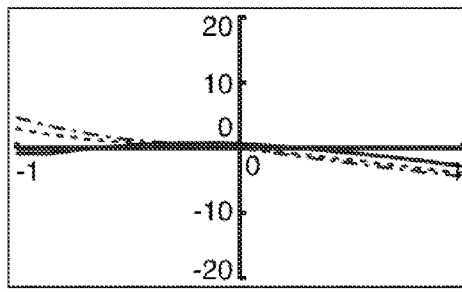
Figure 6C:
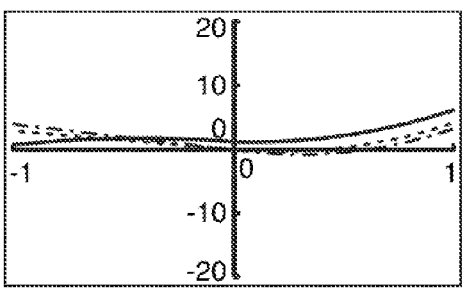
Figure 6F:
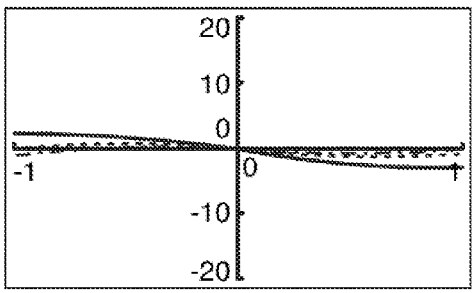

FIG. 5 is a cross-sectional view of the perspective projection device 70 of Example 1. However, the light flux is shown not only on the reference surface SR, but in Y direction deviated from the reference surface SR. The first prism 10 in the perspective projection device 70 has a first surface S11 having a weak negative refractive power, a second surface S12 having a relatively strong positive refractive power, a third surface S13 having a relatively weak positive refractive power and a fourth surface S14 having a relatively strong positive refractive power. The second prism 20 has a fifth surface S21 having a relatively strong positive refractive power, a sixth surface S22 having a relatively weak positive refractive power, a seventh surface S23 having a relatively strong positive refractive power and an eighth surface S24 having a relatively strong negative refractive power. If describing the detailed specification of the optical system of Example 1, the horizontal angle of view is 20.1°, the vertical angle of view is 11.4°, the size of the display region of the image display element is 9.22×5.18 mm, the diameter of the pupil is 5 mm and the focal distance is approximately 26 mm.

Figure 7A:
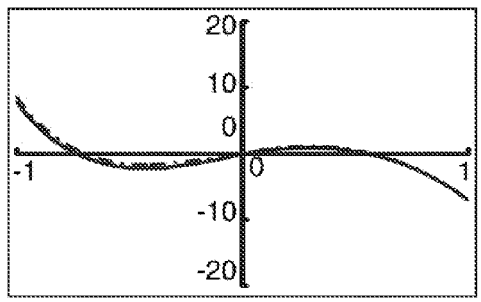
FIG. 7A to 7F are diagrams illustrating the aberration of the optical system of Example 1.
Figure 7D:
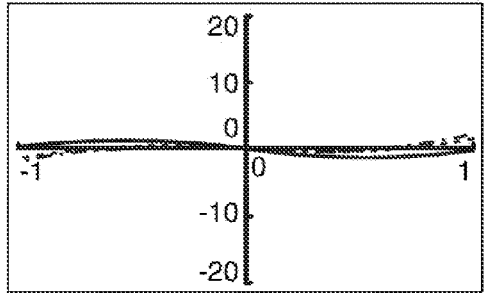
Figure 7B:
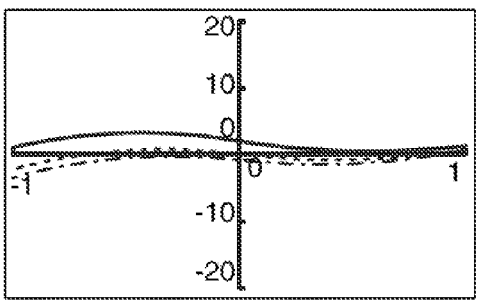
Figure 7E:
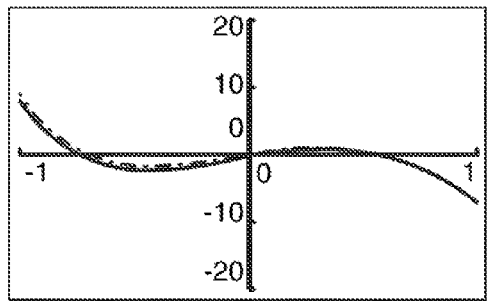
Figure 7C:
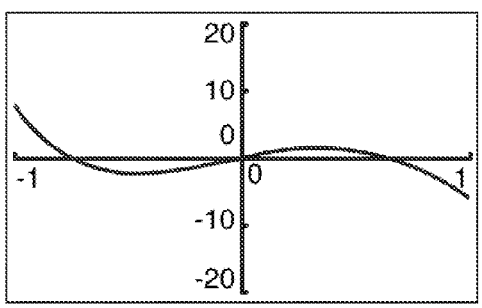
Figure 7F:
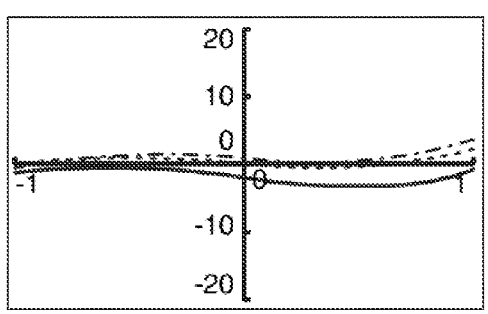

FIGS. 6A to 6F and FIGS. 7A to 7F show aberrations of example 1. The horizontal axis shows the position in a pupil, and the vertical axis shows an aberration amount. Specifically, FIGS. 6A and 6B respectively show aberrations in X direction and Y direction in an azimuth of 10° in X direction and 5.7° in Y direction in unit of micron, FIGS. 6C and 6D respectively show aberrations in X direction and Y direction in an azimuth of 0.0° in X direction and 5.7° in Y direction, and FIGS. 6E and 6F respectively show aberrations in X direction and Y direction in an azimuth of −10° in X direction and 5.7° in Y direction. FIGS. 7A and 7B respectively show aberrations in X direction and Y direction in an azimuth of 10° in X direction and 0.0° in Y direction, FIGS. 7C and 7D respectively show aberrations in X direction and Y direction in an azimuth of 0.0° in X direction and 0.0° in Y direction, and FIGS. 7E and 7F respectively show aberrations in X direction and Y direction in an azimuth of −10° in X direction and 0.0° in Y direction. In addition, the shown aberration amounts are aberration amounts in an image surface of the image display element in the case where the light beam is inversely progressed, for convenience.

Example 2

Data of optical surfaces constituting the first and second prisms in a perspective projection device of Example 2 is shown in Table 4.

TABLE 4

| No | Type | R | T | Nd | Vd |
|---|---|---|---|---|---|
| 1 | SPH | ∞ | 20.00 | | |
| 2 | FFS1 | −72.491 | 5.30 | 1.525 | 55.95 |
| 3 | FFS2 | −52.343 | −5.30 | 1.525 | 55.95 |
| 4 | FFS1 | −72.491 | 9.00 | 1.525 | 55.95 |
| 5 | FFS3 | −72.491 | −8.00 | 1.525 | 55.95 |
| 6 | FFS4 | 18.837 | −2.00 | | |
| 7 | FFS5 | 50.830 | −19.00 | 1.525 | 55.95 |
| 8 | FFS6 | 48.055 | 11.00 | 1.525 | 55.95 |
| 9 | FFS7 | −25.309 | −13.00 | 1.525 | 55.95 |
| 10 | FFS8 | −7.981 | −3.00 | | |
| 11 | SPH | ∞ | −1.60 | 1.458 | 67.82 |
| 12 | Image Surface | | | | |

With regard to optical surfaces in a prism constituting Example 2, an optical axis inclination angle (tilt) TLY and an optical axis deviation amount (decenter) DCX in the lateral cross section are shown in Table 5 below.

TABLE 5

| | | Tilt and decenter of a surface | | |
|---|---|---|---|---|
| No | Type | TLY(Before Surface) | DCX(After Surface) | TLY(After Surface) |
| 2 | FFS1 | 0 | 0 | 0 |
| 3 | FFS2 | −27 | 0 | 27 |
| 4 | FFS1 | 0 | 0 | 0 |
| 5 | FFS3 | 0 | 19.294 | −32.41 |
| 6 | FFS4 | 0 | 0 | 0 |
| 7 | FFS5 | 0 | 0 | 0 |
| 8 | FFS6 | 23 | 0 | 23 |
| 9 | FFS7 | 24 | 0 | 24 |
| 10 | FFS8 | 0 | 0 | 0 |

With regard to each of optical surfaces in the prism constituting Example 2, a coefficient which is developed in the polynomial expression of the free curved surface is shown in Table 6 below. Further, in Table 6, symbols m and n mean a variable or a degree in the coefficient $Ak_{m,n}$. Furthermore, a symbol FFSk (k=1 to 8) means a k-th surface among the first to eighth surfaces S11 to S14 and S21 to S24 which are the free curved surfaces.

TABLE 6

| m | n | FFS1 | FFS2 | FFS3 | FFS4 |
|---|---|---|---|---|---|
| 2 | 0 | −4.253E−03 | −9.662E−03 | −4.253E−03 | −2.219E−01 |
| 0 | 2 | −6.897E−03 | −9.552E−03 | −6.897E−03 | 2.654E−02 |
| 3 | 0 | −6.364E−06 | −1.942E−05 | −6.364E−06 | −2.484E−02 |
| 1 | 2 | 2.116E−04 | 1.687E−04 | 2.116E−04 | 1.164E−03 |
| 4 | 0 | −1.874E−06 | −2.888E−06 | −1.874E−06 | −1.491E−03 |
| 2 | 2 | 6.279E−06 | −2.247E−06 | 6.279E−06 | 1.417E−04 |
| 0 | 4 | −1.403E−06 | −4.500E−07 | −1.403E−06 | −9.344E−04 |

| m | n | FFS5 | FFS6 | FFS7 | FFS8 |
|---|---|---|---|---|---|
| 2 | 0 | −2.619E−01 | 9.807E−03 | −1.147E−02 | 1.912E−02 |
| 0 | 2 | 9.837E−03 | 1.040E−02 | −1.976E−02 | −6.265E−02 |
| 3 | 0 | −2.355E−03 | −1.162E−04 | 4.586E−05 | −2.253E−03 |
| 1 | 2 | −5.089E−03 | −9.910E−05 | 6.582E−04 | 1.063E−03 |
| 4 | 0 | 4.022E−03 | 1.674E−05 | 2.477E−05 | −4.367E−06 |
| 2 | 2 | −1.214E−04 | −3.752E−05 | −4.655E−05 | −5.860E−04 |
| 0 | 4 | 2.236E−03 | −1.657E−05 | 1.447E−06 | −4.977E−03 |

Figure 8:
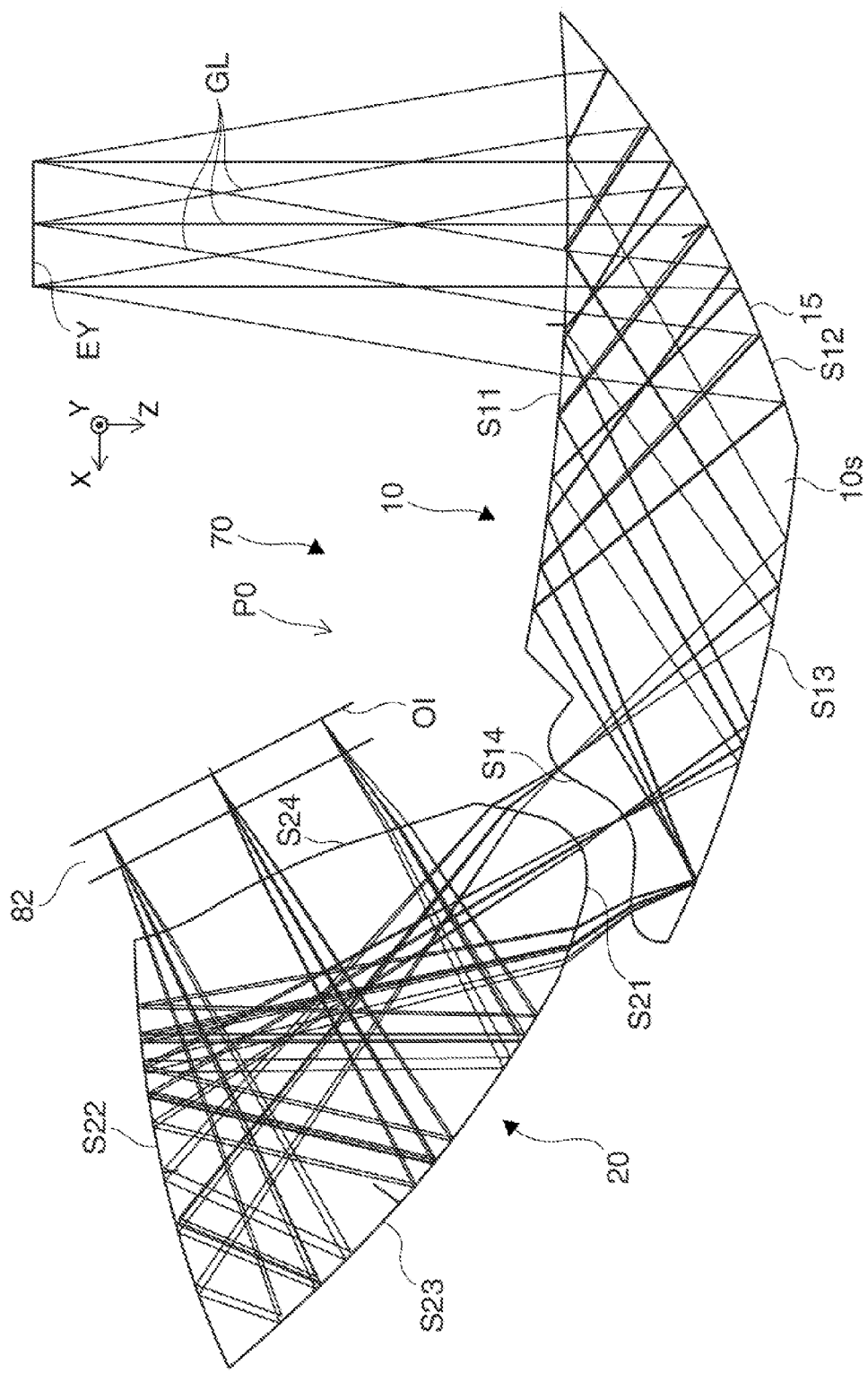
FIG. 8 is a diagram illustrating an optical system of Example 2.
Figure 9A:
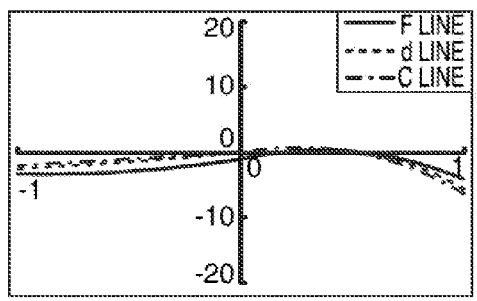
FIG. 9A to 9F are diagrams illustrating the aberration of the optical system of Example 2.
Figure 9D:
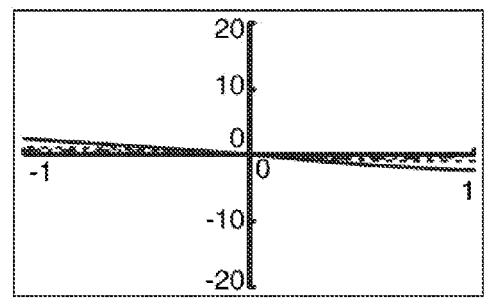
Figure 9B:
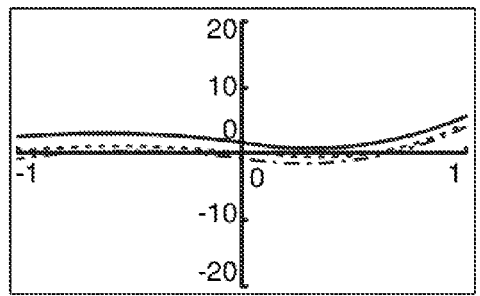
Figure 9E:
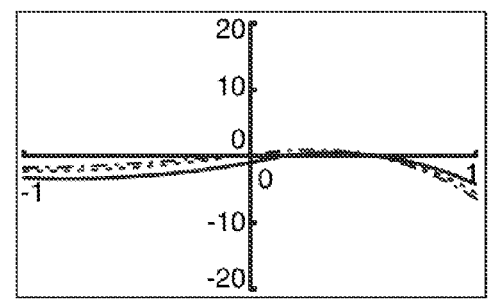
Figure 9C:
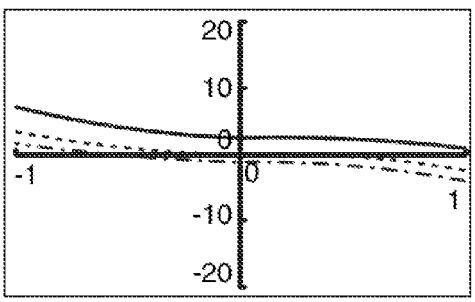
Figure 9F:
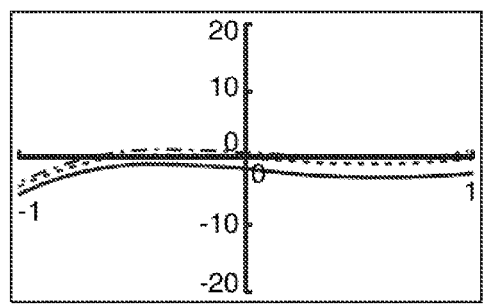

FIG. 8 is a cross-sectional view of the perspective projection device 70 of Example 2. The first prism 10 in the perspective projection device 70 has a first surface S11 having a weak negative refractive power, a second surface S12 having a relatively strong positive refractive power, a third surface S13 having a relatively weak positive refractive power and a fourth surface S14 having a relatively strong negative refractive power. The second prism 20 has a fifth surface S21 having a relatively strong positive refractive power, a sixth surface S22 having a relatively weak positive refractive power, a seventh surface S23 having a relatively weak positive refractive power and an eighth surface S24 having a relatively weak positive refractive power. If describing the detailed specification of the optical system of Example 2, the horizontal angle of view is 20.1°, the vertical angle of view is 11.4°, the size of the display region of the image display element is 9.22×5.18 mm, the diameter of the pupil is 5 mm and the focal distance is approximately 26 mm.

Figure 10A:
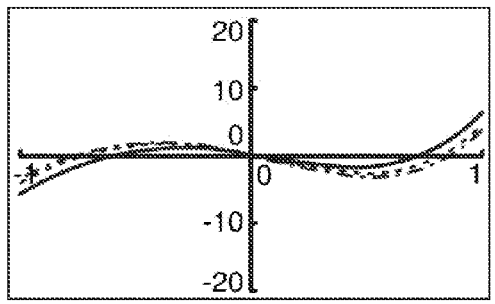
FIG. 10A to 10F are diagrams illustrating the aberration of the optical system of Example 2.
Figure 10D:
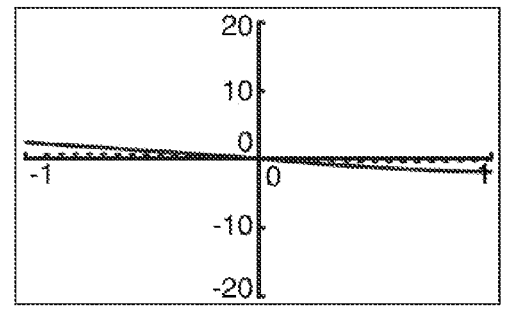
Figure 10B:
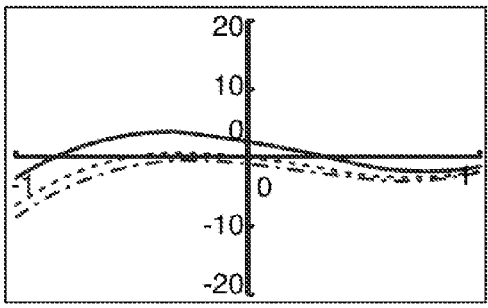
Figure 10E:
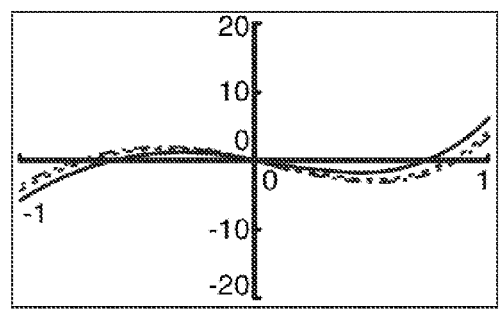
Figure 10C:
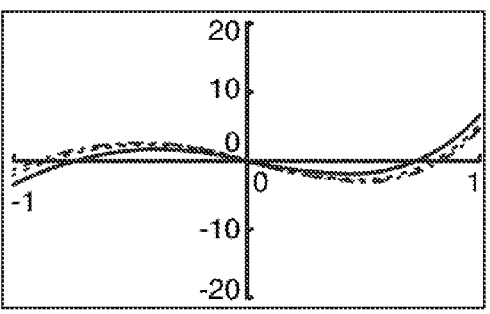
Figure 10F:
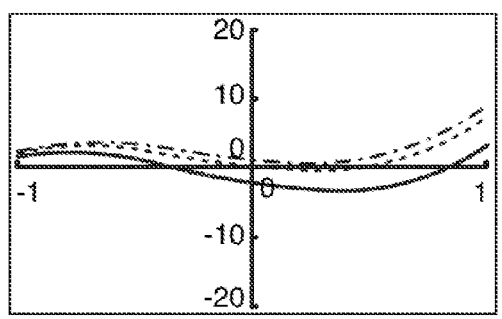

FIGS. 9A to 9F and FIGS. 10A to 10F show aberrations of example 2. Specifically, FIGS. 9A and 9B respectively show aberrations in X direction and Y direction in an azimuth of 10° in X direction and 5.7° in Y direction, FIGS. 9C and 9D respectively show aberrations in X direction and Y direction in an azimuth of 0.0° in X direction and 5.7° in Y direction, and FIGS. 9E and 9F respectively show aberrations in X direction and Y direction in an azimuth of −10° in X direction and 5.7° in Y direction. FIGS. 10A and 10B respectively show aberrations in X direction and Y direction in an azimuth of 10° in X direction and 0.0° in Y direction, FIGS. 10C and 10D respectively show aberrations in X direction and Y direction in an azimuth of 0.0° in X direction and 0.0° in Y direction, and FIGS. 10E and 10F respectively show aberrations in X direction and Y direction in an azimuth of −10° in X direction and 0.0° in Y direction.

Example 3

Data of optical surfaces constituting the first and second prisms in a perspective projection device of Example 3 is shown in Table 7.

TABLE 7

| No | Type | R | T | Nd | Vd |
|---|---|---|---|---|---|
| 1 | SPH | ∞ | 20.00 | | |
| 2 | FFS1 | −465.716 | 5.20 | 1.525 | 55.95 |
| 3 | FFS2 | −70.636 | −5.20 | 1.525 | 55.95 |
| 4 | FFS1 | −465.716 | 9.00 | 1.525 | 55.95 |
| 5 | FFS3 | −465.716 | −11.00 | 1.525 | 55.95 |
| 6 | FFS4 | −10.727 | −2.00 | | |
| 7 | FFS5 | −15.211 | −19.00 | 1.525 | 55.95 |
| 8 | FFS6 | 53.194 | 21.00 | 1.525 | 55.95 |
| 9 | FFS7 | −28.725 | −17.00 | 1.525 | 55.95 |
| 10 | FFS8 | −8.322 | −3.00 | | |
| 11 | SPH | ∞ | −1.60 | 1.458 | 67.82 |
| 12 | Image Surface | | | | |

With regard to optical surfaces in a prism constituting Example 3, an optical axis inclination angle (tilt) TLY and an optical axis deviation amount (decenter) DCX in the lateral cross section are shown in Table 8 below.

TABLE 8

| No | Type | TLY(Before Surface) | DCX(After Surface) | TLY(After Surface) |
|---|---|---|---|---|
| 2 | FFS1 | 0 | 0 | 0 |
| 3 | FFS2 | −28 | 0 | 28 |
| 4 | FFS1 | 0 | 0 | 0 |
| 5 | FFS3 | 0 | 20.667 | −48.12 |
| 6 | FFS4 | 0 | 0 | 0 |
| 7 | FFS5 | 0 | 0 | 0 |
| 8 | FFS6 | 24 | 0 | 24 |
| 9 | FFS7 | 20 | 0 | 20 |
| 10 | FFS8 | 0 | 0 | 0 |

With regard to each of optical surfaces in the prism constituting Example 3, a coefficient which is developed in the polynomial expression of the free curved surface is shown in Table 9 below. Further, in Table 9, symbols m and n mean a variable or a degree in the coefficient $Ak_{m,n}$. Furthermore, a symbol FFSk (k=1 to 8) means a k-th surface among the first to eighth surfaces S11 to S14 and S21 to S24 which are the free curved surfaces.

TABLE 9

| m | n | FFS1 | FFS2 | FFS3 | FFS4 |
|---|---|---|---|---|---|
| 2 | 0 | −2.566E−03 | −9.029E−03 | −2.566E−03 | 5.809E−02 |
| 0 | 2 | −1.074E−03 | −7.079E−03 | −1.074E−03 | −4.661E−02 |
| 3 | 0 | −2.231E−05 | 6.366E−06 | −2.231E−05 | 3.317E−03 |
| 1 | 2 | −2.822E−04 | −2.354E−04 | −2.822E−04 | 1.206E−02 |
| 4 | 0 | 7.767E−07 | −1.640E−06 | 7.767E−07 | −8.201E−04 |
| 2 | 2 | −8.936E−06 | −3.016E−06 | −8.936E−06 | −1.365E−03 |
| 0 | 4 | −1.519E−06 | −7.711E−06 | −1.519E−06 | −2.892E−04 |

TABLE 9-continued

| m | n | FFS5 | FFS6 | FFS7 | FFS8 |
|---|---|---|---|---|---|
| 2 | 0 | −9.543E−02 | 7.508E−03 | −1.130E−02 | −1.163E−02 |
| 0 | 2 | −3.287E−02 | 9.400E−03 | −1.741E−02 | −6.008E−02 |
| 3 | 0 | 2.698E−03 | 2.591E−05 | 2.707E−05 | 1.250E−03 |
| 1 | 2 | −6.920E−03 | 1.397E−04 | −9.938E−05 | 1.037E−02 |
| 4 | 0 | 1.158E−03 | −4.820E−06 | 4.950E−06 | 9.670E−05 |
| 2 | 2 | 9.401E−04 | −2.318E−05 | 6.743E−06 | 2.353E−03 |
| 0 | 4 | −2.456E−03 | −2.373E−05 | 4.273E−06 | −1.620E−03 |

Figure 11:
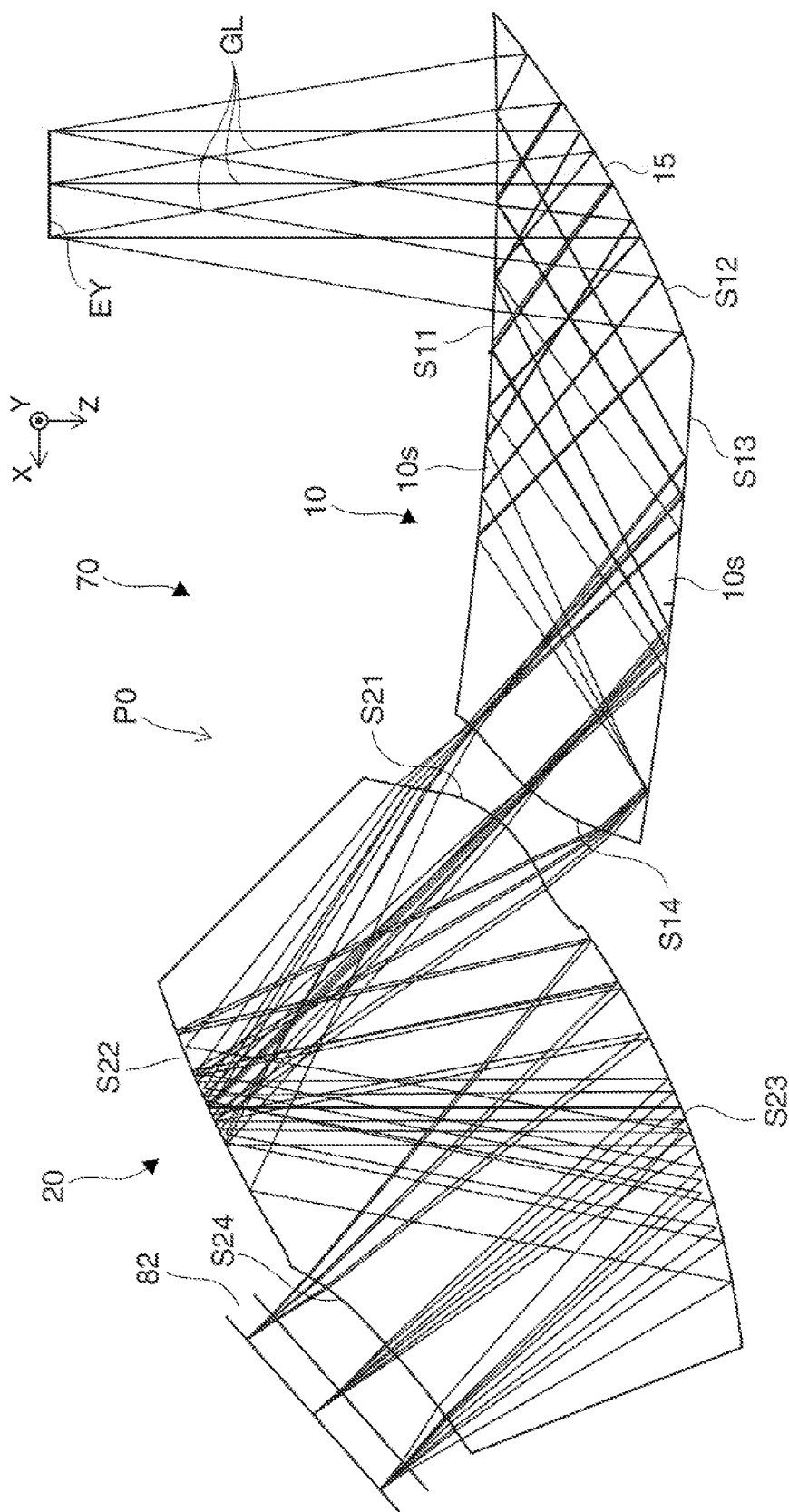
FIG. 11 is a diagram illustrating an optical system of Example 3.
Figure 12A:
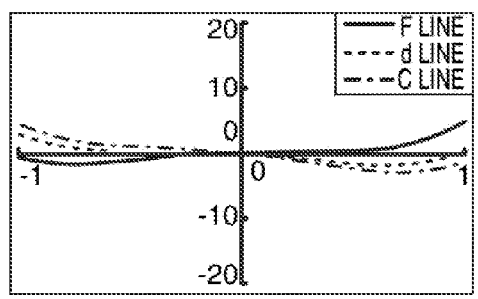
FIG. 12A to 12F are diagrams illustrating an aberration of the optical system of Example 3.
Figure 12D:
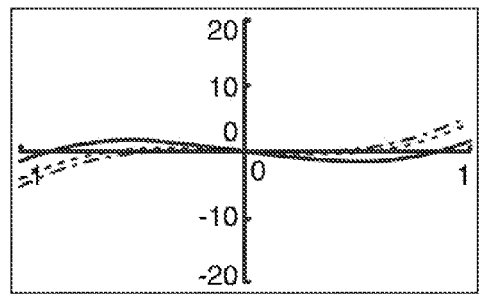
Figure 12B:
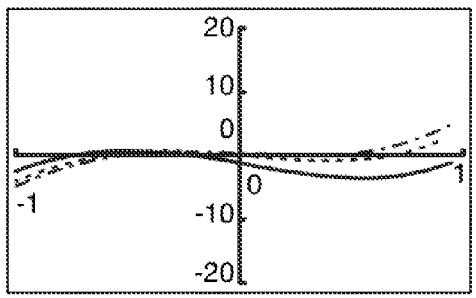
Figure 12E:
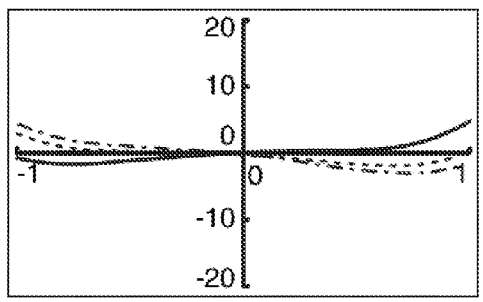
Figure 12C:
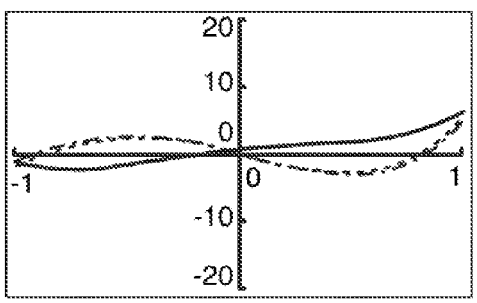
Figure 12F:
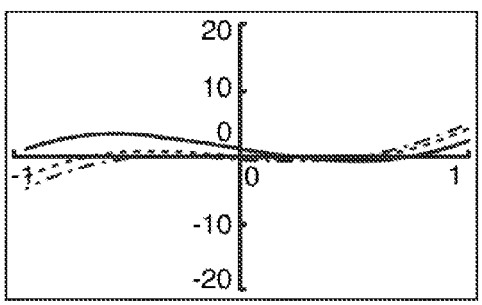

FIG. 11 is a cross-sectional view of the perspective projection device 70 of Example 3. The first prism 10 in the perspective projection device 70 has a first surface S11 having a weak negative refractive power, a second surface S12 having a relatively strong positive refractive power, a third surface S13 having a relatively weak positive refractive power and a fourth surface S14 having a relatively strong positive refractive power. The second prism 20 has a fifth surface S21 having a relatively strong positive refractive power, a sixth surface S22 having a relatively weak positive refractive power, a seventh surface S23 having a relatively weak positive refractive power and an eighth surface S24 having a relatively weak negative refractive power. If describing the detailed specification of the optical system of Example 3, the horizontal angle of view is 20.1°, the vertical angle of view is 11.4°, the size of the display region of the image display element is 9.22×5.18 mm, the diameter of the pupil is 5 mm and the focal distance is approximately 26 mm.

Figure 13A:
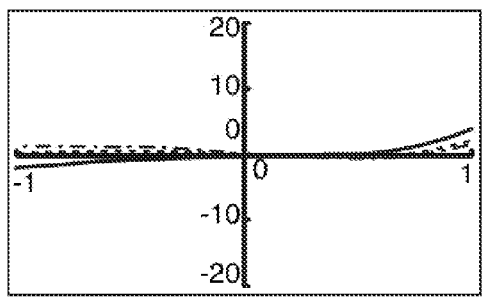
FIG. 13A to 13F are diagrams illustrating an aberration of the optical system of Example 3.
Figure 13D:
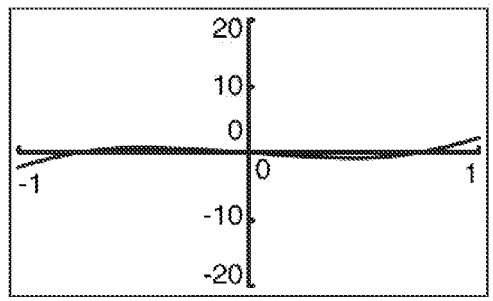
Figure 13B:
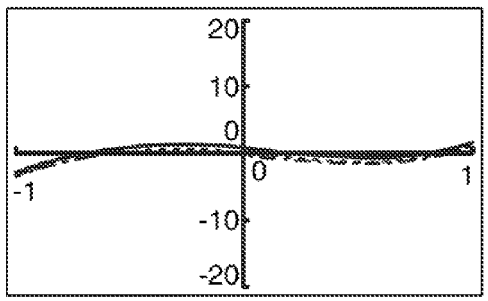
Figure 13E:
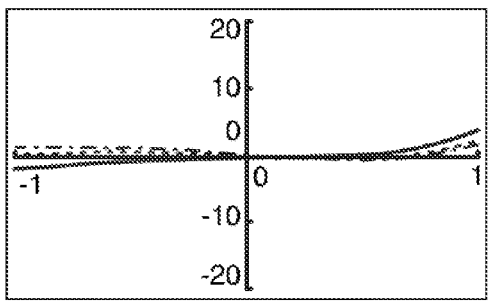
Figure 13C:
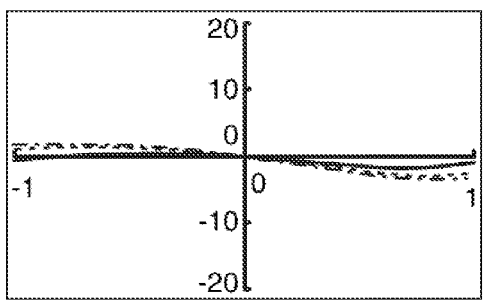
Figure 13F:
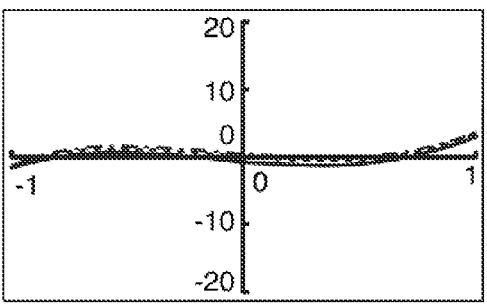

FIGS. 12A to 12F and FIGS. 13A to 13F show aberrations of example 3. Specifically, FIGS. 12A and 12B respectively show aberrations in X direction and Y direction in an azimuth of 10° in X direction and 5.7° in Y direction, FIGS. 12C and 12D respectively show aberrations in X direction and Y direction in an azimuth of 0.0° in X direction and 5.7° in Y direction, and FIGS. 12E and 12F respectively show aberrations in X direction and Y direction in an azimuth of −10° in X direction and 5.7° in Y direction. FIGS. 13A and 13B respectively show aberrations in X direction and Y direction in an azimuth of 10° in X direction and 0.0° in Y direction, FIGS. 13C and 13D respectively show aberrations in X direction and Y direction in an azimuth of 0.0° in X direction and 0.0° in Y direction, and FIGS. 13E and 13F respectively show aberrations in X direction and Y direction in an azimuth of −10° in X direction and 0.0° in Y direction.

Example 4

Data of optical surfaces constituting the first and second prisms in a perspective projection device of Example 4 is shown in Table 10.

TABLE 10

| No | Type | R | T | Nd | Vd |
|---|---|---|---|---|---|
| 1 | SPH | ∞ | 20.00 | | |
| 2 | FFS1 | −298.218 | 5.20 | 1.525 | 55.95 |
| 3 | FFS2 | −57.402 | −5.20 | 1.525 | 55.95 |
| 4 | FFS1 | −298.218 | 9.00 | 1.525 | 55.95 |
| 5 | FFS3 | −298.218 | −9.00 | 1.525 | 55.95 |
| 6 | FFS4 | −9.347 | −2.00 | | |
| 7 | FFS5 | −13.667 | −17.00 | 1.525 | 55.95 |
| 8 | FFS6 | 41.835 | 18.00 | 1.525 | 55.95 |
| 9 | FFS7 | −25.971 | −12.00 | 1.525 | 55.95 |
| 10 | FFS8 | −8.383 | −3.00 | | |
| 11 | SPH | ∞ | −1.60 | 1.458 | 67.82 |
| 12 | Image Surface | | | | |

With regard to optical surfaces in a prism constituting Example 4, an optical axis inclination angle (tilt) TLY and an optical axis deviation amount (decenter) DCX in the lateral cross section are shown in Table 11 below.

TABLE 11

| No | Type | TLY(Before Surface) | DCX(After Surface) | TLY(After Surface) |
|---|---|---|---|---|
| 2 | FFS1 | 0 | 0 | 0 |
| 3 | FFS2 | −28 | 0 | 28 |
| 4 | FFS1 | 0 | 0 | 0 |
| 5 | FFS3 | 0 | 16.874 | −51.1 |
| 6 | FFS4 | 0 | 0 | 0 |
| 7 | FFS5 | 0 | 0 | 0 |
| 8 | FFS6 | −26 | 0 | −26 |
| 9 | FFS7 | 22 | 0 | 22 |
| 10 | FFS8 | 0 | 0 | 0 |

With regard to each of optical surfaces in the prism constituting Example 4, a coefficient which is developed in the polynomial expression of the free curved surface is shown in Table 12 below. Further, in Table 12, symbols m and n mean a variable or a degree in the coefficient $Ak_{m,n}$. Furthermore, a symbol FFSk (k=1 to 8) means a k-th surface among the first to eighth surfaces S11 to S14 and S21 to S24 which are the free curved surfaces.

TABLE 12

| m | n | FFS1 | FFS2 | FFS3 | FFS4 |
|---|---|---|---|---|---|
| 2 | 0 | −2.644E−03 | −9.209E−03 | −2.644E−03 | −1.852E−02 |
| 0 | 2 | −1.677E−03 | −8.710E−03 | −1.677E−03 | −5.349E−02 |
| 3 | 0 | 3.920E−06 | −1.807E−05 | 3.920E−06 | −5.324E−04 |
| 1 | 2 | −2.192E−04 | 2.973E−05 | −2.192E−04 | −9.065E−03 |
| 4 | 0 | 3.150E−07 | −2.251E−05 | 3.150E−07 | 2.407E−03 |
| 2 | 2 | −5.820E−06 | −1.361E−06 | −5.820E−06 | 1.200E−03 |
| 0 | 4 | −1.937E−05 | −9.253E−06 | −1.937E−05 | −7.585E−04 |

| m | n | FFS5 | FFS6 | FFS7 | FFS8 |
|---|---|---|---|---|---|
| 2 | 0 | −1.179E−01 | 8.088E−03 | −1.254E−02 | −3.407E−02 |
| 0 | 2 | −3.658E−02 | 1.195E−02 | −1.925E−02 | −5.964E−02 |
| 3 | 0 | 7.169E−04 | −1.035E−05 | −2.363E−04 | −3.925E−03 |
| 1 | 2 | −8.876E−04 | 1.791E−04 | 1.218E−03 | −9.235E−03 |
| 4 | 0 | 2.212E−03 | −6.824E−07 | 1.407E−05 | 4.103E−04 |

TABLE 12-continued

| 2 | 2 | 1.131E−03 | −2.936E−05 | −9.347E−06 | 2.240E−03 |
|---|---|---|---|---|---|
| 0 | 4 | −2.920E−04 | −5.652E−06 | 1.454E−05 | −3.056E−03 |

Figure 14:
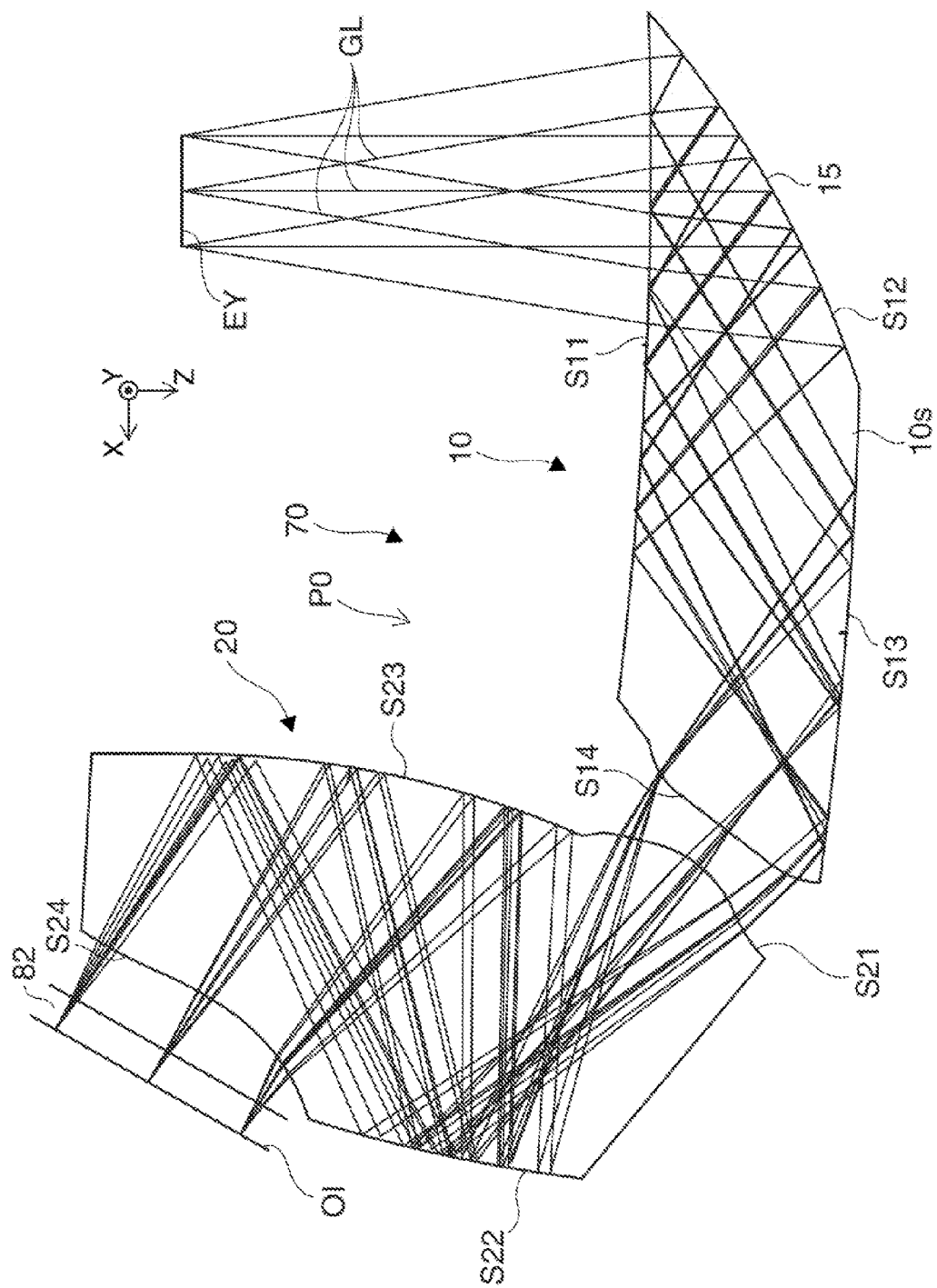
FIG. 14 is a diagram illustrating an optical system of Example 4.
Figure 15A:
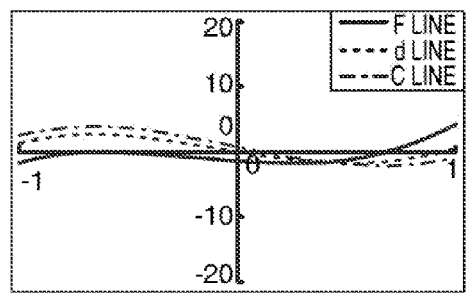
FIG. 15A to 15F are diagrams illustrating an aberration of the optical system of Example 4.
Figure 15D:
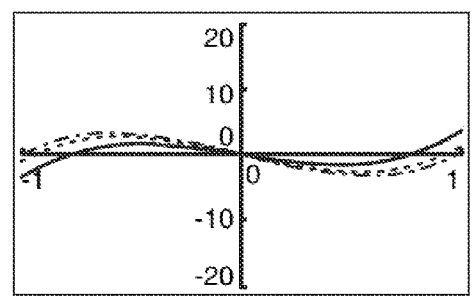
Figure 15B:
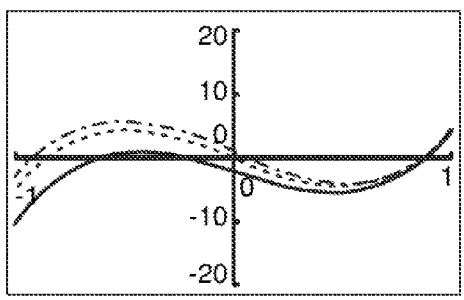
Figure 15E:
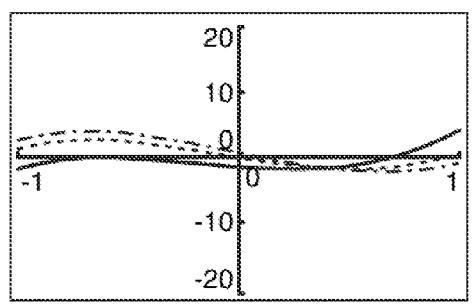
Figure 15C:
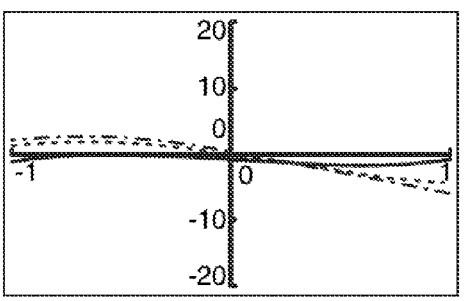
Figure 15F:
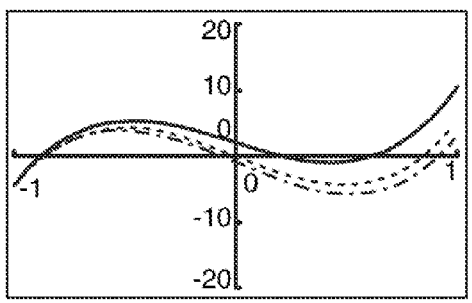

FIG. 14 is a cross-sectional view of the perspective projection device 70 of Example 4. The first prism 10 in the perspective projection device 70 has a first surface S11 having a weak negative refractive power, a second surface S12 having a relatively strong positive refractive power, a third surface S13 having a relatively weak positive refractive power and a fourth surface S14 having a relatively weak negative refractive power. The second prism 20 has a fifth surface S21 having a relatively strong positive refractive power, a sixth surface S22 having a relatively weak positive refractive power, a seventh surface S23 having a relatively weak positive refractive power and an eighth surface S24 having a relatively weak negative refractive power. If describing the detailed specification of the optical system of Example 4, the horizontal angle of view is 20.1°, the vertical angle of view is 11.4°, the size of the display region of the image display element is 9.22×5.18 mm, the diameter of the pupil is 5 mm and the focal distance is approximately 26 mm.

Figure 16A:
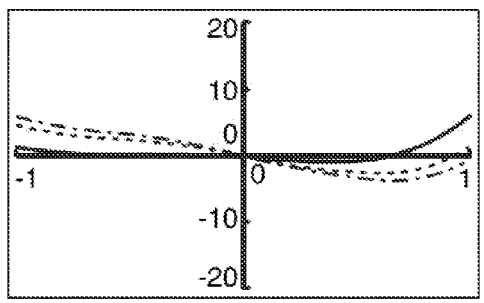
FIG. 16A to 16F are diagrams illustrating an aberration of the optical system of Example 4.
Figure 16D:
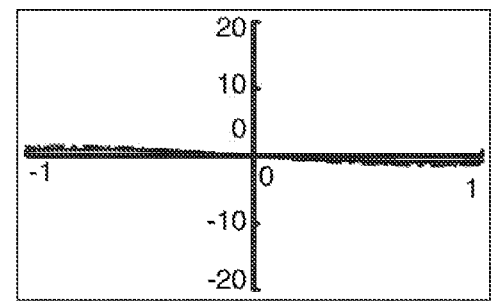
Figure 16B:
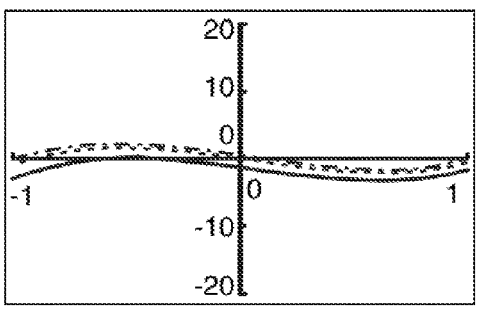
Figure 16E:
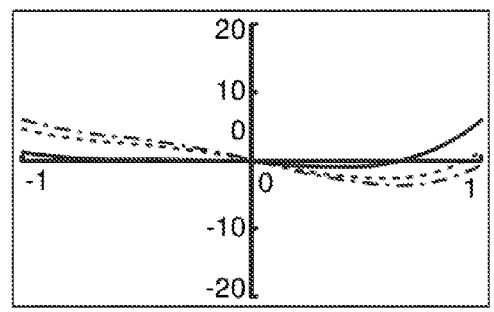
Figure 16C:
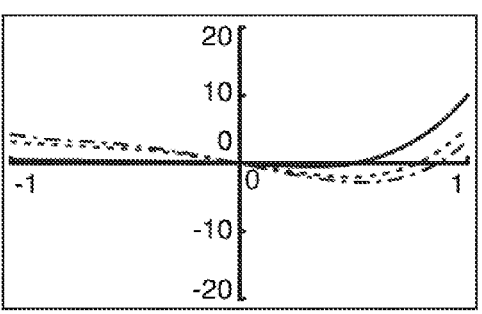
Figure 16F:
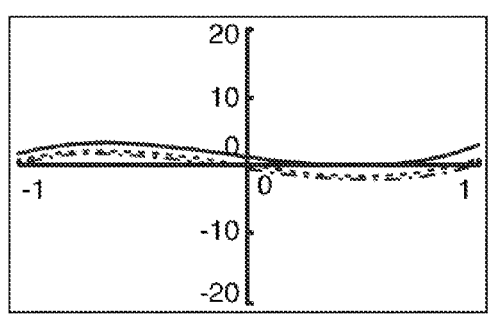

FIGS. 15A to 15F and FIGS. 16A to 16F show aberrations of example 4. Specifically, FIGS. 15A and 15B respectively show aberrations in X direction and Y direction in an azimuth of 10° in X direction and 5.7° in Y direction, FIGS. 15C and 15D respectively show aberrations in X direction and Y direction in an azimuth of 0.0° in X direction and 5.7° in Y direction, and FIGS. 15E and 15F respectively show aberrations in X direction and Y direction in an azimuth of −10° in X direction and 5.7° in Y direction. FIGS. 16A and 16B respectively show aberrations in X direction and Y direction in an azimuth of 10° in X direction and 0.0° in Y direction, FIGS. 16C and 16D respectively show aberrations in X direction and Y direction in an azimuth of 0.0° in X direction and 0.0° in Y direction, and FIGS. 16E and 16F respectively show aberrations in X direction and Y direction in an azimuth of −10° in X direction and 0.0° in Y direction.

In Table 13 below, with regard to each of Examples 1 to 4, numerical data relating to conditional expressions 1 to 3 is arranged.

TABLE 13

| Coefficient Value or Condition Value | | Example 1 | Example 2 | Example 3 | Example 4 |
|---|---|---|---|---|---|
| $A1_{2,0}$ | | −6.783E−03 | −4.253E−03 | −2.566E−03 | −2.644E−03 |
| $A1_{0,2}$ | | −5.345E−03 | −6.897E−03 | −1.074E−03 | −1.677E−03 |
| $A3_{2,0}$ | | −6.783E−03 | −4.253E−03 | −2.566E−03 | −2.644E−03 |
| $A3_{0,2}$ | | −5.345E−03 | −6.897E−03 | −1.074E−03 | −1.677E−03 |
| Conditional expression (1) | $A1_{2,0} + A1_{0,2}$ | −1.213E−02 | −1.115E−02 | −3.639E−03 | −4.321E−03 |
| Conditional expression (1) | $A3_{2,0} + A3_{0,2}$ | −1.213E−02 | −1.115E−02 | −3.639E−03 | −4.321E−03 |
| Conditional expression (2) | $A1_{2,0} - A1_{0,2}$ | −1.438E−03 | 2.644E−03 | −1.492E−03 | −9.674E−04 |
| Conditional expression (3) | $A1_{2,0} - A3_{2,0}$ | 0.000E+00 | 0.000E+00 | 0.000E+00 | 0.000E+00 |
| Conditional expression (3) | $A1_{0,2} - A3_{0,2}$ | 0.000E+00 | 0.000E+00 | 0.000E+00 | 0.000E+00 |

In addition, in Table 14, with regard to each of Examples 1 to 4, numerical data relating to an interval between the first surface S11 and the third surface S13 and an inclination angle of the second surface S12 with respect to the first surface S11 is arranged.

TABLE 14

|  | Example 1 | Example 2 | Example 3 | Example 4 |
|---|---|---|---|---|
| Interval between S11 and S13 (mm) | 9.00 | 9.00 | 9.00 | 9.00 |
| Inclination angle (°) of S12 to S11 | 28 | 27 | 28 | 28 |

In addition, the conditional expression (3) gives an effect to a diopter scale of the prism with respect to an external light, and if the thickness of the prism is T and the refractive index is N, the diopter scale Dx in the x axis direction and the diopter scale Dy in the y axis direction on the optical axis of the prism are given as follows:

$$Dx = 2000(N-1)(A1_{2,0} - A3_{2,0} + (2T(N-1)/N) \times A1_{2,0} \times A3_{2,0})$$

$$Dy = 2000(N-1)(A1_{0,2} - A3_{0,2} + (2T(N-1)/N) \times A1_{0,2} \times A3_{0,2})$$

Based on the above expressions, in Table 15 below, numerical data relating to a diopter scale with regard to each of Examples 1 to 4 is arranged.

TABLE 15

|  | Example 1 | Example 2 | Example 3 | Example 4 |
|---|---|---|---|---|
| Diopter Scale Dx (D: Diopter) | 0.30 | 0.12 | 0.04 | 0.05 |
| Diopter Scale Dy (D: Diopter) | 0.19 | 0.31 | 0.01 | 0.02 |
| Thickness of prism T (mm) | 9 | 9 | 9 | 9 |
| Refractive Index N | 1.525 | 1.525 | 1.525 | 1.525 |

In the above embodiment, although the image display device 80 formed by a self-emitting type display device and the like is used, instead thereof, a scanning type image display device may be used.

Figure 17:
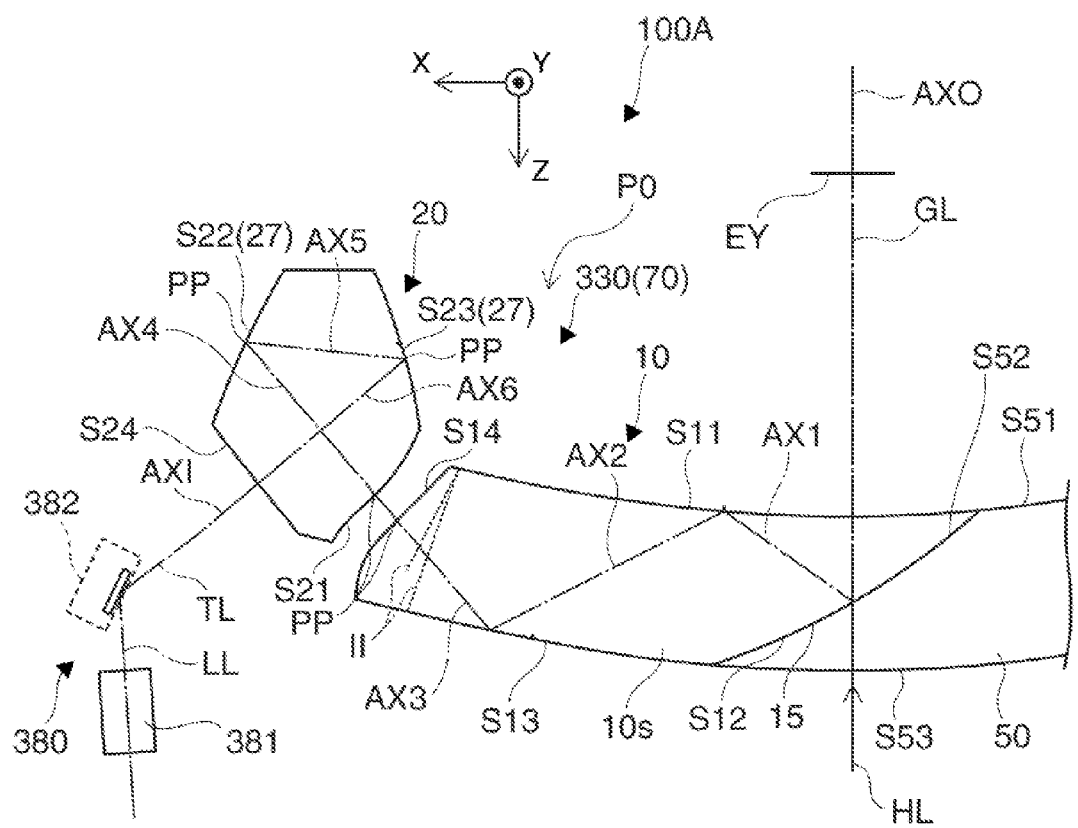
FIG. 17 is a diagram illustrating a virtual image display apparatus of Modification Example.

Specifically, as shown in FIG. 17, the first display apparatus 100A as the virtual image display apparatus includes a light guiding unit 330 corresponding to the perspective projection device 70 and an image display device 380. The image display device 380 is a device, which forms a signal light of which intensity is modulated and emits the corresponding signal light as a scanning light TL, and has a signal light formation unit 381 and a scanning optical system 382.

The signal light formation unit 381 includes a light source, and emits a signal light LL which is modulated and formed based on a control signal from a control circuit not shown. The scanning optical system 382 scans and emits the signal light LL which is passed through the signal light formation unit 381. Here, the scanning optical system 382 is configured by a MEMS mirror and the like, and performs a two-dimensional scanning which changes the emission angle of the light beam (the scanning light TL) vertically and horizontally by changing the attitude by synchronizing with the modulation of the signal light LL by the signal light formation unit 381 and adjusting the optical path of the signal light LL. Accordingly, the image display device 380 causes the scanning light TL that should become the image light GL to enter the light guiding unit 330 and to be scanned with respect to all partial regions in which a half mirror layer 15 of the second surface S12 is formed.

If the operation of the first display apparatus 100A is described, as described above, the image display device 380 emits the signal light LL as the scanning light TL toward the eighth surface S24 of the light guiding unit 330. The light guiding unit 330 guides the scanning light TL, which passes through the eighth surface S24, to the inside by the total reflection and the like and reaches the half mirror layer 15. At this time, the scanning light TL is scanned on the surface of the half mirror layer 15, so that a virtual image is formed by the image light GL as the track of the scanning light TL, and thus the wearer receives the virtual image in eyes EY to recognize the image. In addition, in the shown case, the eighth surface S24 which is a light incident surface of the light guiding unit 330 is a flat surface vertical to the optical axis of the scanning light TL.

Figure 18:
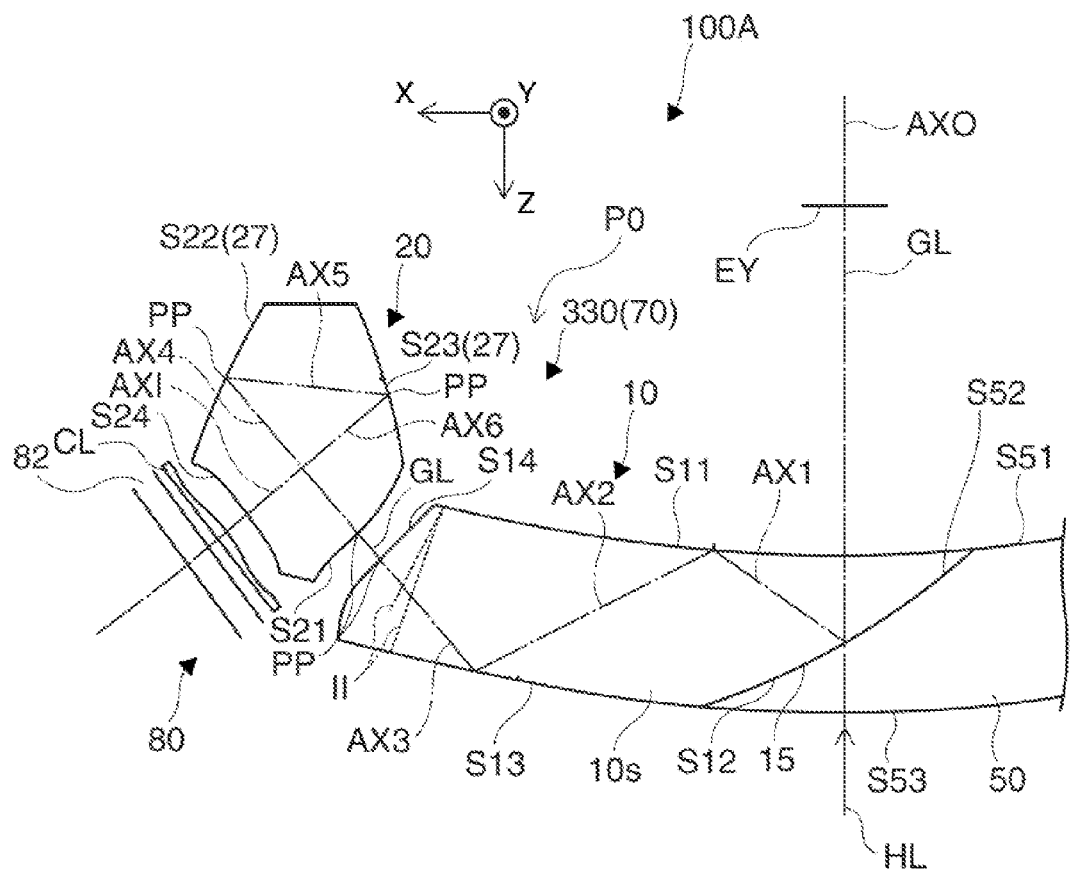
FIG. 18 is a diagram illustrating a virtual image display apparatus of another Modification Example.

In addition, as shown in FIG. 18, the correction lens CL may be present between the second prism 20 and the image display device 80. The correction lens CL is a lens which actually does not have a power, and may be used, for example, for restriction and the like of the aberration.

Figure 19A:
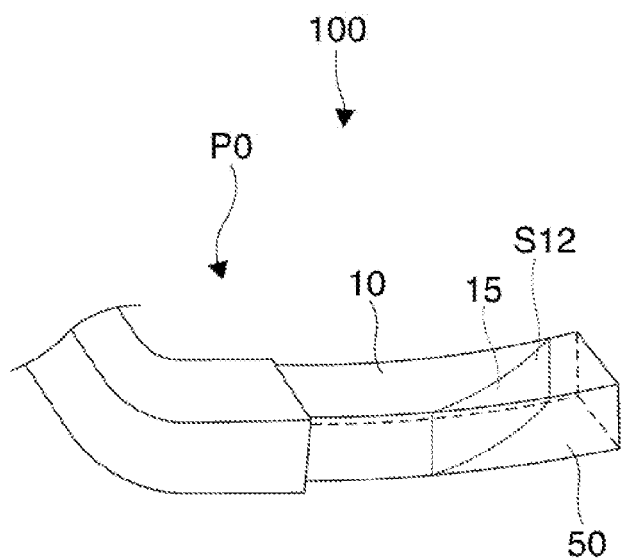
FIG. 19A is a perspective view illustrating a light guiding device and other example of a virtual image display apparatus using the light guiding device.
Figure 19B:
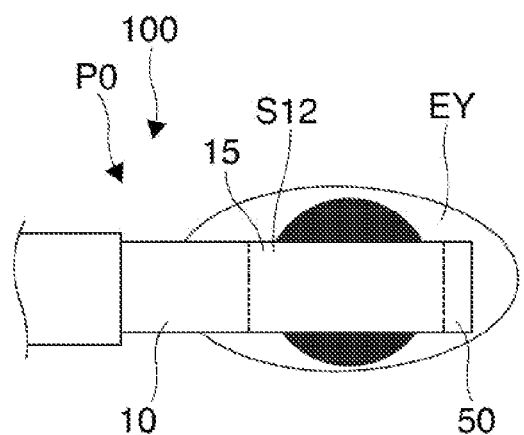
FIG. 19B is a front view thereof.

In addition, in the above embodiment, the first prism 10 which is a light guiding member and the light transmitting member 50 which is an auxiliary prism are configured to cover all in front of eyes EY of a wearer, however, without being limited thereto, for example, as shown in FIGS. 19A and 19B, a compact configuration is possible, in which a portion including the second surface S12 that is a curved surface shape having a half mirror layer 15 covers only a part of the eyes EY, that is, only a part in front of eyes is covered and a part that is not covered is present. Further, in this case, the first prism 10 and the light transmitting member 50 are made sufficiently small, the wearer may observe an external world from the vicinities of the first prism 10 and the light transmitting member 50, even in a configuration in which a mirror that performs the total reflection is disposed instead of the half mirror layer 15, without a see-through manner. In addition, in the case of illustration, the half mirror layer 15 is formed in all or almost all of the second surface S12, but the half mirror layer 15 may be formed only in a part of the second surface S12. In addition, in the example of FIG. 19B, the half mirror layer 15 is disposed approximately in front of the eyes EY, but the half mirror layer 15 may be shifted from the front side to be disposed and a line of sight may be moved, thereby causing the image to be visually recognized. For example, the position of the eyes EY may slightly be lowered (the positions of the first prism 10 and the light transmitting member 50 are slightly raised). In this case, for example, it becomes a state where the lower half part of the eyes EY is seen from below the first prism 10 and the light transmitting member 50.

Second Embodiment

Hereinafter, referring to drawings, a second virtual image display apparatus of a second embodiment related to the invention will be described in detail.

A. Appearance of Second Virtual Image Display Apparatus

The second virtual image display apparatus of the present embodiment is a Modification Example of a first virtual image display apparatus 100 of the first embodiment shown in FIG. 1, since the appearance thereof is the appearance like the same glasses as the case of the first embodiment, illustration and explanation will be omitted.

B. Configuration of Display Apparatus

Figure 20:
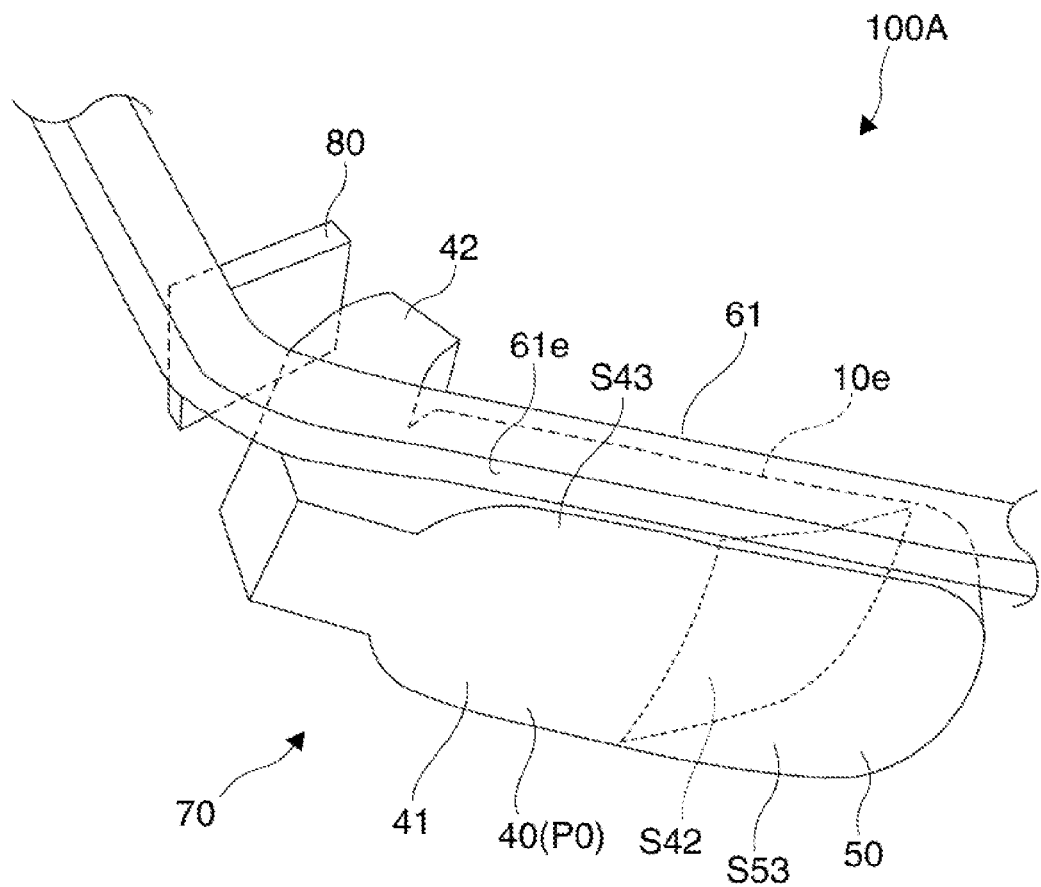
FIG. 20 is a perspective view illustrating the configuration of the main body of a second virtual image display apparatus.
Figure 21A:
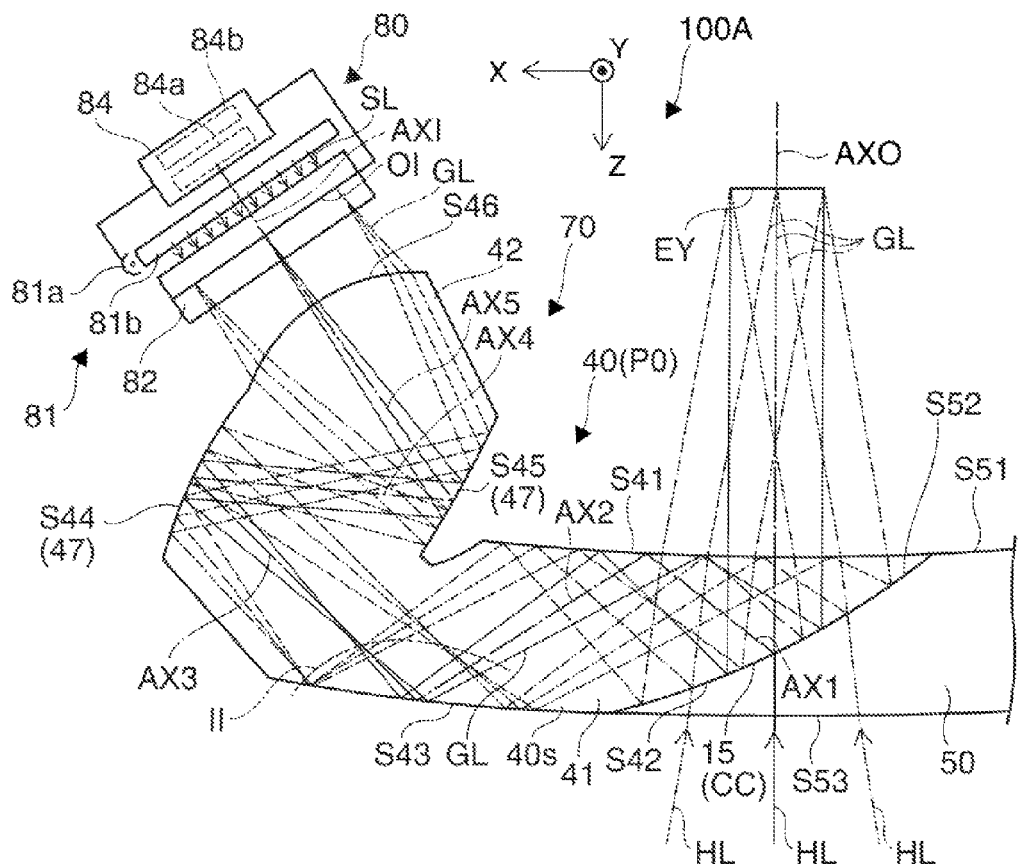
FIG. 21A is a cross-sectional view of the main body portion of a first display apparatus constituting the second virtual image display apparatus as seen from a plan view and FIG. 21B is a front view of the main body portion.
Figure 21B:
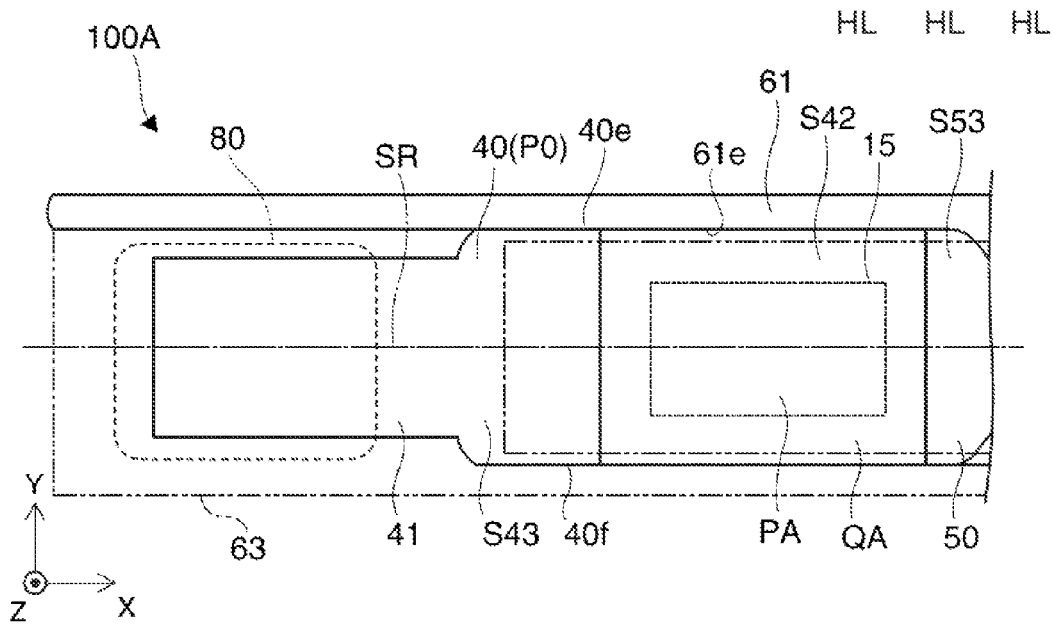

Hereinafter, the configuration of a first display apparatus 100A will be described. As shown in FIGS. 20, 21A, 21B and the like, the first display apparatus 100A includes a perspective projection device 70 and an image display device 80. Among these, the perspective projection device 70 is a prism type image forming optical system PO and includes a prism 40 which is a waveguide member and a light transmitting member 50. The prism 40 and the light transmitting member 50 are bonded and integrated to be firmly fixed to the lower side of a frame 61, for example, such that the upper surface 40e of the prism 40 and the lower surface 61e of a frame 61 are abutted. The prism 40 and the light transmitting member 50 correspond to the first optical portion 103a in FIG. 1, and the image display device 80 corresponds to a first embedded apparatus portion 105a in FIG. 1. In addition, the second display apparatus 100B shown in FIG. 1 has the same configuration as that of the first display apparatus 100A but the left and the right thereof are inverted, and thus the detailed description of the second display apparatus 100B will be omitted.

In the perspective projection device 70, the prism 40 which is a prism type image forming optical system PO may be considered to be divided into a first prism portion 41 of an arc shape which is disposed in a center side close to a nose and curved along a face when seen from the plan view, and a second prism portion 42 of a block shape which is disposed in the vicinity side separated from the nose. The first prism portion 41 is disposed in the light emitting side and has a first surface S41, a second surface S42 and a third surface S43 as a side surface having an optical function, and the second prism portion 42 is disposed in the light incident side and has a fourth surface S44, a fifth surface S45 and a sixth surface S46 as a side surface having an optical function. Among these, the second surface S42 is disposed between the first surface S41 and the third surface S43, the first surface S41 and the fifth surface S45 are arranged relatively close to each other with a predetermined angle therebetween, the fourth surface S44 and the sixth surface S46 are adjacent, the fifth surface S45 is disposed to oppose with the fourth surface S44 and the sixth surface S46 with a prism material interposed therebetween. In addition, the prism 40 has a first side surface 40e and a second side surface 40f which are adjacent to and oppose with the first to third surfaces S41 to S43.

In the prism 40, the first surface S41 is a free curved surface which takes an emission side optical axis AXO that is parallel to Z axis as a central axis or a reference axis, the second surface S42 is a free curved surface which is included in a reference surface SR that is parallel to XZ surface and takes an optical axis AX1 inclined with respect to Z axis as a central axis or a reference axis, and the third surface S43 is a free curved surface which takes an emission side optical axis AXO as a central axis or a reference axis. The fourth surface S44 is a free curved surface which is included in a reference surface SR that is parallel to XZ surface and takes a bisector of a pair of optical axes AX3 and AX4 inclined with respect to Z axis as a central axis or a reference axis, the fifth surface S45 is a free curved surface which is included in a reference surface SR that is parallel to XZ surface and takes a bisector of a pair of optical axes AX4 and AX5 inclined with respect to Z axis as a central axis or a reference axis, and the sixth surface S46 is a free curved surface which is included in a reference surface SR that is parallel to XZ surface and takes an optical axis AX5 inclined with respect to Z axis as a central axis or a reference axis. In addition, the above first to sixth surfaces S41 to S46 have a shape that is parallel to the XZ surface extending horizontally (or laterally) and are symmetric with the vertical (or longitudinal) Y axis direction with the reference surface SR through which optical axes AX1 to AX4 and the like pass interposed therebetween.

The prism 40 is formed by a resin material showing a high optical transparency in a visible range. The prism 40 has as a main body portion 40s, the block-shaped member which is integrally formed by, for example, an injection molding, and the main body portion (a block-shaped member) 40s is formed by injecting and hardening, for example, the thermoplastic resin material inside the mold. The main body portion 40s is made as an integrally formed product, but may be considered to be divided into the first prism portion 41 and the second prism portion 42 as described above. The first prism portion 41 enables a waveguide and an emission of the image light GL and a pass-through of an external light HL. The second prism portion 42 enables an incidence and a waveguide of the image light GL.

In the first prism 41, the first surface S41 functions as a refractive surface on which the image light GL is emitted to the outside of the first prism portion 41 and a total reflecting surface on which the image light GL is totally reflected on the side of the inner surface. The first surface S41 is disposed in front of the eyes EY and forms a concave surface shape with respect to the observer. In addition, the first surface S41 may be formed by covering the main body portion 40s with a hard coating layer in order to prevent the surface from being damaged and the image resolution from being reduced. A coating agent made from a resin and the like is deposited on the base surface of the main body portion 40s through a dip process or a spray coating process, and thus the hard coating layer is formed.

The second surface S42 has a half mirror layer 15. The half mirror layer 15 is a reflecting film (that is, semi-transmitting reflective film) having an optical transparency. The half mirror layer 15 (semi-transmitting reflective film) is not formed on the entire of the second surface S42 but on the partial region PA of the second surface S42. Specifically, the half mirror layer 15 is formed on the partial region PA in which the entire region QA, in which the second surface S42 is widened, is narrowed mainly with regard to the normal direction. More specifically, the partial region PA is disposed on the center side with regard to the normal Y axis direction and disposed approximately entirely with regard to the direction along a horizontal reference surface SR. The half mirror layer 15 is formed by making a metal reflecting film or a dielectric multilayer film on the partial region PA in the base surface of the main body portion 40s. The reflectivity with respect to the image light GL of the half mirror layer 15 is set to 0% or more and 50% or less in the incident angle range of the assumed image light GL, from a view point of making an observation of the external light HL easy by a see-through manner. The reflectivity with respect to the image light GL of the half mirror layer 15 of the specific Example is set to, for example, 20%, and the transmissivity with respect to the image light GL is set to, for example, 80%.

The third surface S43 functions as a total reflecting surface on which the image light GL is totally reflected on the side of the inner surface using a refractive index difference. In addition, the third surface S43 may be formed by covering the main body portion 40s with a hard coating layer in order to prevent the surface from being damaged and the image resolution from being reduced. The third surface S43 is disposed in front of the eyes EY and forms a concave surface shape with respect to the observer in the same manner as the first surface S41. When the external light HL is passed through the first surface S41 and the third surface S43 to be observed, diopter scale becomes approximately zero.

The second prism portion 42 is a relay optical system which reforms the image of the image light or the picture light emitted from each point on the image surface (display position) OI of the image display element 82 inside the prism 40. In the second prism portion 42, the fourth surface S44 and the fifth surface S45 are covered with a mirror layer 27 which is a non-transmissive reflection coating and functions as a reflecting surface (a total reflecting surface of a broad sense) that approximately totally reflects the image light GL in the side of the inner surface. Further, by adjusting the refractive index of the main body portion 40s or reflection angle in the fourth or the fifth surfaces S44 or S45, it is possible to cause the surfaces S44 and S45 to function as the total reflecting surface (in a narrow sense, a total reflecting surface) which totally reflects the image light GL in the side of the inner surface.

The sixth surface S46 functions as a refractive surface on which the image light GL is entered inside the second prism portion 42. In addition, the sixth surface S46 may cover the main body portion 40s with a hard coating layer in order to prevent the surface from being damaged and the image resolution from being reduced, but it is possible to cover the main body portion 40s with the multilayer film in order to restrict a ghost image by reflection prevention.

The light transmitting member 50 shows a high optical transparency in a visible range, is formed by a resin material having approximately the same refractive index with the main body portion 40s of the prism 40, and integrally fixed to the prism 40. The light transmitting member 50 is an auxiliary prism which assists a see-through function of the prism 40 and has, as a side surface having an optical function, a first transmitting surface S51, a second transmitting surface S52 and a third transmitting surface S53. Here, the second transmitting surface S52 is disposed between the first transmitting surface S51 and the third transmitting surface S53. The first transmitting surface S51 is present on the extended curved surface of the first surface S41 of the prism 40, the second transmitting surface S52 is a curved surface which extends along the second surface S42 of the prism 40 and is bonded by an adhesive agent CC and integrated with respect to the second surface S42, and the third transmitting surface S53 is present on the extended curved surface of the third surface S43 of the prism 40.

The second prism portion 42 of the prism 40 is connected to the image display device 80 described later, and supports the image display device 80. The second prism portion 42 is covered with the light shielding member 63. The upper edge portion and the lower edge portion of the first prism portion 41 of the prism 40 are covered with the light shielding member 63. In the vicinity of the prism 40, an additional light shielding portion to prevent the external light from entering may be provided. The light shielding portion may be configured by, for example, a light shielding coating or light scattering layer.

The image display device 80 has an illuminating device 81 which emits a two-dimensional illuminating light SL, an image display element 82 which is a transmissive type spatial light modulator, and an operation control unit 84 which controls the operation of the illuminating device 81 and the image display element 82.

The illuminating device 81 of the image display device 80 has a light source 81a which generates a light including three colors of red, green and blue, and a back light guiding unit 81b which diffuses the light from the light source 81a and makes a square-shaped light flux. The image display element 82 is an image element that is formed by for example, a liquid crystal display device, and modulates the illuminating light SL from the illuminating device 81 into a spatial light and forms an image light that should become a display target of a moving image and the like. The operation control unit 84 includes a light source operation circuit 84a and a liquid crystal operation circuit 84b. The light source operation circuit 84a supplies an electric power to the light source 81a of the illuminating device 81 to emit the illuminating light SL having a stable brightness. The liquid crystal operation circuit 84b outputs an image signal or an operation signal with respect to the image display element 82 to form an image light of the color that is a base color of a moving picture or a static picture as a transmissivity pattern. In addition, the liquid crystal operation circuit 84b may be configured to have an image processing function, however a control circuit that is attached outside may be configured to have the image processing function. In addition, the image display device 80 is integrally fixed to the prism 40 to oppose to the sixth surface S46 that is an image light incident surface of the prism 40. That is, the image display element (an image element) 82 is integrally fixed to the prism 40 to oppose to the sixth surface S46 (the image light incident surface).

C. Optical Path of Image Light and the Like

Hereinafter, the optical path of the image light GL and the like in the virtual image display device 100 will be described.

The image light GL emitted from the image display element 82 (the image element) enters the sixth surface S46 that is provided in the prism 40 and has a relatively strong positive refractive power.

The image light GL which passes through the sixth surface S46 of the prism 40 progresses while being converged. When the image light GL passes through the second prism portion 42, it is reflected on the fifth surface S45 having a relatively weak positive refractive power and reflected on the fourth surface S44 having a relatively weak positive refractive power.

The image light GL reflected on the fourth surface S44 of the second prism portion 42 progresses with being converged and enters the third surface S43 having a relatively weak positive refractive power to be totally reflected on the first prism portion 41, and enters the first surface S41 having a relatively weak negative refractive power to be totally reflected. In addition, before the image light GL passes through the third surface S43, the image light GL forms a curved intermediate image in the prism 40 by the relay optical system 42 that is the second prism portion 42. Although the image surface II of the intermediate image corresponds to the image surface (display position) OI of the image display element 82.

Although the image light GL which is totally reflected on the first surface S41 enters the second surface S42, especially, the image light GL, which enters the half mirror layer 15, partially is transmitted through the half mirror layer 15 while partially being reflected, and again enters and passes through the first surface S41. In addition, the half mirror layer 15 operates as one having a relatively strong positive refractive power with respect to the image light GL that is reflected here. In addition, the first surface S41 operates as one having a negative refractive power with respect to the image light GL passing therethrough.

The image light GL which passes through the first surface S41 enters the pupils of eyes EY of the observer as an approximately parallel light flux. That is, the observer observes the image formed on the image display element 82 by an image light GL as a virtual image.

On the other hand, in the same manner as the case of the first embodiment, when the external light HL passes through the prism 40 or the light transmitting member 50, the positive and the negative refractive power is offset and the aberration is corrected. That is, the observer observes an external image of which distortion is small over the prism 40 or the light transmitting member 50. In addition, the second surface S42 of the prism 40 and the second transmitting surface S52 of the light transmitting member 50 have approximately the same curved surface shape and approximately the same refractive index, and the aperture between the second surface S42 and the second transmitting surface S52 is charged with an adhesive layer (an adhesive agent) CC having approximately the same refractive index. That is, the second surface S42 of the prism 40 and the second transmitting surface S52 of the light transmitting member 50 do not act as a refractive surface with respect to the external light HL.

The observer may observe the image formed on the image display element 82 in the direction of the half mirror layer 15 and an external image.

By a reflection protection unit not shown which is provided in the light transmitting member 50, the image light GL that passes through the second surface S42 is prevented from returning to the optical path and becoming a stray light and the external light HL reflected on the half mirror layer 15 is prevented from returning to the optical path and becoming a stray light.

D. Method of Defining Optical Surface or Optical Path

Figure 22:
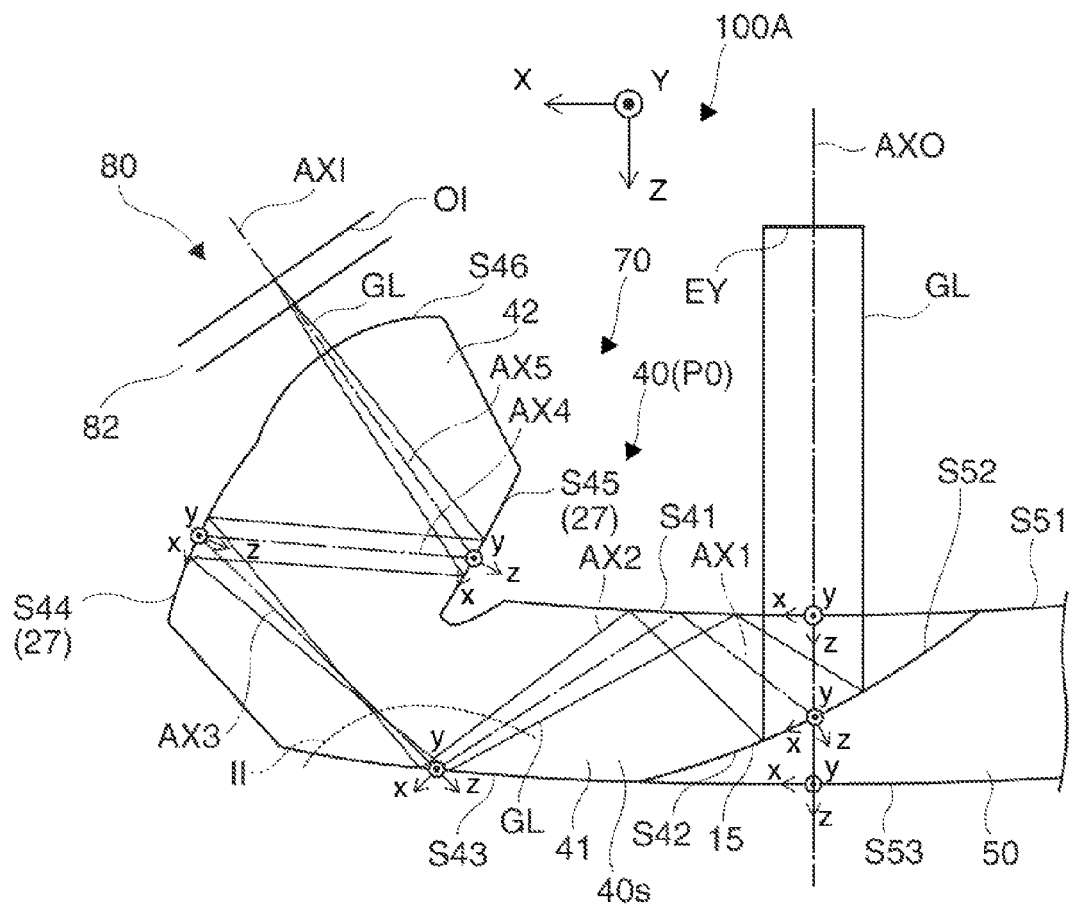
FIG. 22 is a cross-sectional view illustrating an optical surface or an optical path in the prism in the first display apparatus.

FIG. 22 is a diagram illustrating optical axes AX1 to AX5 or local coordinates in the prism 40. In the description below, with consideration of convenience of the evaluation or the expression of the optical system, the optical surface or the optical path is defined with regard to an inverse direction from the eyes EY of the observer to the image display device 80. Although in the actual optical system, the light emitted from the image display element 82 sequentially passes through the first prism portion 41 and the second prism portion 42 of the prism 40 to reach the eyes EY, it is difficult to evaluate the optical system in that status. Consequently, the light, from the light source at infinity, through a diaphragm that is present in the position of the eyes EY, enters the first prism portion 41 of the prism 40, and passes through the second prism portion 42, and an image is formed in the image display element 82, therefore the evaluation and the design of the optical system are performed, and data of the optical system described later is also expressed in that order. In addition, the light transmitting member 50 which is bonded to and integrally used with the prism 40 has the extended shape of the prism 40, and thus the description thereof is omitted.

In the shown prism 40, the optical axis of the first surface S41 is coincident with the emission side optical axis AXO, the local coordinates (x, y, z) of the first surface S41 are in the translation relationship with the entire coordinates (X, Y, Z), and have an origin on the first surface S41. That is, the z direction of the local coordinates is on the emission side optical axis AXO and is the progressing direction (inverse-progressing direction of a light beam), and the y direction of the local coordinates is parallel to the Y direction of the entire coordinates. Also in each of the following surfaces, the y direction of the local coordinates is parallel to the Y direction of the entire coordinates.

The optical axis of the second surface S42 is appropriately inclined with respect to the emission side optical axis AXO, the local coordinates of the second surface S42 appropriately rotates and translates around the Y axis with respect to the entire coordinates and has an origin on the second surface S42. The z direction of the local coordinates of the second surface S42 is an intermediate direction between the emission side optical axis AXO and the optical axis AX1 of the light flux center from the second surface S42 toward the first surface S41.

The optical axis of the third surface S43 is coincident with the emission side optical axis AXO, and the local coordinates of the third surface S43 is in the translation relationship with the entire coordinates and has an origin on the extended surface of the third surface S43, namely, on the third transmitting surface S53.

Due to this, an intermediate direction between the optical axis AX1 of the light flux center from the second surface S42 toward the first surface S41 and the optical axis AX2 of the light flux center from the first surface S41 toward third surface S43 is coincident with the normal direction of the first surface S41 in the light flux center (an intersection of the optical axes AX1 and AX2) on the first surface S41. In addition, an intermediate direction between the optical axis AX2 of the light flux center from the first surface S41 toward the third surface S43 and the optical axis AX3 of the light flux center from the third surface S43 toward the fourth surface S44 is coincident with the normal direction of the third surface S43 in the light flux center (an intersection of the optical axes AX2 and AX3) on the third surface S43.

In the optical path from the third surface S43 toward the fourth surface S44, the local coordinates corresponds to a progressing direction (inverse-progressing direction of a light beam). That is, the z direction of the local coordinates from the third surface S43 toward the fourth surface S44 is coincident with the optical axis AX3 of the light flux center, and the y direction of the local coordinates is parallel to the Y direction of the entire coordinates.

The z direction of the local coordinates of the fourth surface S44 and the fifth surface S45 is along the optical axes AX3, AX4 and AX5 corresponding to a progressing direction (inverse-progressing direction of a light beam) before and after reflection, and is parallel to the optical axis (the bisector of the optical axes AX3 and AX4 or the bisector of the optical axes AX4 and AX5) of each surface in the positions of the fourth and fifth surfaces S44 and S45. The origin of the local coordinates of the sixth surface S46 is on the sixth surface S46 and the z direction of the local coordinates is parallel to the optical axis AX5 of the sixth surface S46.

In addition, the optical axis AX5 which is the optical axis of the sixth surface S46 is coincident with the incident side optical axis AX1 extending from the image display device 80.

E. Preferable Characteristics of Optical Surface

The shape of the first surface S41 of the prism 40 is expressed as following equation, using the local coordinates (x, y, z) of the first surface S41.

$$Z = \Sigma\{A1_{m,n} \cdot (x^m \cdot y^n)\} \quad (4)$$

where, $A1_{m,n}$ are m-th and n-th term coefficients which are developed in the polynomial expression, m and n are integers of 0 or more.

The shapes of the second surface S42 of the prism 40 is expressed as following equation, using a local coordinates (x, y, z) of the second surface S42

$$Z = \Sigma\{A2_{m,n} \cdot (x^m \cdot y^n)\} \quad (5)$$

where, $A2_{m,n}$ are m-th and n-th term coefficients which are developed in the polynomial expression.

The shapes of the third surface S43 of the prism 40 is expressed as following equation, using a local coordinates (x, y, z) of the third surface S43.

$$Z = \Sigma\{A3_{m,n}(x^m \cdot y^n)\} \quad (6)$$

where, $A3_{m,n}$ are m-th and n-th term coefficients which are developed in the polynomial expression.

In the present embodiment, the first surface S41 to third surface S43 of the prism 40 satisfy three conditions.

$$-5\times10^{-2} < A1_{2,0} + A1_{0,2} < -1\times10^{-3} \text{ and}$$

$$-5\times10^{-2} < A3_{2,0} + A3_{0,2} < -1\times10^{-3} \quad (1)$$

$$|A3_{2,0} - A3_{0,2}| < 1\times10^{-2} \quad (2)$$

$$|A1_{2,0} - A3_{2,0}| < 5\times10^{-3} \text{ and}$$

$$|A1_{0,2} - A3_{0,2}| < 5\times10^{-3} \quad (3)$$

By setting the shapes of the first surface S41 to third surface S43 in order to satisfy these three conditions, aberration corrections of both of the external light HL and the image light GL are preferably performed, so that a good quality image may be obtained.

The interval between the first surface S41 and the third surface S43 of the prism 40 is set to 5 mm or more and 15 mm or less. Further, the inclination angle of the second surface S42 with respect to the first surface S41 is set to 20° or more and 40° or less.

In addition, the fourth surface S44 or the fifth surface S45 of the prism 40 are provided for adjustment of an optical path or more correct aberration correction, and may be omitted with consideration of a specification and the like of the perspective projection device 70.

In the second virtual image display apparatus 100 of the second embodiment, the intermediate image is formed inside the prism 40 by the prism 40, and in the prism, the image light GL, which is totally reflected on two or more surfaces in the order of the third surface S43, the first surface S41 and the second surface S42, and is transmitted through the first surface S41 to reach the eyes EY of the observer, and thus it is possible to make the entire optical system small and lightweight by making the prism 40 in front of the eyes thin and realize a bright and high performance display with a wide angle of view. Further, the external light HL may be observed by passing the external light through, for example, the first surface S41 and the third surface S43 and the diopter scale is made approximately zero at that time, and thereby reducing the defocus or distortion of the external light HL when the external light HL is observed by a see-through manner. In addition, the shape of the prism 40 becomes the shape according to the face of the observer, and thus the center of gravity may be also close to the face and design may be also excellent.

Examples of Second Embodiment

Hereinafter, examples of the perspective projection device incorporated in the second virtual image display apparatus related to the invention will be described in detail. Symbols used in each example are arranged below.

SPH: a pupil

FFSk: a free curved surface (k in the prism=the number of the surface)

SPH: a sphere shape or flat surface (the surface of a protective glasses)

R: a radius of curvature

T: a distance between surfaces on the axis

Nd: a refractive index with respect to d line of an optical material

Vd: Abbe number with respect to d line of an optical material

TLY: an inclination angle (°) of an optical axis in a lateral cross section (XZ cross section) of a certain surface (TLY may change before and after the certain surface)

DCX: a deviation amount of an optical axis in the lateral cross section (XZ cross section) of the certain surface Example 5

Data of optical surfaces constituting the prisms in a perspective projection device of Example 5 is shown in Table 16. In addition, for example, FFS1 means a first surface S41. FFS2 means a second surface S42 and FFS3 means a third surface S43.

TABLE 16

| No | Type | R | T | Nd | Vd |
|----|------|---|---|-----|-----|
| 1  | SPH  | ∞ | 20.00 |   |   |
| 2  | FFS1 | −298.406 | 5.20 | 1.525 | 55.95 |
| 3  | FFS2 | −35.413 | −5.20 | 1.525 | 55.95 |
| 4  | FFS1 | −298.406 | 8.50 | 1.525 | 55.95 |
| 5  | FFS3 | −298.406 | −18.00 | 1.525 | 55.95 |
| 6  | FFS4 | 27.445 | 14.00 | 1.525 | 55.95 |
| 7  | FFS5 | −38.749 | −13.00 | 1.525 | 55.95 |
| 8  | FFS6 | −11.535 | −3.00 |   |   |
| 9  | SPH  | ∞ | −1.60 | 1.458 | 67.82 |
| 10 | Image surface |   |   |   |   |

With respect to optical surfaces in a prism constituting Example 5, an optical axis inclination angle (tilt) TLY and an optical axis deviation amount (decenter) DCX in the lateral cross section are shown in Table 17 below.

TABLE 17

| No | Type | TLY(Before Surface) | DCX(After Surface) | TLY(After Surface) |
|----|------|---------------------|--------------------|--------------------|
| 2  | FFS1 | 0 | 0 | 0 |
| 3  | FFS2 | −26 | 0 | 26 |
| 4  | FFS1 | 0 | 0 | 0 |
| 5  | FFS3 | 0 | 13.419 | 45.01 |
| 6  | FFS4 | −20 | 0 | −20 |
| 7  | FFS5 | 25 | 0 | 25 |
| 8  | FFS6 | 0 | 0 | 0 |

With regard to each of optical surfaces in the prism constituting Example 5, a coefficient $Ak_{m,n}$ which is developed in the polynomial expression of the free curved surface is shown in Table 18 below. Further, in Table 18, symbols m and n mean a variable or a degree in the coefficient $Ak_{m,n}$. Furthermore, a symbol FFSk (k=1 to 6) means a k-th surface among the first to sixth surfaces S41 to S46 which are the free curved surfaces. In addition, the coefficient $Ak_{m,n}$ means the coefficient of each term $x^m \cdot y^n$ constituting the polynomial expression which expresses the k-th surface to be an object.

TABLE 18

| m | n | FFS1 | FFS2 | FFS3 | FFS4 | FFS5 | FFS6 |
|---|---|------|------|------|------|------|------|
| 2 | 0 | −2.907E−03 | −1.035E−02 | −2.907E−03 | 2.143E−02 | −9.578E−03 | 4.047E−02 |
| 0 | 2 | −1.676E−03 | −1.412E−02 | −1.676E−03 | 1.822E−02 | −1.290E−02 | −4.335E−02 |
| 3 | 0 | −5.398E−06 | 4.962E−05 | −5.398E−06 | −9.349E−05 | 1.458E−03 | 2.580E−04 |
| 1 | 2 | −1.598E−03 | 1.311E−04 | −1.598E−03 | 2.696E−04 | 5.302E−03 | −1.167E−02 |
| 4 | 0 | −1.692E−06 | −6.203E−06 | −1.692E−06 | −2.734E−05 | 3.031E−04 | 6.358E−04 |
| 2 | 2 | 6.709E−05 | 2.963E−06 | 6.709E−05 | −5.281E−05 | 2.725E−04 | −1.818E−03 |
| 0 | 4 | 1.409E−04 | 3.103E−05 | 1.409E−04 | −9.759E−06 | 1.460E−05 | −1.925E−03 |

Figure 23:
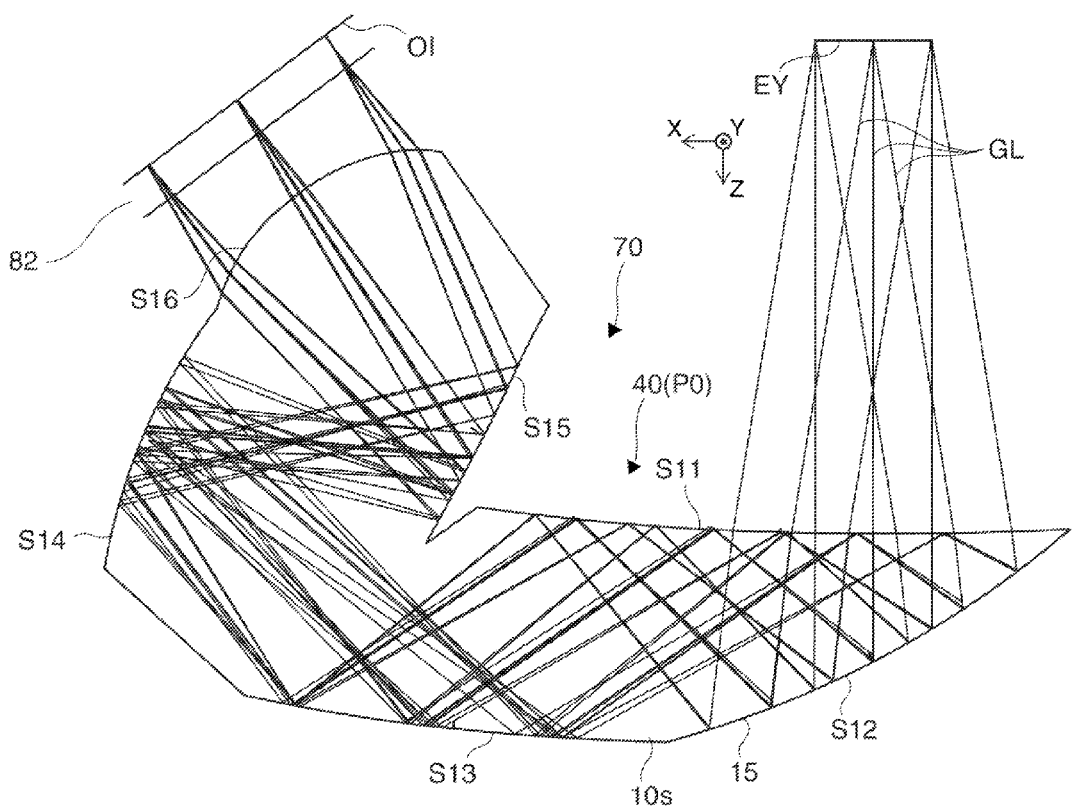
FIG. 23 is a diagram illustrating an optical system of Example 5.
Figure 24A:
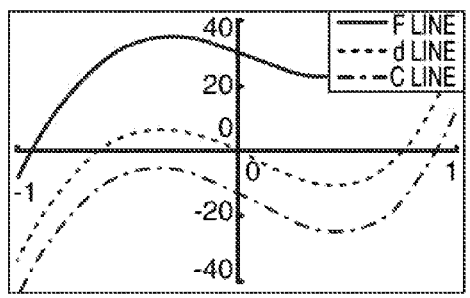
FIG. 24A to 24F are diagrams illustrating an aberration of the optical system of Example 5.
Figure 24D:
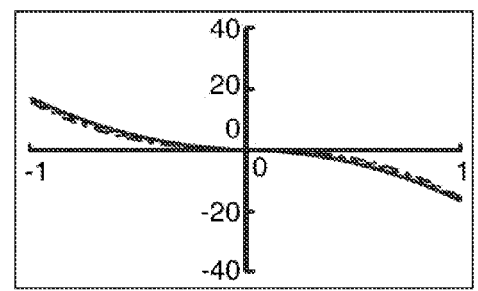
Figure 24B:
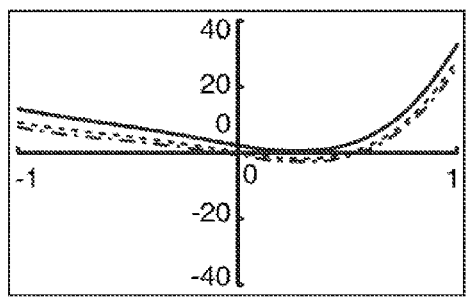
Figure 24E:
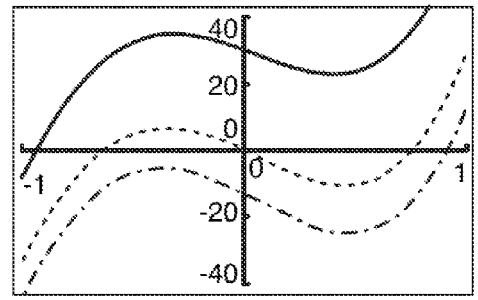
Figure 24C:
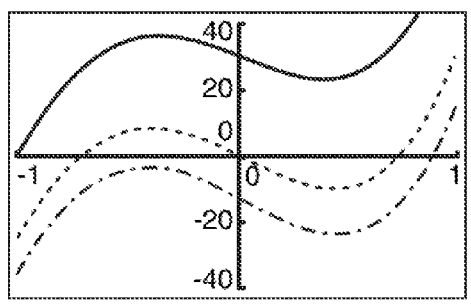
Figure 24F:
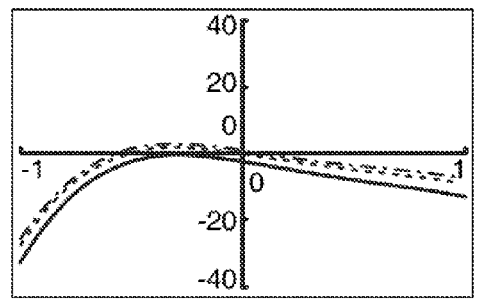

FIG. 23 is a cross-sectional view of the perspective projection device 70 of Example 5. However, the light flux is shown not only on the reference surface SR, but in Y direction deviated from the reference surface SR. The prism 40 in the perspective projection device 70 has a first surface S41 having a weak negative refractive power, a second surface S42 having a relatively strong positive refractive power, a third surface S43 having a relatively weak positive refractive power, a fourth surface S44 having a relatively weak positive refractive power, a fifth surface S45 having a relatively strong positive refractive power, and a sixth surface S46 having a relatively weak positive refractive power. If describing the detailed specification of the optical system of Example 5, the horizontal angle of view is 20.1°, the vertical angle of view is 11.4°, the size of the display region of the image display element is 9.22×5.18 mm, the diameter of the pupil is 5 mm and the focal distance is approximately 26 mm.

Figure 25A:
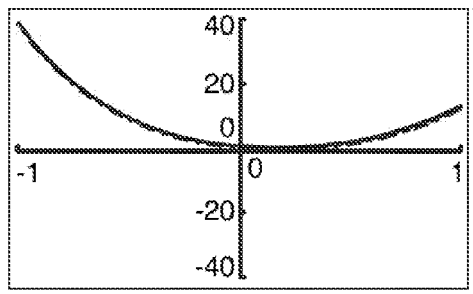
FIG. 25A to 25F are diagrams illustrating an aberration of the optical system of Example 5.
Figure 25D:
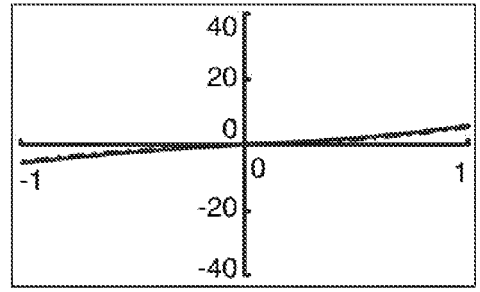
Figure 25B:
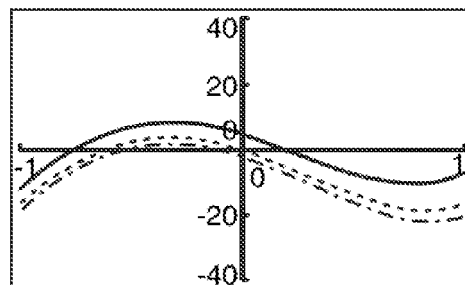
Figure 25E:
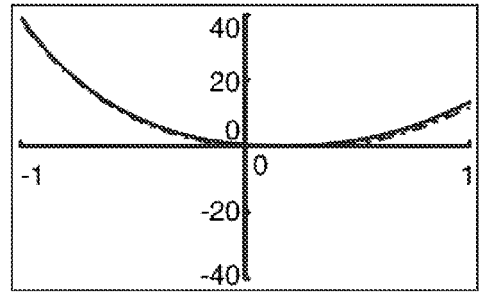
Figure 25C:
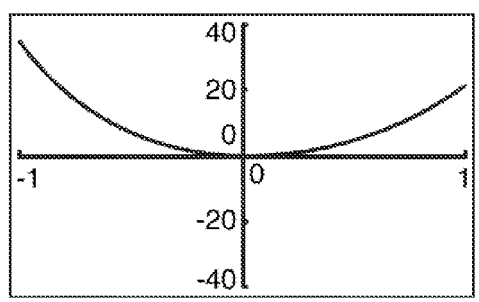
Figure 25F:
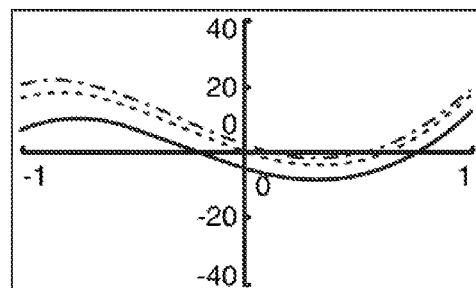

FIGS. 24A to 24F and FIGS. 25A to 25F show aberrations of example 5. In each aberration diagram, the horizontal axis shows the position in a pupil, and the vertical axis shows an aberration amount in unit of micron. Specifically, FIGS. 24A and 24B respectively show aberrations in X direction and Y direction in an azimuth of 10° in X direction and 5.7° in Y direction, FIGS. 24C and 24D respectively show aberrations in X direction and Y direction in an azimuth of 0.0° in X direction and 5.7° in Y direction, and FIGS. 24E and 24F respectively show aberrations in X direction and Y direction in an azimuth of −10° in X direction and 5.7° in Y direction. FIGS. 25A and 25B respectively show aberrations in X direction and Y direction in an azimuth of 10° in X direction and 0.0° in Y direction, FIGS. 25C and 25D respectively show aberrations in X direction and Y direction in an azimuth of 0.0° in X direction and 0.0° in Y direction, and FIGS. 25E and 25F respectively show aberrations in X direction and Y direction in an azimuth of −10° in X direction and 0.0° in Y direction. In addition, the shown aberrations are aberration amounts in an image surface of the image display element in the case where the light beam is inversely progressed, for convenience.

Example 6

Data of optical surfaces constituting the prisms in a perspective projection device of Example 6 is shown in Table 19.

TABLE 19

| No | Type | R | T | Nd | Vd |
|----|------|---|---|----|----|
| 1 | SPH | ∞ | 20.00 | | |
| 2 | FFS1 | −299.909 | 5.50 | 1.525 | 55.95 |
| 3 | FFS2 | −56.674 | −5.50 | 1.525 | 55.95 |
| 4 | FFS1 | −299.909 | 9.00 | 1.525 | 55.95 |
| 5 | FFS3 | −299.909 | −16.00 | 1.525 | 55.95 |
| 6 | FFS4 | 28.894 | 9.00 | 1.525 | 55.95 |
| 7 | FFS5 | −14.515 | −11.00 | 1.525 | 55.95 |
| 8 | FFS6 | 9.477 | −3.00 | | |
| 9 | SPH | ∞ | −1.60 | 1.458 | 67.82 |
| 10 | Image Surface | | | | |

With regard to optical surfaces in a prism constituting Example 6, an optical axis inclination angle (tilt) TLY and an optical axis deviation amount (decenter) DCX in the lateral cross section are shown in Table 20 below.

TABLE 20

| No | Type | TLY(Before Surface) | DCX(After Surface) | TLY(After Surface) |
|----|------|---------------------|--------------------|--------------------|
| 2 | FFS1 | 0 | 0 | 0 |
| 3 | FFS2 | −26 | 0 | 26 |
| 4 | FFS1 | 0 | 0 | 0 |
| 5 | FFS3 | 0 | 18.408 | −46.13 |
| 6 | FFS4 | −24 | 0 | −24 |
| 7 | FFS5 | −23 | 0 | −23 |
| 8 | FFS6 | 0 | 0 | 0 |

With regard to each of optical surfaces in the prism constituting the embodiment 6, a coefficient which is developed in the polynomial expression of the free curved surface is shown in Table 21 below. Further, in Table 21, symbols m and n mean a variable or a degree in the coefficient $Ak_{m,n}$. Furthermore, a symbol FFSk (k=1 to 6) means a k-th surface among the first to sixth surfaces S41 to S46 which are the free curved surfaces.

TABLE 21

| m | n | FFS1 | FFS2 | FFS3 | FFS4 | FFS5 | FFS6 |
|---|---|------|------|------|------|------|------|
| 2 | 0 | −1.724E−03 | −1.013E−02 | −1.724E−03 | 1.420E−02 | −1.809E−02 | −5.024E−02 |
| 0 | 2 | −1.667E−03 | −8.822E−03 | −1.667E−03 | 1.730E−02 | −3.445E−02 | 5.276E−02 |
| 3 | 0 | −3.814E−05 | −1.148E−05 | −3.814E−05 | 6.256E−04 | 2.776E−04 | −6.606E−03 |
| 1 | 2 | −5.045E−04 | −3.771E−04 | −5.045E−04 | 7.220E−04 | −1.028E−03 | 8.186E−03 |
| 4 | 0 | 9.913E−07 | 7.814E−07 | 9.913E−07 | −8.739E−05 | 2.436E−05 | −6.258E−04 |

TABLE 21-continued

| m | n | FFS1 | FFS2 | FFS3 | FFS4 | FFS5 | FFS6 |
|---|---|------|------|------|------|------|------|
| 2 | 2 | −9.694E−06 | 4.685E−06 | −9.694E−06 | −1.853E−04 | −1.584E−06 | 6.443E−04 |
| 0 | 4 | 2.899E−06 | 1.036E−06 | 2.899E−06 | 9.050E−05 | −2.015E−05 | −5.541E−04 |

Figure 26:
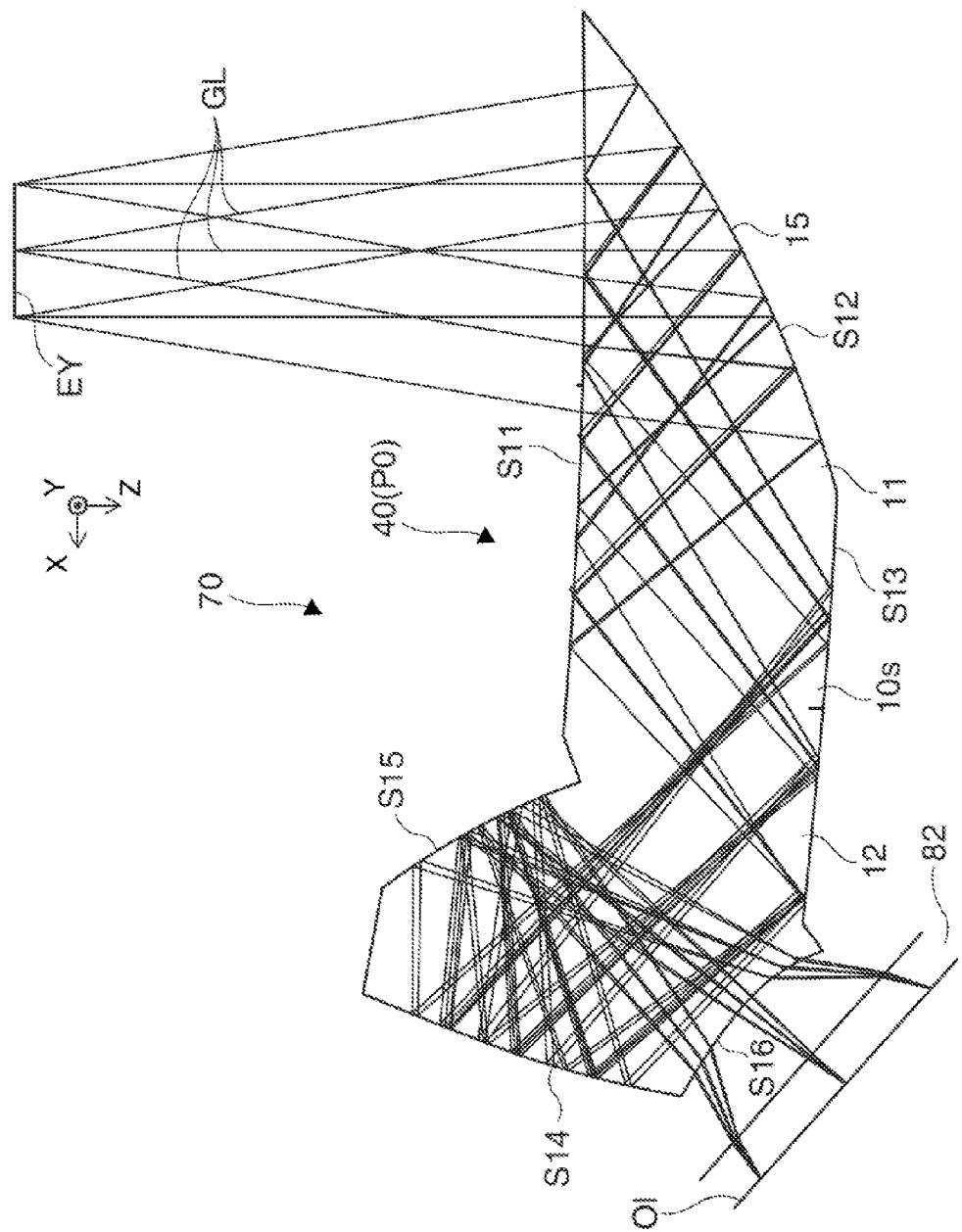
FIG. 26 is a diagram illustrating an optical system of Example 6.
Figure 27A:
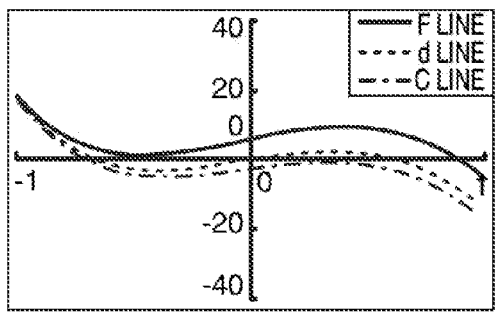
FIG. 27A to 27F are diagrams illustrating an aberration of the optical system of Example 6.
Figure 27D:
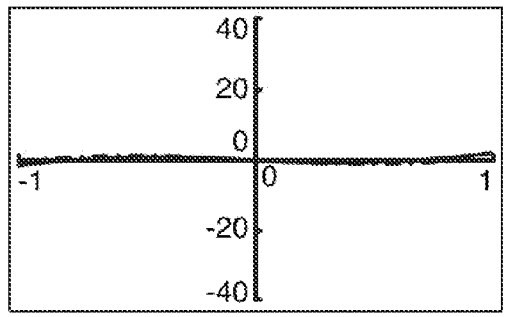
Figure 27B:
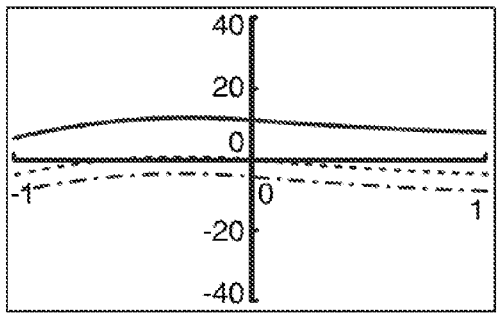
Figure 27E:
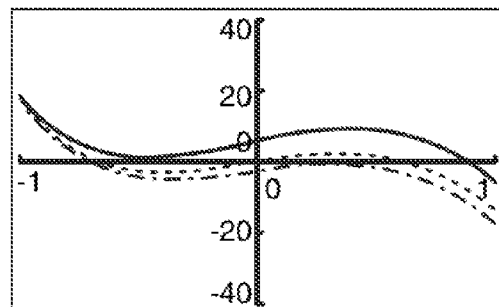
Figure 27C:
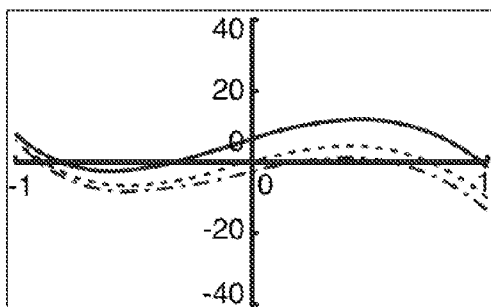
Figure 27F:
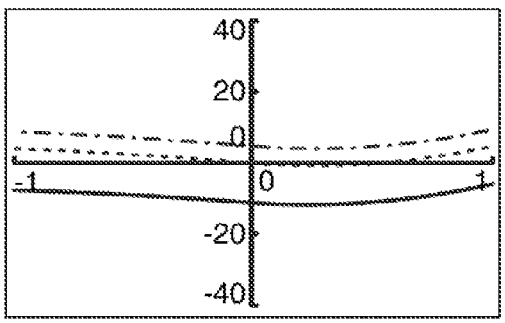

FIG. 26 is a cross-sectional view of the perspective projection device 70 of Example 6. The prism 40 in the perspective projection device 70 has a first surface S41 having a weak negative refractive power, a second surface S42 having a relatively strong positive refractive power, a third surface S43 having a relatively weak positive refractive power, a fourth surface S44 having a relatively weak positive refractive power, a fifth surface S45 having a relatively weak positive refractive power, and a sixth surface S46 having a relatively weak negative refractive power. If describing the detailed specification of the optical system of Example 6, the horizontal angle of view is 20.1, the vertical angle of view is 11.4°, the size of the display region of the image display element is 9.22×5.18 mm, the diameter of the pupil is 5 mm and the focal distance is approximately 26 mm.

Figure 28A:
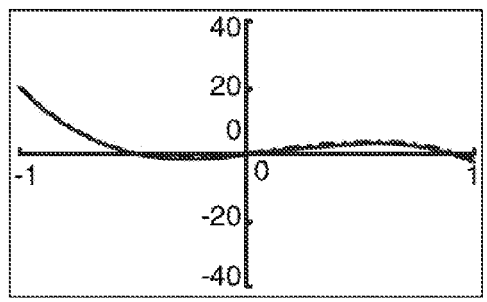
FIG. 28A to 28F are diagrams illustrating an aberration of the optical system of Example 6.
Figure 28D:
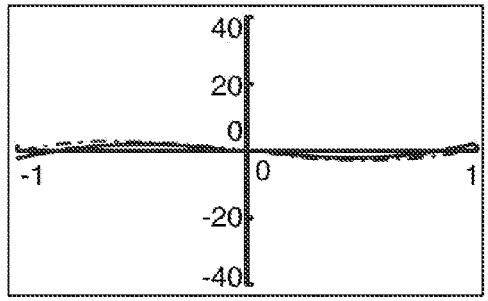
Figure 28B:
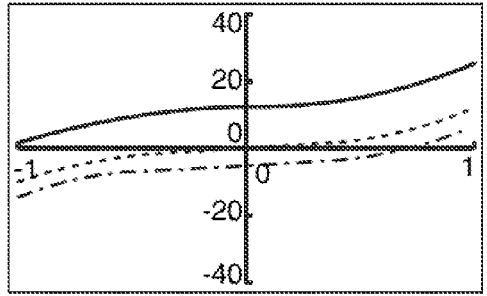
Figure 28E:
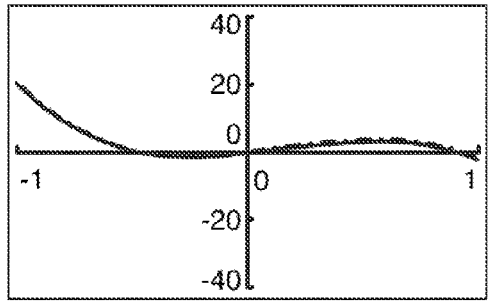
Figure 28C:
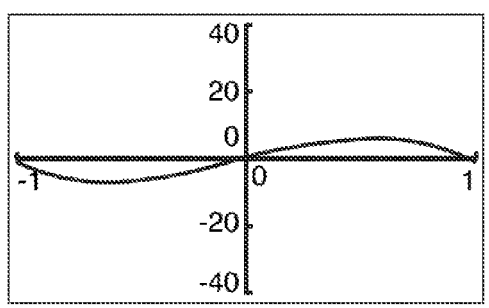
Figure 28F:
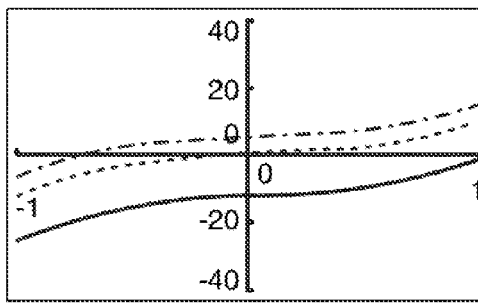

FIGS. 27A to 27F and FIGS. 28A to 28F show aberrations of example 6. Specifically, FIGS. 27A and 27B respectively show aberrations in X direction and Y direction in an azimuth of 10° in X direction and 5.7° in Y direction, FIGS. 27C and 27D respectively show aberrations in X direction and Y direction in an azimuth of 0.0° in X direction and 5.7° in Y direction, and FIGS. 27E and 27F respectively show aberrations in X direction and Y direction in an azimuth of −10° in X direction and 5.7° in Y direction. FIGS. 28A and 28B respectively show aberrations in X direction and Y direction in an azimuth of 10° in X direction and 0.0° in Y direction, FIGS. 28C and 28D respectively show aberrations in X direction and Y direction in an azimuth of 0.0° in X direction and 0.0° in Y direction, and FIGS. 28E and 28F respectively show aberrations in X direction and Y direction in an azimuth of −10° in X direction and 0.0° in Y direction.

Example 7

Data of optical surfaces constituting the prisms in a perspective projection device of Example 7 is shown in Table 22.

TABLE 22

| No | Type | R | T | Nd | Vd |
|----|------|---|---|----|----|
| 1 | SPH | ∞ | 20.00 | | |
| 2 | FFS1 | −141.388 | 5.30 | 1.525 | 55.95 |
| 3 | FFS2 | −53.069 | −5.30 | 1.525 | 55.95 |

TABLE 22-continued

| No | Type | R | T | Nd | Vd |
|----|------|---|---|----|----|
| 4 | FFS1 | −141.388 | 9.00 | 1.525 | 55.95 |
| 5 | FFS3 | −141.388 | −20.00 | 1.525 | 55.95 |
| 6 | FFS4 | 59.251 | 10.00 | 1.525 | 55.95 |
| 7 | FFS5 | −18.769 | −11.00 | 1.525 | 55.95 |
| 8 | FFS6 | 6.446 | −3.00 | | |
| 9 | SPH | ∞ | −1.60 | 1.458 | 67.82 |
| 10 | Image Surface | | | | |

With regard to optical surfaces in a prism constituting Example 7, an optical axis inclination angle (tilt) TLY and an optical axis deviation amount (decenter) DCX in the lateral cross section are shown in Table 23 below.

TABLE 23

| No | Type | TLY(Before Surface) | DCX(After Surface) | TLY(After Surface) |
|----|------|---------------------|--------------------|--------------------|
| 2 | FFS1 | 0 | 0 | 0 |
| 3 | FFS2 | −27 | 0 | 27 |
| 4 | FFS1 | 0 | 0 | 0 |
| 5 | FFS3 | 0 | 18.522 | −21.01 |
| 6 | FFS4 | 23 | 0 | 23 |
| 7 | FFS5 | 18 | 0 | 18 |
| 8 | FFS6 | 0 | 0 | 0 |

With regard to each of optical surfaces in the prism constituting Example 7, a coefficient which is developed in the polynomial expression of the free curved surface is shown in Table 24 below. Further, in Table 24, symbols m and n mean a variable or a degree in the coefficient $Ak_{m,n}$. Furthermore, a symbol FFSk (k=1 to 6) means a k-th surface among the first to sixth surfaces S41 to S46 which are the free curved surfaces.

TABLE 24

| m | n | FFS1 | FFS2 | FFS3 | FFS4 | FFS5 | FFS6 |
|---|---|------|------|------|------|------|------|
| 2 | 0 | −3.372E−03 | −1.133E−02 | −3.372E−03 | 2.160E−02 | −6.920E−03 | −8.363E−03 |
| 0 | 2 | −3.536E−03 | −9.422E−03 | −3.536E−03 | 8.439E−03 | −2.664E−02 | 7.757E−02 |
| 3 | 0 | 7.516E−05 | 4.674E−05 | 7.516E−05 | −4.006E−04 | 1.068E−03 | −3.012E−03 |
| 1 | 2 | 4.770E−04 | 3.276E−04 | 4.770E−04 | 2.312E−04 | 9.613E−04 | −3.189E−03 |
| 4 | 0 | −1.013E−05 | −4.728E−06 | −1.013E−05 | 5.708E−05 | 1.995E−05 | −1.582E−05 |
| 2 | 2 | 2.031E−05 | 2.079E−06 | 2.031E−05 | −4.304E−05 | −5.913E−05 | −1.894E−03 |
| 0 | 4 | 9.640E−07 | 1.531E−07 | 9.640E−07 | 2.413E−05 | 4.779E−05 | 4.314E−04 |

Figure 29:
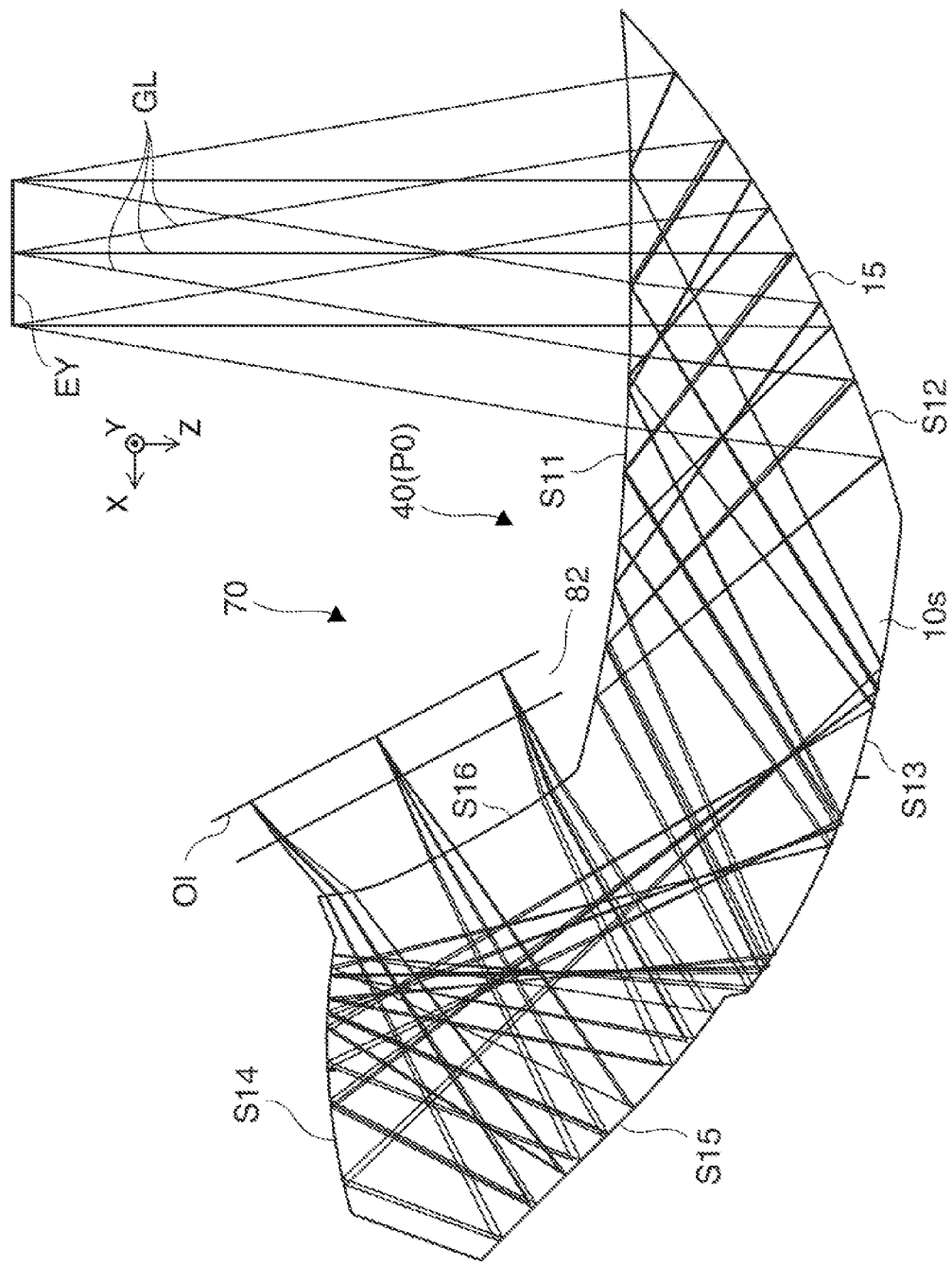
FIG. 29 is a diagram illustrating an optical system of Example 7.
Figure 30A:
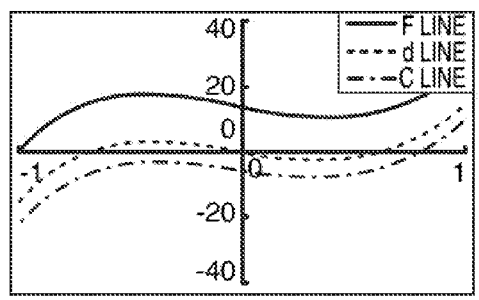
FIG. 30A to 30F are diagrams illustrating an aberration of the optical system of Example 7.
Figure 30B:
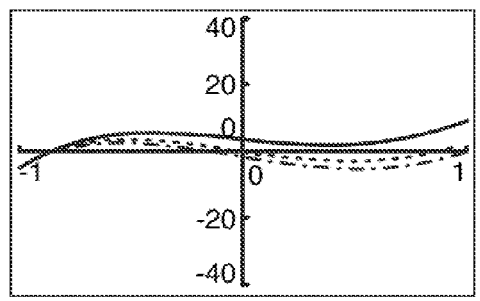
Figure 30C:
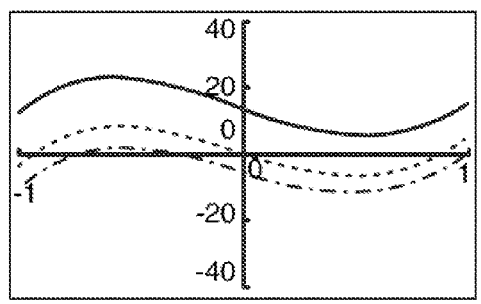
Figure 30D:
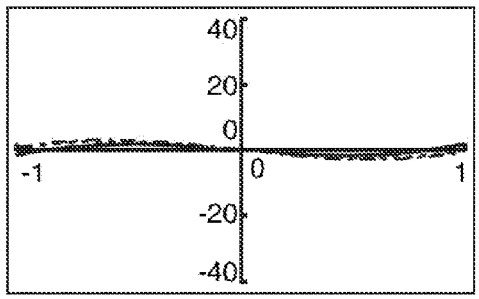
Figure 30E:
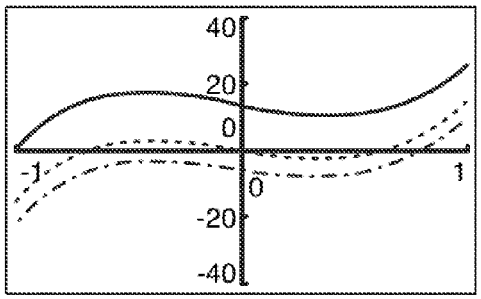
Figure 30F:
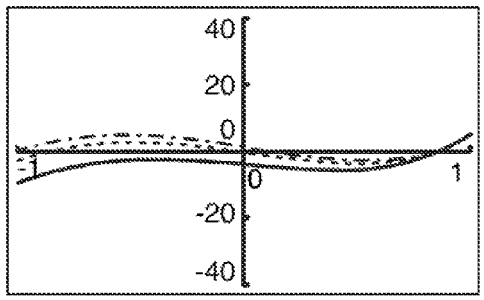

FIG. 29 is a cross-sectional view of the perspective projection device 70 of Example 7. The prism 40 in the perspective projection device 70 has a first surface S41 having a weak negative refractive power, a second surface S42 having a relatively strong positive refractive power, a third surface S43 having a relatively weak positive refractive power, a fourth surface S44 having a relatively weak positive refractive power, a fifth surface S45 having a relatively weak positive refractive power, and a sixth surface S46 having a relatively weak negative refractive power. If describing the detailed specification of the optical system of Example 7, the horizontal angle of view is 20.1°, the vertical angle of view is 11.4°, the size of the display region of the image display element is 9.22×5.18 mm, the diameter of the pupil is 5 mm and the focal distance is approximately 26 mm.

Figure 31A:
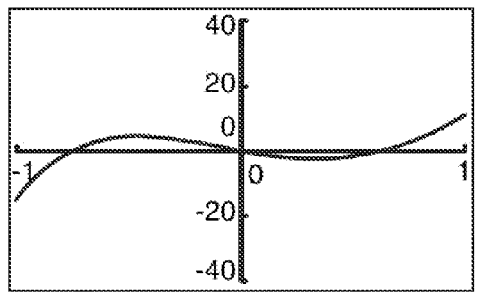
FIG. 31A to 31F are diagrams illustrating an aberration of the optical system of Example 7.
Figure 31D:
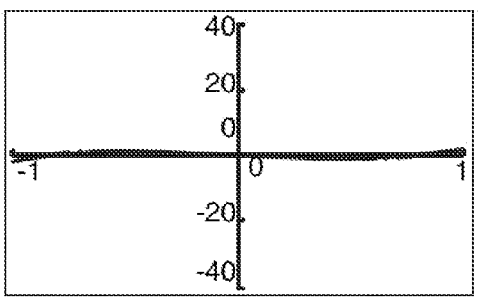
Figure 31B:
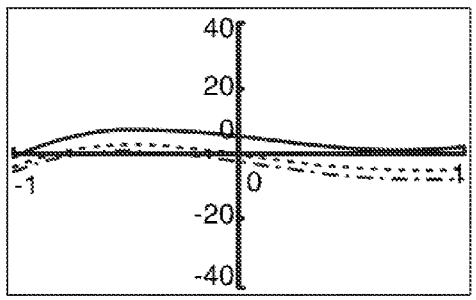
Figure 31E:
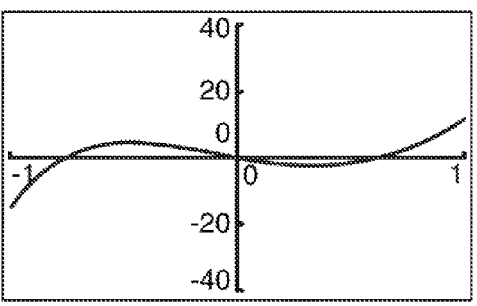
Figure 31C:
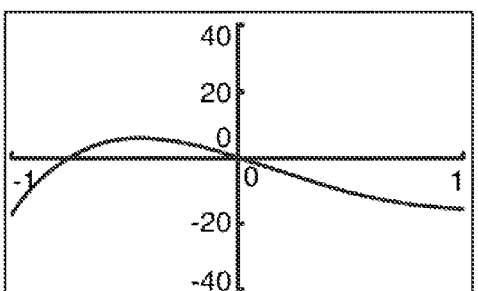
Figure 31F:
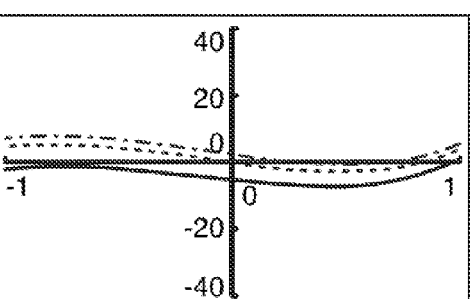

FIGS. 30A to 30F and FIGS. 31A to 31F show aberrations of example 7. Specifically, FIGS. 30A and 30B respectively show aberrations in X direction and Y direction in an azimuth of 10° in X direction and 5.7° in Y direction, FIGS. 30C and 30D respectively show aberrations in X direction and Y direction in an azimuth of 0.0° in X direction and 5.7° in Y direction, and FIGS. 30E and 30F respectively show aberrations in X direction and Y direction in an azimuth of −10° in X direction and 5.7° in Y direction. FIGS. 31A and 31B respectively show aberrations in X direction and Y direction in an azimuth of 10° in X direction and 0.0° in Y direction, FIGS. 31C and 31D respectively show aberrations in X direction and Y direction in an azimuth of 0.0° in X direction and 0.0° in Y direction, and FIGS. 31E and 31F respectively show aberrations in X direction and Y direction in an azimuth of −10° in X direction and 0.0° in Y direction.

Example 8

Data of optical surfaces constituting the prisms in a perspective projection device of Example 8 is shown in Table 25.

TABLE 25

| No | Type | R | T | Nd | Vd |
|---|---|---|---|---|---|
| 1 | SPH | ∞ | 20.00 | | |
| 2 | FFS1 | −475.145 | 5.20 | 1.525 | 55.95 |
| 3 | FFS2 | −44.365 | −5.20 | 1.525 | 55.95 |
| 4 | FFS1 | −475.145 | 9.50 | 1.525 | 55.95 |
| 5 | FFS3 | −475.145 | −26.00 | 1.525 | 55.95 |
| 6 | FFS4 | 25.895 | 17.00 | 1.525 | 55.95 |
| 7 | FFS5 | 38.553 | −14.00 | 1.525 | 55.95 |
| 8 | FFS6 | 15.813 | −3.00 | | |
| 9 | SPH | ∞ | −1.60 | 1.458 | 67.82 |
| 10 | Image Surface | | | | |

With regard to optical surfaces in a prism constituting Example 8, an optical axis inclination angle (tilt) TLY and an optical axis deviation amount (decenter) DCX in the lateral cross section are shown in Table 26 below.

TABLE 26

| No | Type | TLY(Before Surface) | DCX(After Surface) | TLY(After Surface) |
|---|---|---|---|---|
| 2 | FFS1 | 0 | 0 | 0 |
| 3 | FFS2 | −29 | 0 | 29 |
| 4 | FFS1 | 0 | 0 | 0 |
| 5 | FFS3 | 0 | 23.353 | −52.2 |
| 6 | FFS4 | 20 | 0 | 20 |
| 7 | FFS5 | −22 | 0 | −22 |
| 8 | FFS6 | 0 | 0 | 0 |

With regard to each of optical surfaces in the prism constituting Example 8, a coefficient which is developed in the polynomial expression of the free curved surface is shown in Table 27 below. Further, in Table 27, symbols m and n mean a variable or a degree in the coefficient $Ak_{m,n}$. Furthermore, a symbol FFSk (k=1 to 5) means a k-th surface among the first to fifth surfaces S41 to S45 which are the free curved surfaces.

TABLE 27

| m | n | FFS1 | FFS2 | FFS3 | FFS4 | FFS5 | FFS6 |
|---|---|---|---|---|---|---|---|
| 2 | 0 | −2.658E−03 | −5.538E−03 | −2.658E−03 | 1.578E−02 | −1.645E−02 | −4.043E−02 |
| 0 | 2 | −1.052E−03 | −1.127E−02 | −1.052E−03 | 1.931E−02 | 1.297E−02 | 3.162E−02 |
| 3 | 0 | 1.188E−04 | 2.830E−05 | 1.188E−04 | 1.092E−04 | −1.266E−04 | 4.950E−03 |
| 1 | 2 | 1.822E−04 | 2.905E−04 | 1.822E−04 | 8.586E−05 | 2.962E−03 | 4.549E−03 |
| 4 | 0 | −2.740E−06 | −4.570E−06 | −2.740E−06 | −3.048E−05 | 3.711E−05 | 2.181E−03 |
| 2 | 2 | 1.268E−05 | 1.628E−06 | 1.268E−05 | 2.209E−06 | −1.229E−05 | −5.144E−04 |
| 0 | 4 | 9.533E−07 | 3.363E−06 | 9.533E−07 | 6.889E−07 | −7.295E−05 | 3.663E−04 |

Figure 32:
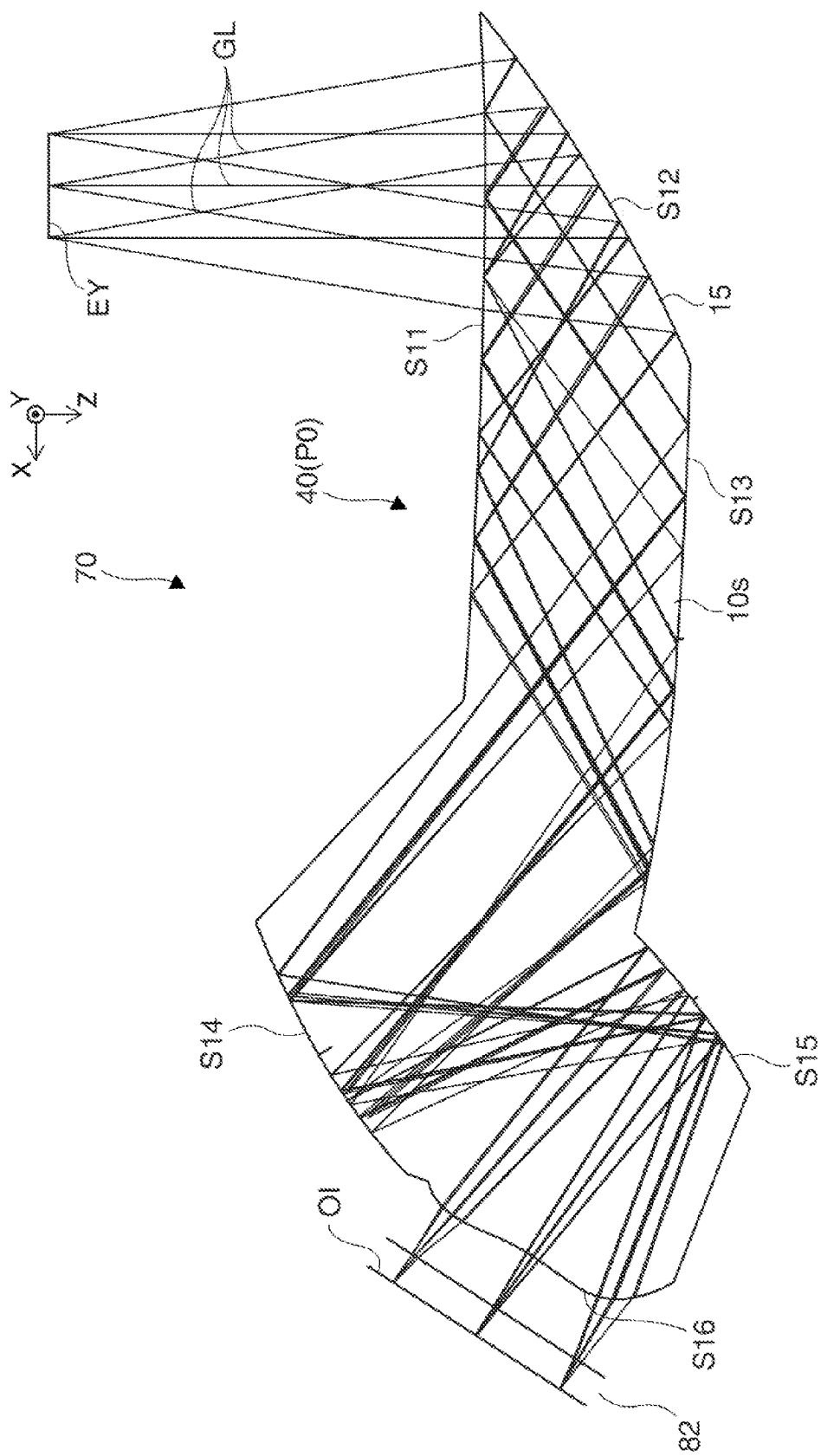
FIG. 32 is a diagram illustrating an optical system of Example 8.
Figure 33A:
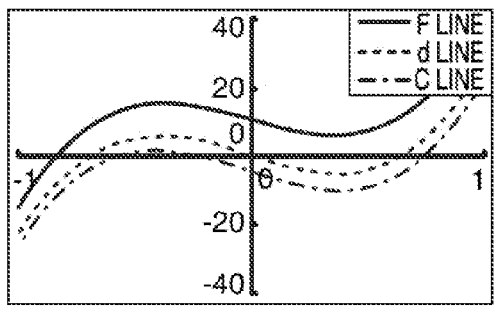
FIG. 33A to 33F are diagrams illustrating an aberration of the optical system of Example 8.
Figure 33D:
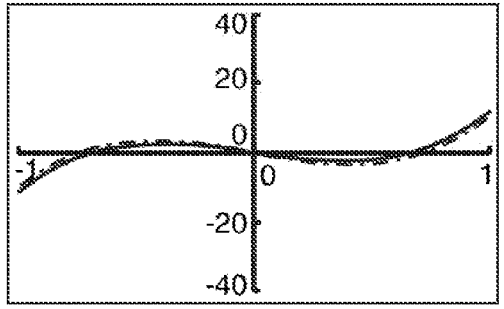
Figure 33B:
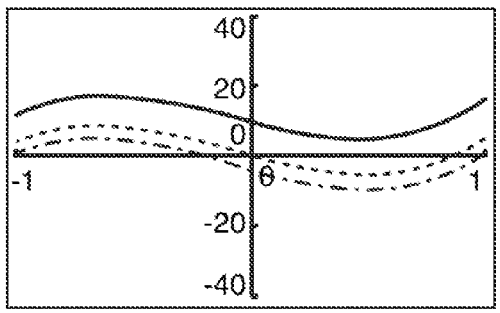
Figure 33E:
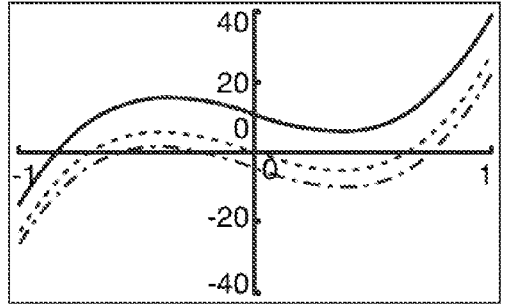
Figure 33C:
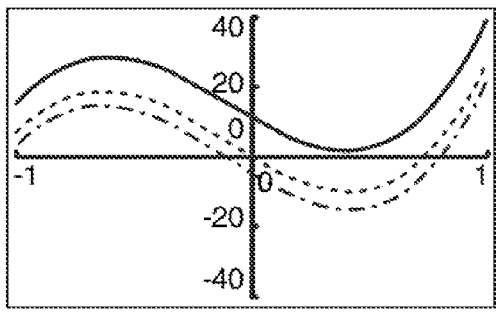
Figure 33F:
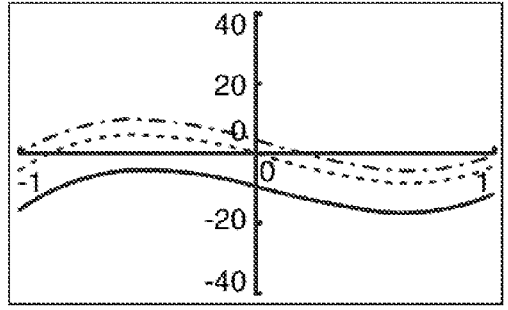

FIG. 32 is a cross-sectional view of the perspective projection device 70 of Example 8. The prism 40 in the perspective projection device 70 has a first surface S41 having a weak negative refractive power, a second surface S42 having a relatively strong positive refractive power, a third surface S43 having a relatively weak positive refractive power, a fourth surface S44 having a relatively weak positive refractive power, a fifth surface S45 having a relatively weak positive refractive power, and a sixth surface S46 having a relatively weak negative refractive power. If describing the detailed specification of the optical system of Example 8, the horizontal angle of view is 20.1°, the vertical angle of view is 11.4°, the size of the display region of the image display element is 9.22×5.18 mm, the diameter of the pupil is 5 mm and the focal distance is approximately 26 mm.

Figure 34A:
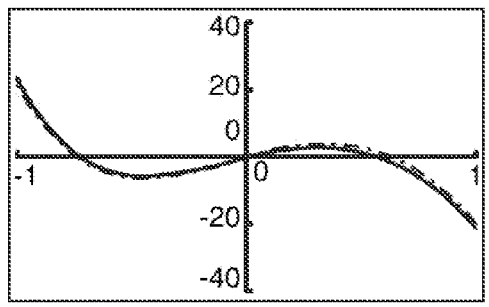
FIG. 34A to 34F are diagrams illustrating an aberration of the optical system of Example 8.
Figure 34D:
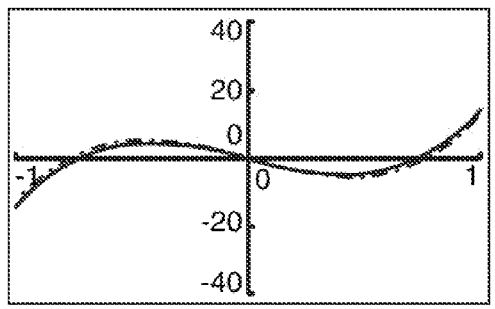
Figure 34B:
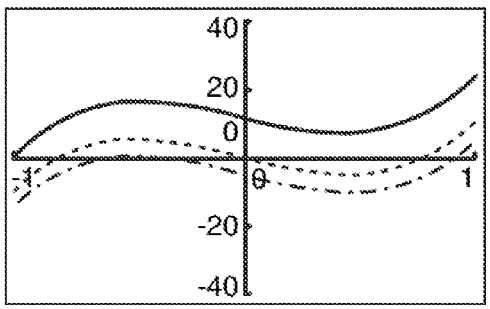
Figure 34E:
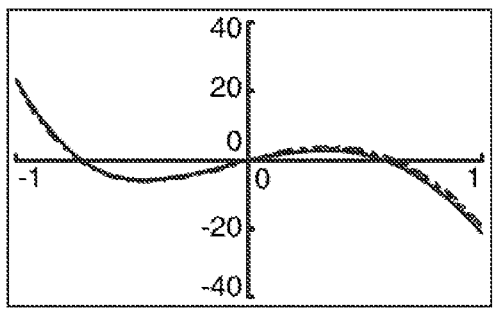
Figure 34C:
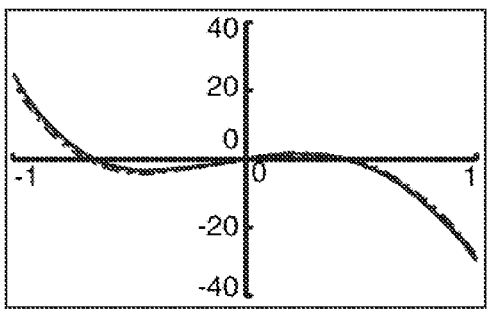
Figure 34F:
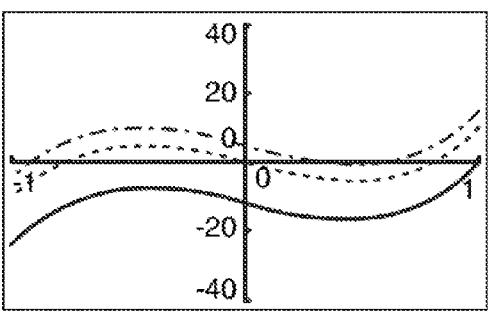

FIGS. 33A to 33F and FIGS. 34A to 34F show aberrations of example 7. Specifically, FIGS. 33A and 33B respectively show aberrations in X direction and Y direction in an azimuth of 10° in X direction and 5.7° in Y direction, FIGS. 33C and 33D respectively show aberrations in X direction and Y direction in an azimuth of 0.0° in X direction and 5.7° in Y direction, and FIGS. 33E and 33F respectively show aberrations in X direction and Y direction in an azimuth of −10° in X direction and 5.7° in Y direction. FIGS. 34A and 34B respectively show aberrations in X direction and Y direction in an azimuth of 10° in X direction and 0.0° in Y direction, FIGS. 34C and 34D respectively show aberrations in X direction and Y direction in an azimuth of 0.0° in X direction and 0.0° in Y direction, and FIGS. 34E and 34F respectively show aberrations in X direction and Y direction in an azimuth of −10° in X direction and 0.0° in Y direction.

In Table 28 below, with regard to each of Examples 5 to 8, numerical data relating to conditional expressions 1 to 3 is arranged.

TABLE 28

|  |  | Example 5 | Example 6 | Example 7 | Example 8 |
|---|---|---|---|---|---|
| $A1_{2,0}$ | | −2.907E−03 | −1.724E−03 | −3.372E−03 | −2.658E−03 |
| $A1_{0,2}$ | | −1.676E−03 | −1.667E−03 | −3.536E−03 | −1.052E−03 |
| $A3_{2,0}$ | | −2.907E−03 | −1.724E−03 | −3.372E−03 | −2.658E−03 |
| $A3_{0,2}$ | | −1.676E−03 | −1.667E−03 | −3.536E−03 | −1.052E−03 |
| Conditional expression (1) | $A1_{2,0} + A1_{0,2}$ | −4.582E−03 | −3.392E−03 | −6.908E−03 | −3.711E−03 |
| Conditional expression (1) | $A3_{2,0} + A3_{0,2}$ | −4.582E−03 | −3.392E−03 | −6.908E−03 | −3.711E−03 |
| Conditional expression (2) | $A1_{2,0} - A1_{0,2}$ | −1.231E−03 | −5.724E−05 | 1.648E−04 | −1.606E−03 |
| Conditional expression (3) | $A1_{2,0} - A3_{2,0}$ | 0.000E+00 | 0.000E+00 | 0.000E+00 | 0.000E+00 |
| Conditional expression (3) | $A1_{0,2} - A3_{0,2}$ | 0.000E+00 | 0.000E+00 | 0.000E+00 | 0.000E+00 |

In addition, in Table 29, with regard to each of Examples 5 to 8, numerical data relating to an interval between the first surface S41 and the third surface S43 and an inclination angle of the second surface S42 with respect to the first surface S41 is arranged.

TABLE 29

|  | Example 5 | Example 6 | Example 7 | Example 8 |
|---|---|---|---|---|
| Interval between S41 and S43 (mm) | 8.50 | 9.00 | 9.00 | 9.50 |
| Inclination angle (°) of S42 to S41 | 26 | 26 | 27 | 29 |

In addition, the conditional expression (3) gives an effect to a diopter scale of the prism with respect to an external light, and if the thickness of the prism is T and the refractive index is N, the diopter scale Dx in the x axis direction and the diopter scale Dy in the y axis direction on the optical axis of the prism is given as follows.

$$Dx=2000(N-1)(A1_{2,0}-A3_{2,0}+(2T(N-1)/N) \times A1_{2,0} \times A3_{2,0})$$

$$Dy=2000(N-1)(A1_{0,2}-A3_{0,2}+(2T(N-1)/N) \times A1_{0,2} \times A3_{0,2})$$

Based on the above expressions, in Table 30 below, numerical data relating to a diopter scale with regard to each of Examples 5 to 8 is arranged.

TABLE 30

|  | Example 5 | Example 6 | Example 7 | Example 8 |
|---|---|---|---|---|
| Diopter Scale Dx (D: Diopter) | 0.02 | 0.07 | 0.05 | 0.06 |
| Diopter Scale Dy (D: Diopter) | 0.02 | 0.08 | 0.01 | 0.02 |
| Thickness T of prism (mm) | 8.5 | 9 | 9 | 9.5 |
| Refractive Index N | 1.525 | 1.525 | 1.525 | 1.525 |

Figure 35:
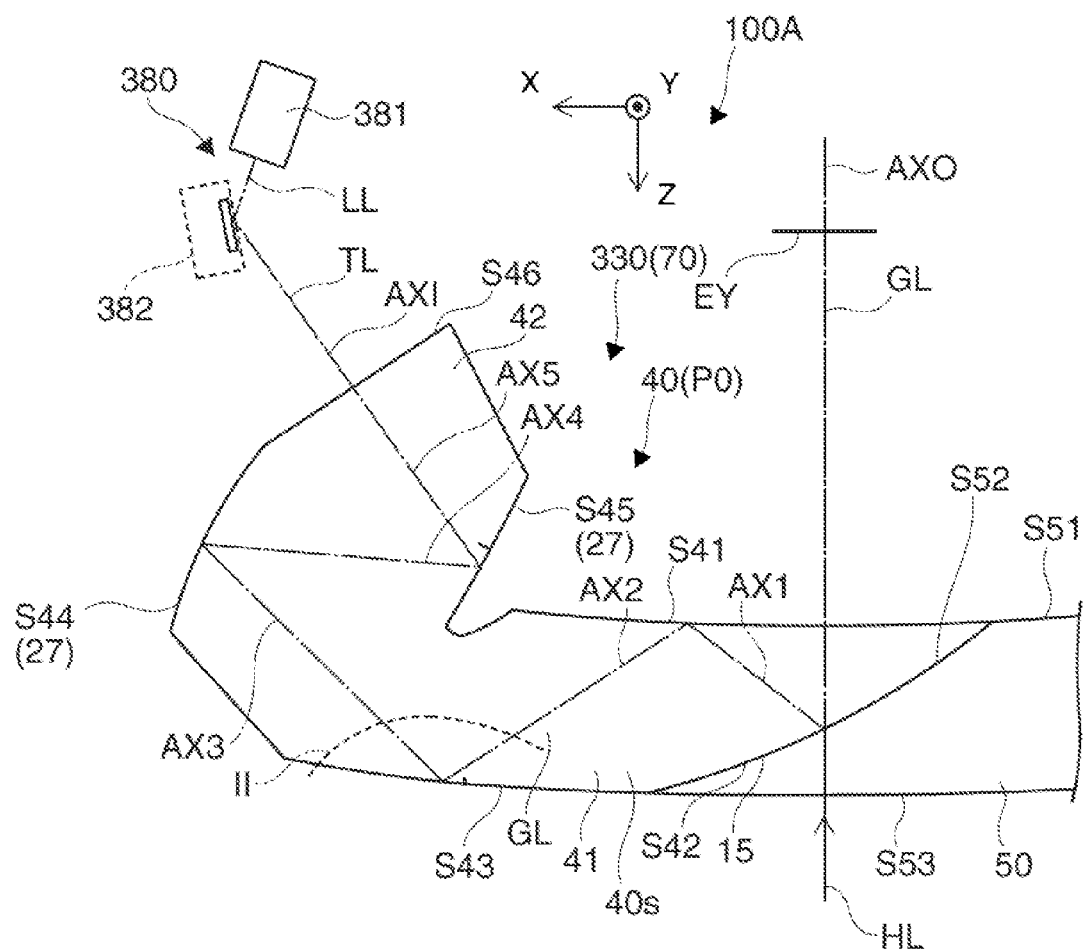
FIG. 35 is a diagram illustrating a virtual image display apparatus of Modification Example.

In the above embodiments, the image display device 80 formed by a transmissive type liquid crystal display device and the like is used, instead thereof, in the same manner as the case of the first embodiment (refer to FIG. 17), for example, a scanning type image display device shown in FIG. 35 may be used.

Figure 36:
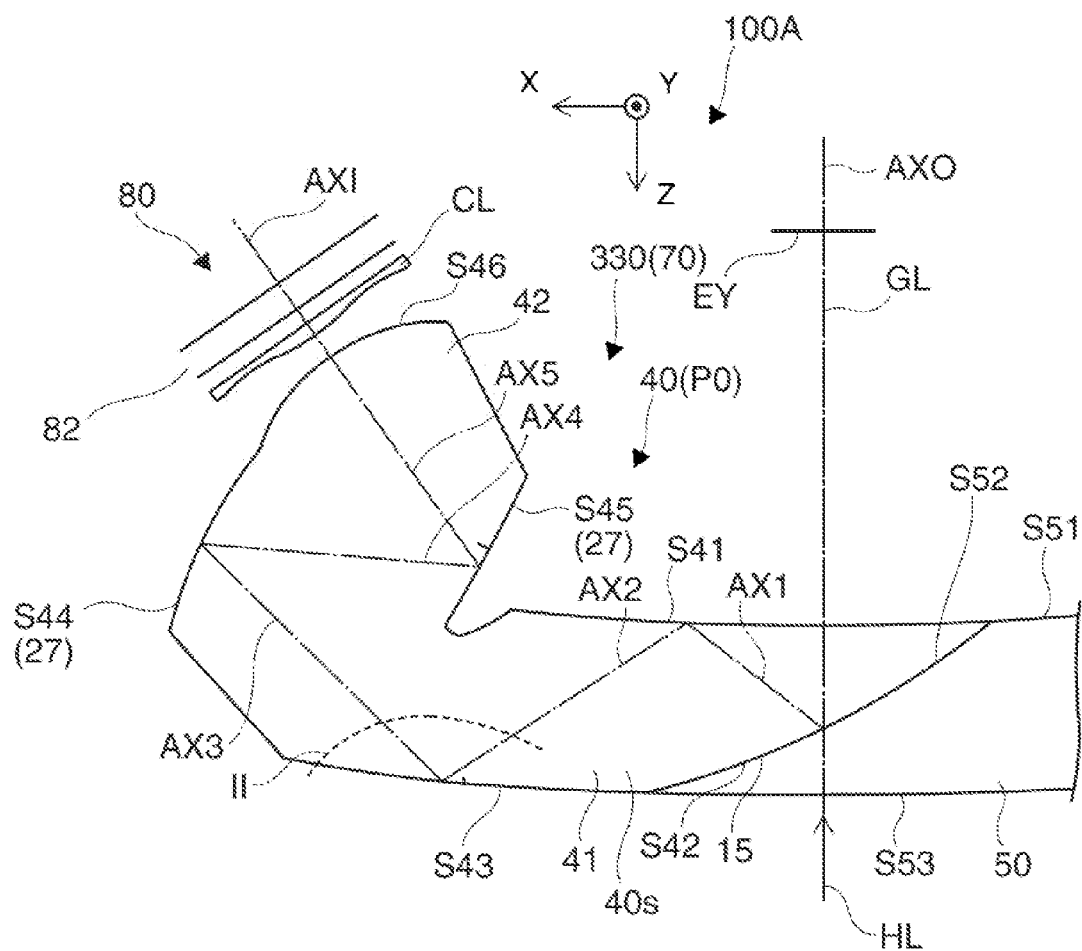
FIG. 36 is a diagram illustrating a virtual image display apparatus of another Modification Example.

Further, as shown in FIG. 36, a correction lens CL may be provided between the prism 40 and the image display device 80. The correction lens CL is a lens not having a power substantially, and may be used for restriction and the like of, for example, an aberration.

Figure 37A:
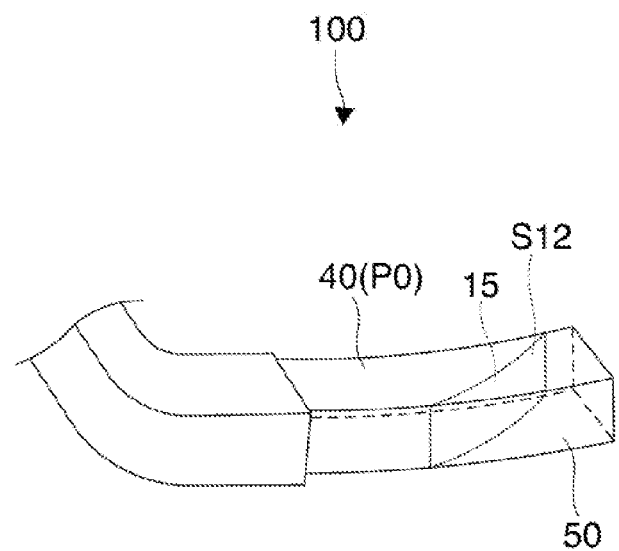
FIG. 37A is a perspective view illustrating a light guiding device and other example of a virtual image display apparatus using the light guiding device.
Figure 37B:
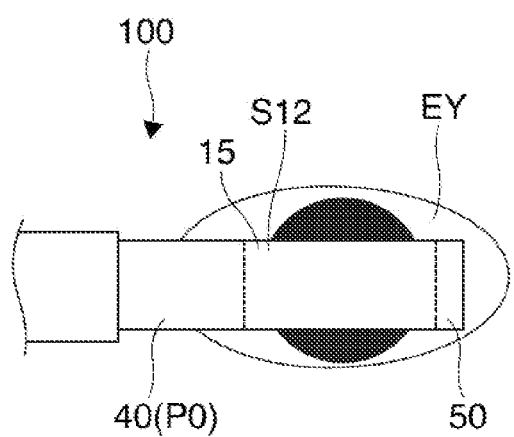
FIG. 37B is a front view thereof.

Furthermore, in the above second embodiment, the prism 40 which is a light guiding member and the light transmitting member 50 which is an auxiliary prism are configured to cover all in front of eyes EY of a wearer, however, without being limited thereto, in the same manner as the case of the first embodiment (refer to FIG. 18), for example, as shown in FIGS. 37A and 37B, a compact configuration is possible, in which a portion including the second surface S42 that is a curved surface shape having a half mirror layer 15 covers only a part of the eyes EY, that is, only a part in front of eyes is covered and a part that is not covered is present.

OTHERS

Although the invention is described based on each of the above embodiments, the invention is not limited to the above embodiments, but may be performed in various aspects, for example, the following variations are possible within the scope without departing from the spirit of the invention.

In the above description, a half mirror layer (a semi-transmissive reflecting film) 15 is formed in an oblongly rectangular region, but the profile of the half mirror layer 15 may be appropriately clanged according to the intended purpose and other uses. In addition, a transmissivity or a reflectivity of the half mirror layer may be appropriately changed according to the intended purpose and other uses.

In the above description, the distribution of brightness in display in the image display element 82 is not specially adjusted, but in a case where a brightness difference occurs depending on a position, it is possible to unequally adjust the distribution of brightness in display.

In the above description of the first embodiment, as the image display device 80, the image display element 82 formed by an organic EL, an OLED or the like which is a self-emitting type display device is used, but as the image display device 80, is not limited to the organic EL, a LED array may be used. Further, without being limited to the image display element 82 formed by a self-emitting type display device, various image display devices may be used. For example, a configuration using a transmissive type liquid crystal display device or a reflective type liquid crystal display device is also possible, and instead of the image display element 82 formed by the liquid crystal display device and the like, a digital micromirror device and the like may also be used. Inversely in the second embodiment, the image display element 82 formed by a transmissive type liquid crystal display device and the like is used, but self-emitting type display device may be used.

In the above description, the virtual image display apparatus 100 including a pair of display devices 100A and 100B is described, but a single of display device may be used. That is, without each one set of the perspective projection device 70 and the image display device 80 being provided corresponding to both of the left eye and the right eye, a configuration may be used, in which the perspective projection device 70 and the image display device 80 are provided with respect to any one of the left eye and the right eye, therefore a configuration in which an image is viewed with a single eye is possible.

In the above description, the interval in X direction of a pair of display devices 100A and 100B is not described, but the interval of both of the display devices 100A and 100B may be adjusted by a mechanical device, without being limited to a fixed interval. That is, the interval in X direction of both of display devices 100A and 100B may be adjusted based on the eye width of the wearer and the like.

In the above description, the half mirror layer 15 is a mere semi-transmissive film (for example, a metal reflecting film or a dielectric multi-layer film), but the half mirror layer 15 may be replaced with a hologram element of a flat surface or a curved surface.

In the above description, the virtual image display apparatus 100 is specifically described to be a head mount display device, but the virtual image display apparatus 100 may be modified into a head-up display device.

In the above description, in the first surface S11 and the third surface S13 of the prism 10, without giving a mirror or a half mirror on the surface, an image light may be guided by a total reflection of the image light on a boundary surface with air, however, a total reflection in the virtual image display apparatus 100 according to the embodiment of the invention may include a reflection by a mirror coating or a half mirror film on all or a part of the first surface S11 or the third surface S13. For example, if the incident angle of an image light satisfies the total reflection condition, a case is included, where the mirror coating is performed on all or a part of the first surface S11 or the third surface S13, so that substantially all image lights are reflected. In addition, all or a part of the first surface S11 or the third surface S13 may be coated by a mirror having a little transparency, if an image light of a sufficient brightness is obtained through the mirror.

In the above description, the prism 10 or the like extends in the horizontal direction that is in line with the eyes EY, however the prism 10 may be disposed to extend in the vertical direction. In this case, the optical members 110 have a configuration to be disposed parallel to each other, not in serial but in parallel.

The entire disclosure of Japanese Patent Application Nos. 2012-038383, filed Feb. 24, 2012 and 2012-038384, filed Feb. 24, 2012 and 2012-270072, filed Dec. 11, 2012 and 2012-270073, filed Dec. 11, 2012 are expressly incorporated by reference herein.

What is claimed is:

1. The virtual image display apparatus which causes an image light and an external light to be visually recognized simultaneously, comprising:
    an image element which generates an image light; and
    a prism type image forming optical system including non-axisymmetric curved surfaces of three surfaces or more,
    wherein the prism type image forming optical system includes a relay optical system which forms an intermediate image on an optical path,
    when the external light is visually recognized by passing the external light through a first surface and a third surface among a plurality of surfaces constituting the prism type image forming optical system, a diopter scale is approximately zero,
    the first surface and the third surface form a concave surface shape with respect to an observation side,
    after the image light from the image element is totally reflected on the third surface, then totally reflected on the first surface and then reflected on the second surface, the image light is transmitted through the first surface to reach the observation side, and
    the prism type image forming optical system includes a first prism including non-axisymmetric curved surfaces of two surfaces or more and a second prism including non-axisymmetric curved surfaces of two surfaces or more, and an intermediate image is formed on an optical path from the first prism to the second prism, an optical system including at least the second prism serving as the relay optical system.

2. The virtual image display apparatus according to claim 1, wherein the first prism and the second prism have a plurality of surfaces that are formed separately.

3. The virtual image display apparatus according to claim 1, wherein the second prism has the plurality of surfaces, and the intermediate image is formed by the image element, the plurality of surfaces of the second prism, and a fourth surface that is a light incident surface of the first prism.

4. The virtual image display apparatus according to claim 3, wherein the prism type image forming optical system has a first prism portion having the first surface, the second surface and the third surface on a light emitting side, and a second prism portion on a light incident side, and the first prism portion and the second prism portion are integrally formed.

5. The virtual image display apparatus according to claim 4, wherein the second prism portion has the fourth surface, a fifth surface and a sixth surface, and the intermediate image is formed by the image element and the fourth surface, the fifth surface and the sixth surface of the second prism portion.

6. A virtual image display apparatus which causes an image light and an external light to be visually recognized simultaneously, comprising:
    an image element which generates an image light; and
    a prism type image forming optical system including non-axisymmetric curved surfaces of three surfaces or more,
    wherein the prism type image forming optical system includes a relay optical system which forms an intermediate image on an optical path,
    when the external light is visually recognized by passing the external light through a first surface and a third surface among a plurality of surfaces constituting the prism type image forming optical system, a diopter scale is approximately zero,
    the first surface and the third surface form a concave surface shape with respect to an observation side,
    after the image light from the image element is totally reflected on the third surface, then totally reflected on the first surface and then reflected on the second surface, the image light is transmitted through the first surface to reach the observation side, and
    by taking an origin of each of the surfaces constituting the prism type image forming optical system as a standard, when polynomial development of an expressing formula of a surface shape is performed with regard to rectangular coordinates x and y extending from the origin to a tangential direction, by setting $-Ak_{m,n}$ as a coefficient of a term $-x^m \cdot y^n$ of the polynomial expression which expresses the k-th surface, conditions (1) to (3) below are satisfied:

$-5 \times 10^2 < A1_{2,0} + A1_{0,2} < -1 \times 10^{-3}$ and $-5 \times 10^2 < A3_{2,0} + A3_{0,2} < -1 \times 10^{-3}$ (1)

$|A3_{2,0} - A3_{0,2}| < 1 \times 10^{-2}$ (2)

$|A1_{2,0} - A3_{2,0}| < 5 \times 10^{-3}$ and $|A1_{0,2} - A3_{0,2}| < 5 \times 10^{-3}$ (3).

\* \* \* \* \*